United States Patent
Suzuki et al.

(10) Patent No.: US 7,134,343 B2
(45) Date of Patent: Nov. 14, 2006

(54) OPTO-ACOUSTOELECTRIC DEVICE AND METHODS FOR ANALYZING MECHANICAL VIBRATION AND SOUND

(75) Inventors: Kazuhiro Suzuki, Yokohama (JP); Hideyuki Funaki, Tokyo (JP); Keitaro Shigenaka, Hachioji (JP); Tomio Ono, Yokohama (JP); Tadashi Sakai, Yokohama (JP); Yujiro Naruse, Yokohama (JP); Yoshinori Iida, Tokyo (JP); Ikuo Fujiwara, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/895,049

(22) Filed: Jul. 21, 2004

(65) Prior Publication Data

US 2005/0052724 A1    Mar. 10, 2005

(30) Foreign Application Priority Data

Jul. 25, 2003 (JP) ............................ P2003-202000
Mar. 26, 2004 (JP) ............................ P2004-091290
Mar. 26, 2004 (JP) ............................ P2004-093424

(51) Int. Cl.
*G01H 9/00* (2006.01)
*G01B 11/16* (2006.01)

(52) U.S. Cl. ............................ 73/655; 73/649; 356/499
(58) Field of Classification Search ................. 73/655, 73/657, 647, 649; 359/285, 150, 151; 356/499; 381/186

See application file for complete search history.

(56) References Cited

U.S. PATENT DOCUMENTS

| | | | | |
|---|---|---|---|---|
| 3,426,207 A | * | 2/1969 | Fried et al. | ............... 398/204 |
| 4,977,564 A | * | 12/1990 | Ryu et al. | ................... 372/32 |
| 5,062,155 A | * | 10/1991 | Eda | ............................ 359/325 |
| 5,235,607 A | * | 8/1993 | Kojima et al. | ......... 372/29.022 |
| 5,515,730 A | * | 5/1996 | Manzouri | ................... 73/655 |
| 5,995,260 A | | 11/1999 | Rabe | |
| 6,567,572 B1 | * | 5/2003 | Degertekin et al. | ........... 385/12 |
| 6,628,392 B1 | * | 9/2003 | Kuroda et al. | ............... 356/400 |
| 6,700,671 B1 | * | 3/2004 | Akishiba | ................... 356/638 |
| 6,753,969 B1 | * | 6/2004 | Degertekin et al. | ......... 356/521 |
| 2003/0002129 A1 | * | 1/2003 | Kobayashi et al. | ......... 359/285 |
| 2005/0052724 A1 | | 3/2005 | Suzuki et al. | |

FOREIGN PATENT DOCUMENTS

| | | | |
|---|---|---|---|
| JP | 50-19822 | | 6/1975 |
| JP | 56-081802 | | 7/1981 |
| JP | 56081802 A | * | 7/1981 |
| JP | 358100703 A | * | 6/1983 |
| JP | 5-227596 | | 9/1993 |
| JP | 05-292591 | | 11/1993 |

(Continued)

OTHER PUBLICATIONS

U.S. Appl. No. 11/116,273, filed Apr. 28, 2005, Suzuki et al.

*Primary Examiner*—Hezron Williams
*Assistant Examiner*—Jacques Saint-Surin
(74) *Attorney, Agent, or Firm*—Oblon, Spivak, McClelland, Maier & Neustadt, P.C.

(57) ABSTRACT

An opto-acoustoelectric device encompasses a diaphragm having a diffraction grating, the diaphragm is susceptible to a vibration driven by an external force; a light source oriented to irradiate the diffraction grating; and a photo detector configured to detect the light diffracted by the diffraction grating and to convert the detected light into an electric signal. The electric signal corresponds to a displacement of the vibration in the diaphragm.

1 Claim, 45 Drawing Sheets

FOREIGN PATENT DOCUMENTS

| | | |
|---|---|---|
| JP | 6-77399 | 10/1994 |
| JP | 7-139996 | 6/1995 |
| JP | 07-184297 | 7/1995 |
| JP | 2000-78695 | 3/2000 |
| JP | 2000-292433 | 10/2000 |
| JP | 2000-332351 | 11/2000 |
| JP | 2000-352675 | 12/2000 |
| JP | 2001-169394 | 6/2001 |
| JP | 2001169395 A * | 6/2001 |
| JP | 2001-204097 | 7/2001 |
| JP | 2001-231100 | 8/2001 |
| JP | 2001-235544 | 8/2001 |
| JP | 2001-245396 | 9/2001 |
| JP | 2001-292498 | 10/2001 |
| JP | 2001-292499 | 10/2001 |
| JP | 2002-148018 | 5/2002 |
| JP | 2003-169801 | 6/2003 |
| KR | 2001-0012328 | 2/2001 |
| KR | 2003-0047025 | 6/2003 |
| WO | WO 2003/049494 | 6/2003 |

* cited by examiner

FIG. 11A  $t = t_1$
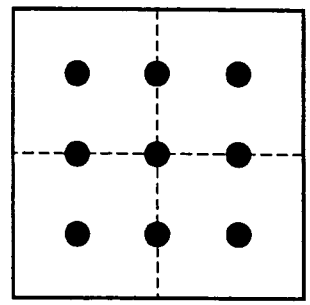
FIG. 11B  $t = t_1+t_2$
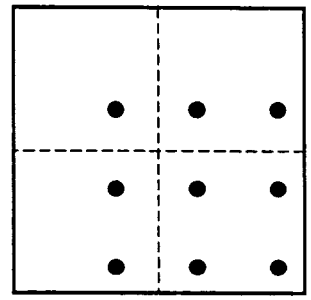
FIG. 11C  $t = t_1+t_2+t_3$
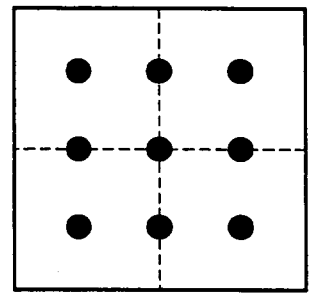
FIG. 11D  $t = t_1+t_2+t_3+t_4$
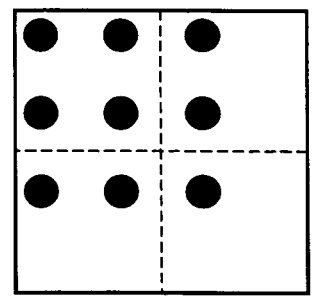
FIG. 11E  $t = t_1+t_2+t_3+t_4+t_5$
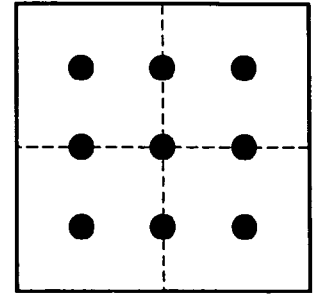

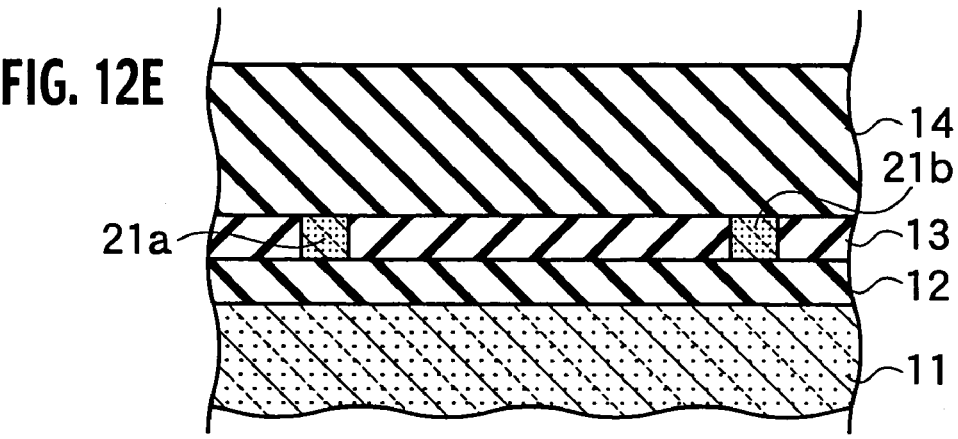
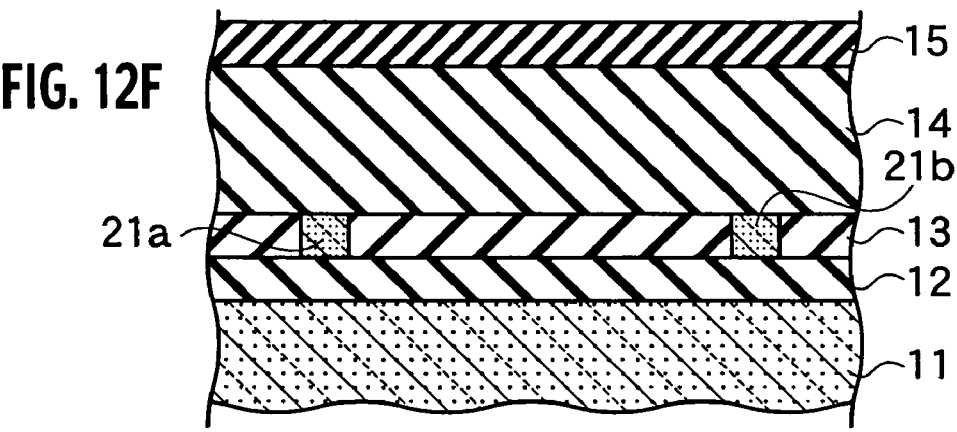
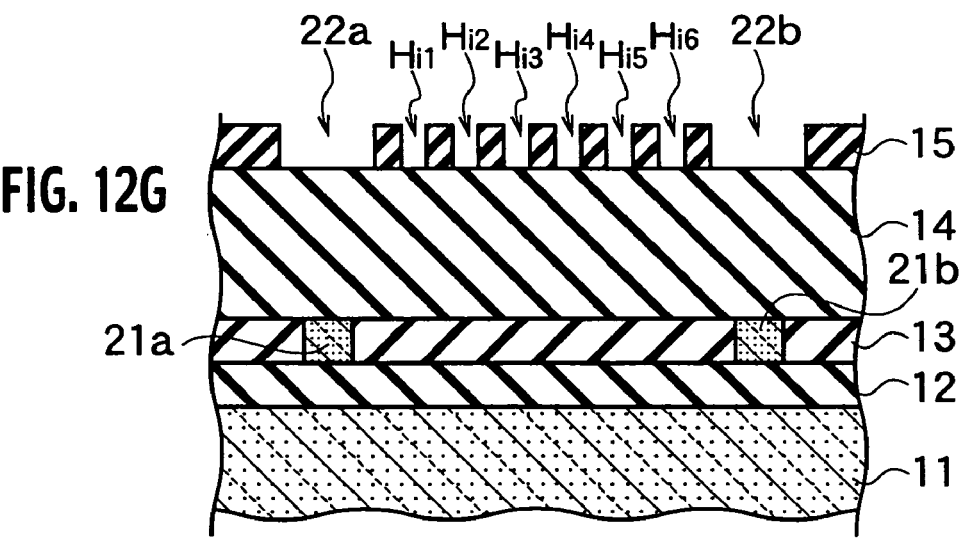

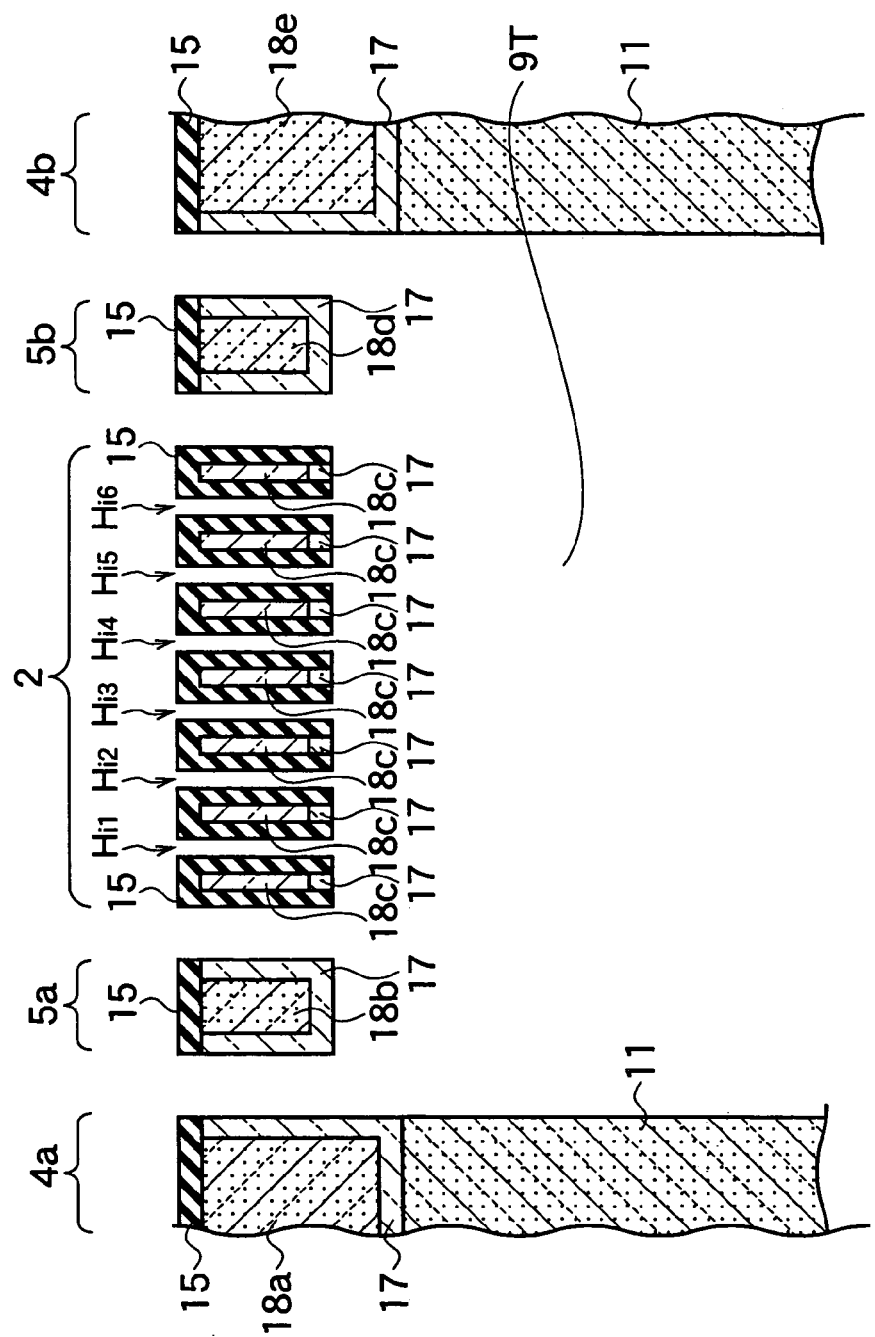

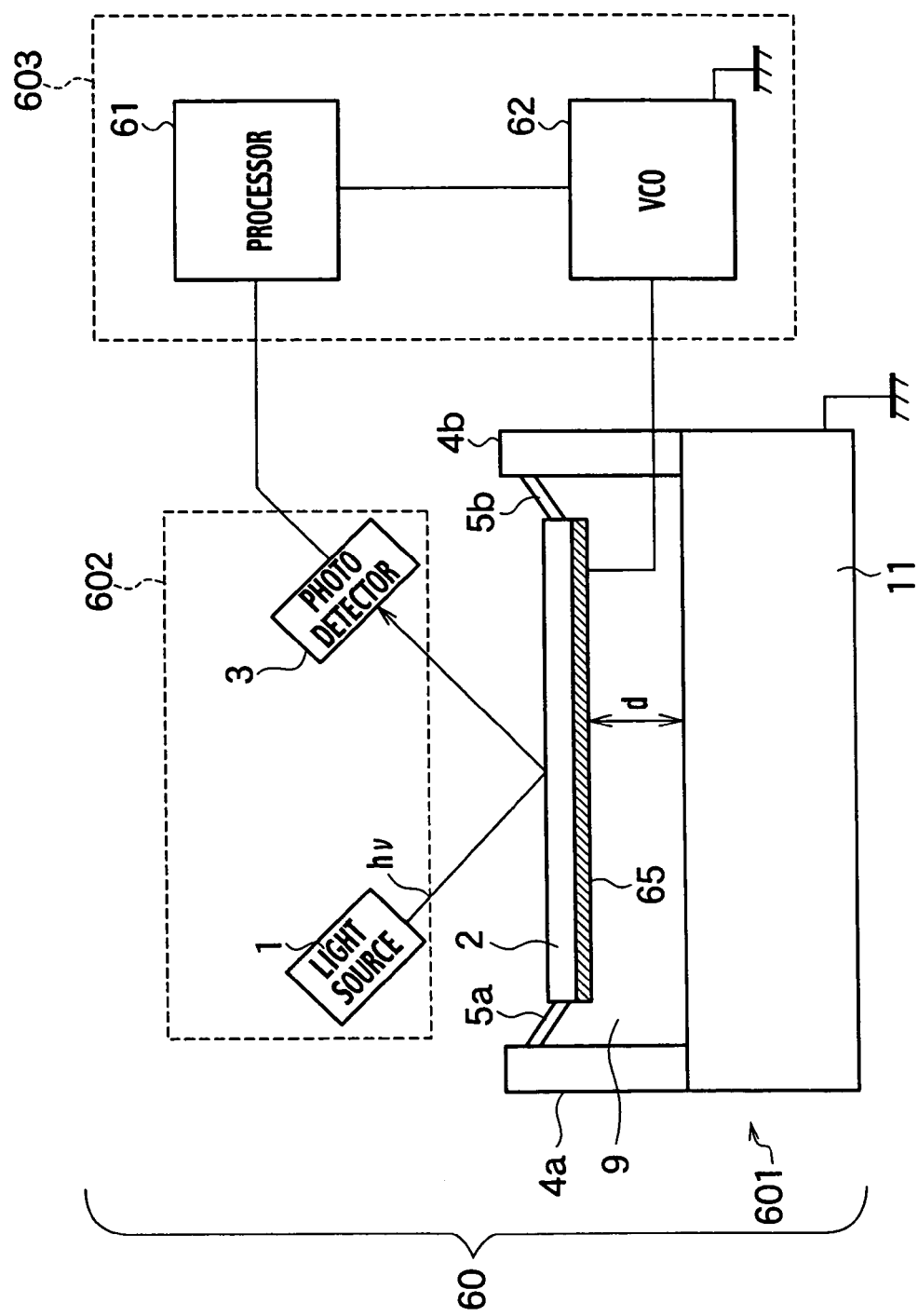

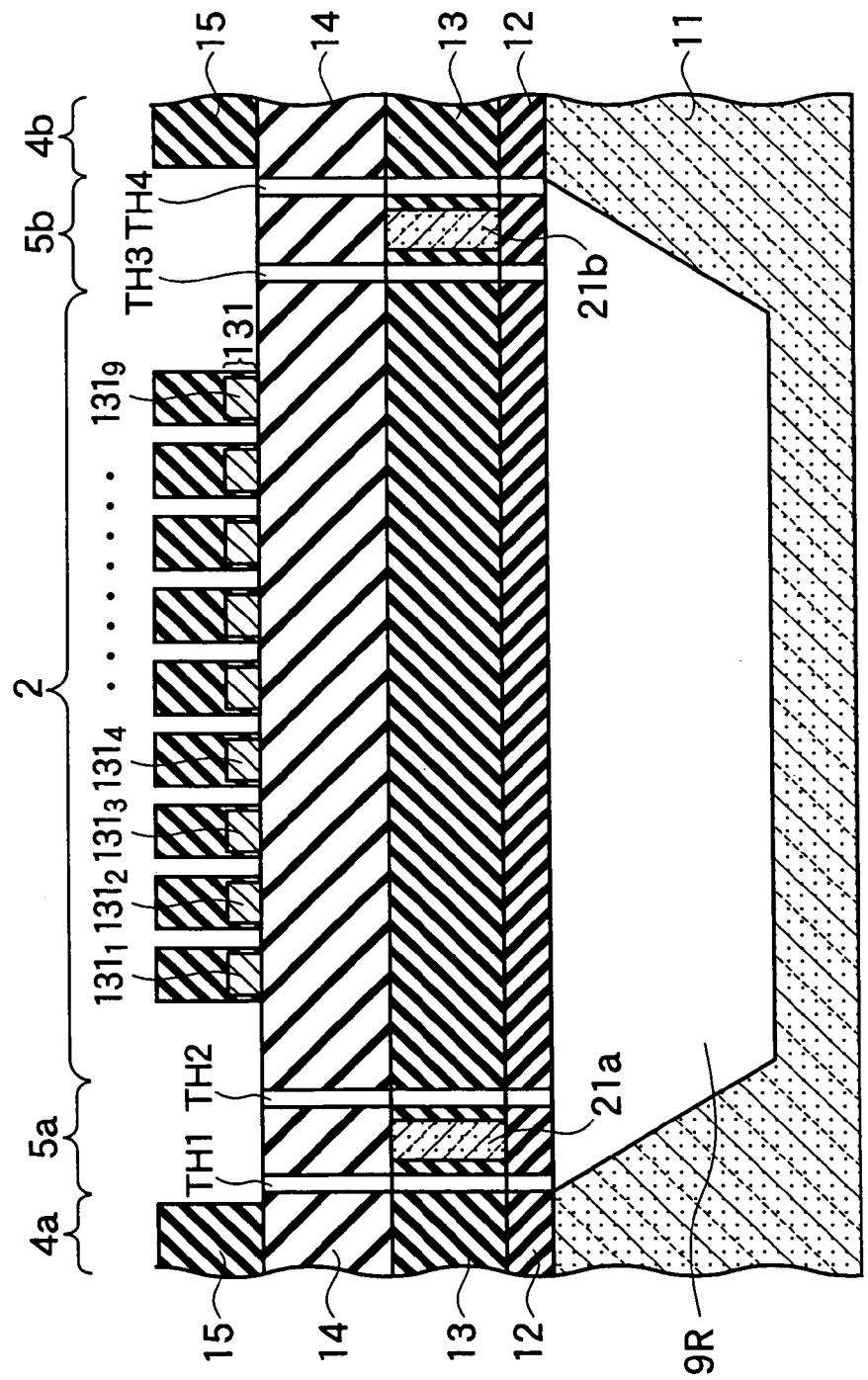

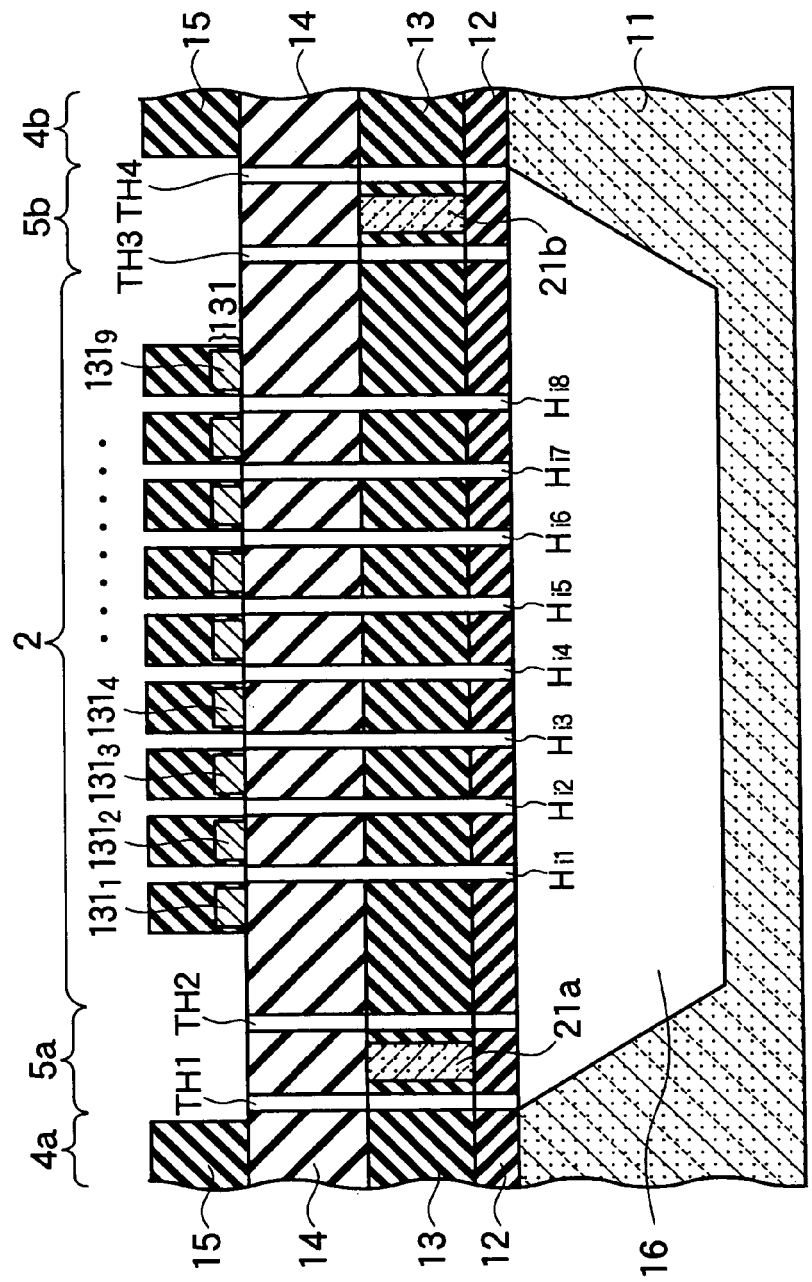

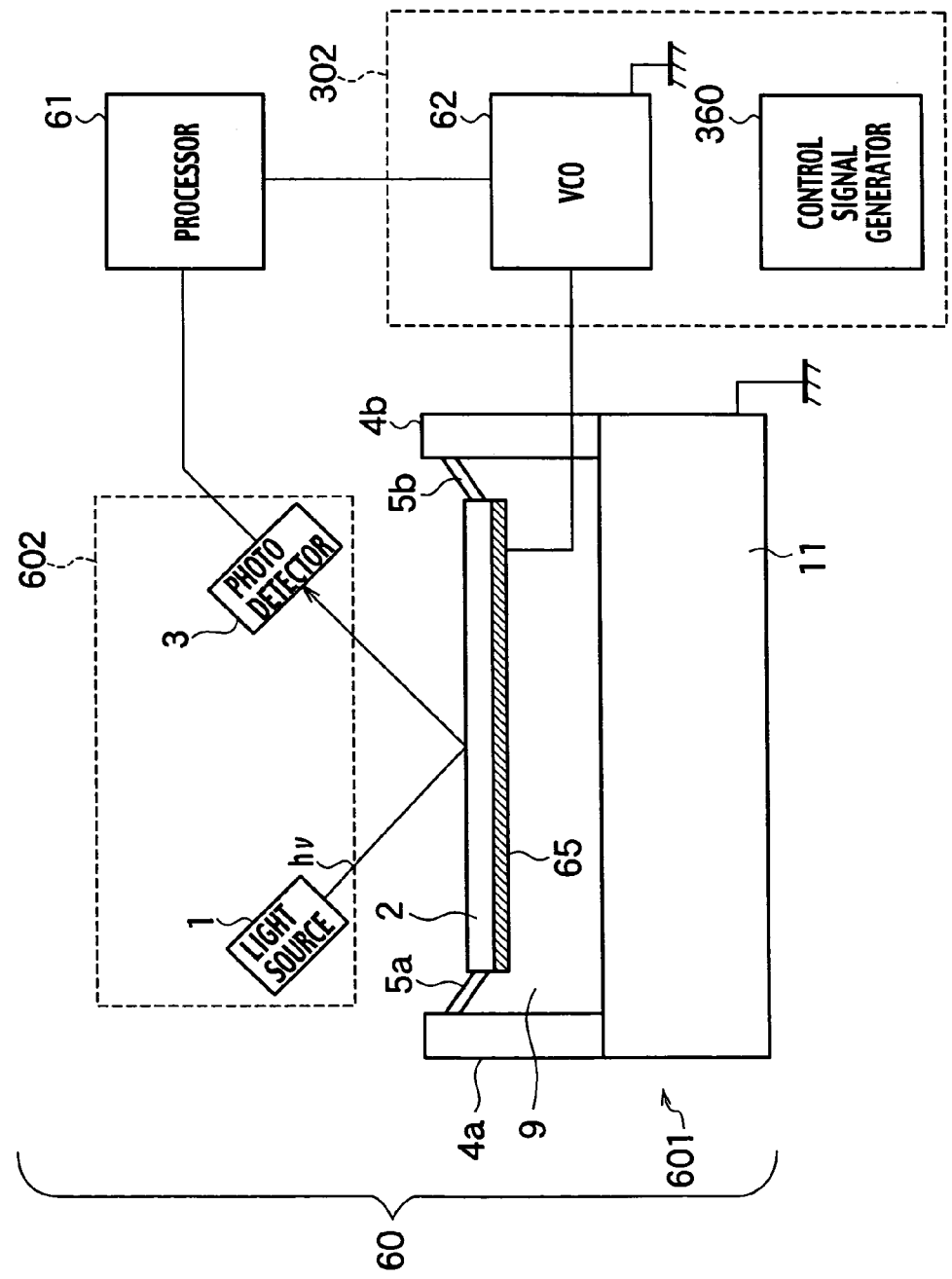

OPTO-ACOUSTOELECTRIC DEVICE AND METHODS FOR ANALYZING MECHANICAL VIBRATION AND SOUND

CROSS REFERENCE TO RELATED APPLICATIONS

This application claims benefit of priority under 35 USC 119 based on Japanese Patent Application No. P2003-202000 filed Jul. 25, 2003, Japanese Patent Application No. P2004-093424 filed Mar. 26, 20004, and Japanese Patent Application No. P2004-091290 filed Mar. 26, 2004, the entire contents of which are incorporated by reference herein.

BACKGROUND OF THE INVENTION

1. Field of the Invention

Present invention relates to opto-acoustoelectric devices and method for analyzing mechanical vibration and sound using the opto-acoustoelectric devices.

2. Description of the Related Art

In optical microphones of earlier technology, a diaphragm is stacked on a supporting substrate by some type of tensile force. Because of the mechanical configuration, the resonance frequency of the diaphragm was uniquely determined according to physical parameters such as mass and spring constant. Even though the frequency characteristic of the optical microphone is nominally specified as being flat, the diaphragm's sensitivity drops actually as frequency deviates from the inherent resonant frequency of the diaphragm. A technique of arranging a plurality of diaphragms, each of the diaphragms having different sizes and spring constants, is reported as an approach to realizing a microphone having a broad dynamic range.

On the other hand, the condenser microphone detects the diaphragm's vibrational displacement caused by acoustic pressure (sound pressure) by the variation of electrostatic capacitance. Compared to the condenser microphone, the optical microphone beams light onto a diaphragm. As the diaphragm vibrates in response to sound pressure, changes in the intensity of the reflected light are detected as the oscillating displacement of the diaphragm. Compared to the condenser microphone, the optical microphone is expected to have excellent performance in directivity and noise tolerance attributes.

In the optical microphones of earlier technology however, the diaphragm is exposed to gas laser, solid-state laser, or semiconductor laser diode light output, and changes in the intensity of the reflected light are detected as the oscillating displacement of the diaphragm. However, there are drawbacks inherent in the mechanical structure and the dimensional constraints of the methods proposed in the above-mentioned earlier technology. Also concerning mounting methodology, there are concerns that manufacturing yield would drop due to an increase in constituent components Also, optical microphones of earlier technology require an incidental-light optics system for guiding incident light onto the diaphragm, and catoptrical system for guiding reflected light to a given photo detector. Because high optical precision is required of these optics systems, optical fiber or optical waveguides are used to make it possible to establish an arbitrary optical path Also, the light beam shifts atop the photodetector's surface in correspondence with the physical displacement of the diaphragm caused by vibration, thus in order to greatly widen the shift width of the reflected light beam, measures such as establishing a lens between the diaphragm and the circuit board, on which the light emitting and detection elements are mounted, are essential. In other words, because the diameter of the light waves reflected from the diaphragm is widened using light focusing methods of optical microphones of earlier technology, great light intensity is essential in order for the photo detector to detect differences in light intensity and sense minute vibrational displacement of the diaphragm.

As a result, optics such as optical path supplementation elements and compensation elements became essential. Because of the optics, aside from the light-emitting elements, the light emitting detection elements and the diaphragm, other auxiliary optical elements and a new supplemental system are required to satisfy the demand of high-precision optical alignment of optics. Therefore, complicated optics of an optical microphone leads to reduced manufactured yield, and the entire cost as a system increases. Also, when optical fiber or optical waveguide is employed, the application range of optical microphones of earlier technology becomes narrow.

SUMMARY OF THE INVENTION

An aspect of the present invention inheres in an opto-acoustoelectric device encompassing (a) a diaphragm having a diffraction grating, the diaphragm is susceptible to a vibration driven by an external force; (b) a light source oriented to irradiate the diffraction grating; and (c) a photo detector configured to detect the light diffracted by the diffraction grating and to convert the detected light into an electric signal, the electric signal corresponds to a displacement of the vibration in the diaphragm.

Another aspect of the present invention inheres in an method for analyzing mechanical vibration, encompassing (a) sending forth a light on a diaphragm having a diffraction grating, the diaphragm is vibrating driven by an external force, the light is modulated by repetitive periodic signal; (b) detecting the light diffracted by the diffraction grating to convert the detected light into an electric signal; and (c) demodulating the electric signal with repetitive periodic signal.

A still another aspect of the present invention inheres in a method for analyzing sound, encompassing (a) driving an active vibration of a diaphragm having a diffraction grating; (b) superposing a passive vibration of the diaphragm induced by a sound pressure on the active vibration in the diaphragm; (c) sending forth a light on the diaphragm vibrating with the superposed vibration; and (d) detecting the light diffracted by the diffraction grating to convert the detected light into an electric signal.

BRIEF DESCRIPTION OF THE DRAWINGS

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified. Generally and as it is conventional in the representation of acoustoelectric devices, it will be appreciated that the various drawings are not drawn to scale from one figure to another nor inside a given figure, and in particular that the layer thicknesses are arbitrarily drawn for facilitating the reading of the drawings.

FIGS. 11A to 11E are schematic views describing how to obtain a period in a specific periodic vibration of the diaphragm;

FIG. 12E is a cross-sectional view showing a process stage, in which an interlayer dielectric film is deposited on the element-isolation dielectric film, which buries polysilicon connectors, in a sequence of the manufacturing method of the mechanical vibration element;

FIG. 12F is a cross-sectional view showing a process stage, in which a passivation film is deposited on the interlayer dielectric film, in the sequence of the manufacturing method of the mechanical vibration element;

FIG. 12G is a cross-sectional view showing a process stage, in which the passivation film is delineated on the interlayer dielectric film, in the sequence of the manufacturing method of the mechanical vibration element;

FIG. 21 is a cross-sectional view illustrating a concrete example of the structure of a mechanical vibration element, which implements an opto-acoustoelectric device according to a modification (first modification) of the second embodiment of the present invention;

FIG. 31 is a schematic view of an opto-acoustoelectric device equipped with an acoustoelectric transducer according to a sixth embodiment of the present invention;

FIG. 33 is a cross-sectional view illustrating a mechanical vibration element, which implements an acoustoelectric transducer of the sixth embodiment of the present invention;

FIG. 37 is a cross-sectional view illustrating another mechanical vibration element, which implements an opto-acoustoelectric device according to a modification of the sixth embodiment of the present invention;

FIG. 38 is a cross-sectional view illustrating a mechanical vibration element, which implements an opto-acoustoelectric device according to a seventh embodiment of the present invention;

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing the present invention in practice.

DETAILED DESCRIPTION OF THE EMBODIMENTS

In the following description specific details such as specific materials, process and equipment are set forth in order to provide a thorough understanding of the present invention. It will be apparent, however, to one skilled in the art that the present invention may be practiced without these specific details. In other instances, well-known manufacturing materials, process and equipment are not set forth in detail in so as to not cloud the present invention with needless obscurity.

Prepositions, such as "on", "over", "above" and "under" are defined with respect to a planar surface of the substrate, regardless of the orientation in which the substrate is actually held. A layer is on another layer even if there are intervening layers.

(First Embodiment)

Figure 1:
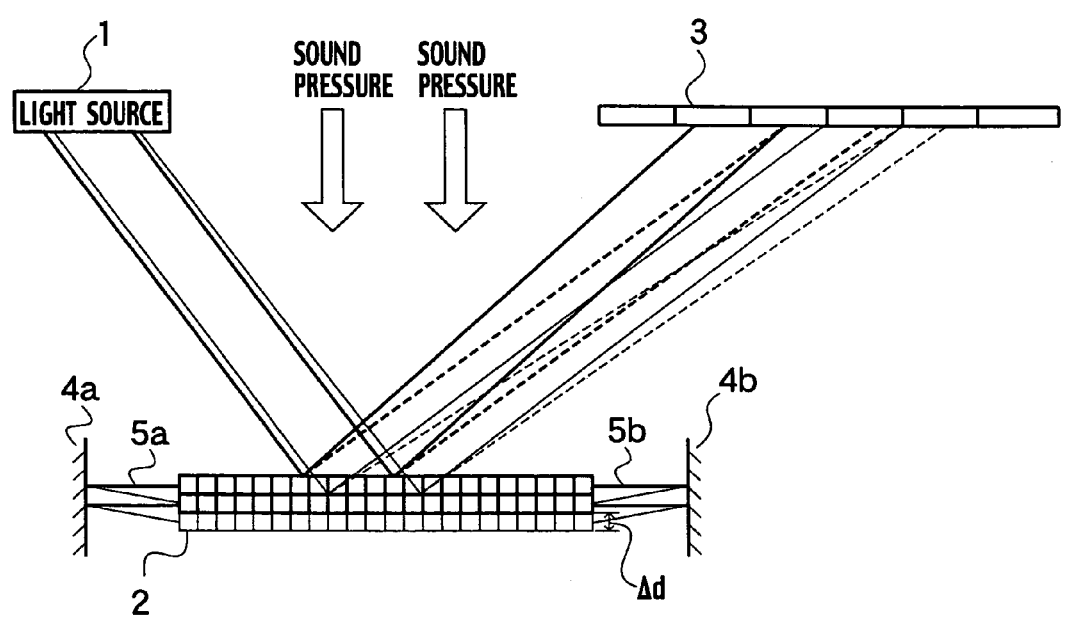
FIG. 1 is a schematic view illustrating a configuration of an opto-acoustoelectric device according to a first embodiment of the present invention.

As illustrated in FIG. 1, an opto-acoustoelectric device according to a first embodiment of the present invention encompasses a mechanical vibration element implemented by a diaphragm 2, the diaphragm 2 has a diffraction grating that vibrates in response to sound pressure, a light source 1 configured to expose the diffraction grating to light, and a photo detector—3 configured to detect light diffracted by the diffraction grating and convert it into an electric signal.

It is preferable to use an image sensor such as a photo diode array etc. as the photo detector 3 illustrated in FIG. 1. Thus, the photo detector 3 is ensured a sufficiently wide area for diffracted light so that it is possible to fully and completely detect the diffraction image.

With the opto-acoustoelectric device according to the first embodiment, when light beamed from the light source 1 is incident upon the diaphragm 2, because a reflection-type diffraction grating is formed upon the diaphragm 2, light waves beamed from the light source 1 are reflected by the diffraction grating and produce a diffraction image on the top surface of the photo detector 3. In this manner, the opto-acoustoelectric device involved in the first embodiment utilizes the photo detector 3 to optically detect the displacement $\Delta d$ of the diaphragm 2, which has a reflection-type diffraction grating. The opto-acoustoelectric device then converts the displacement $\Delta d$ into an electric signal.

Figure 2:
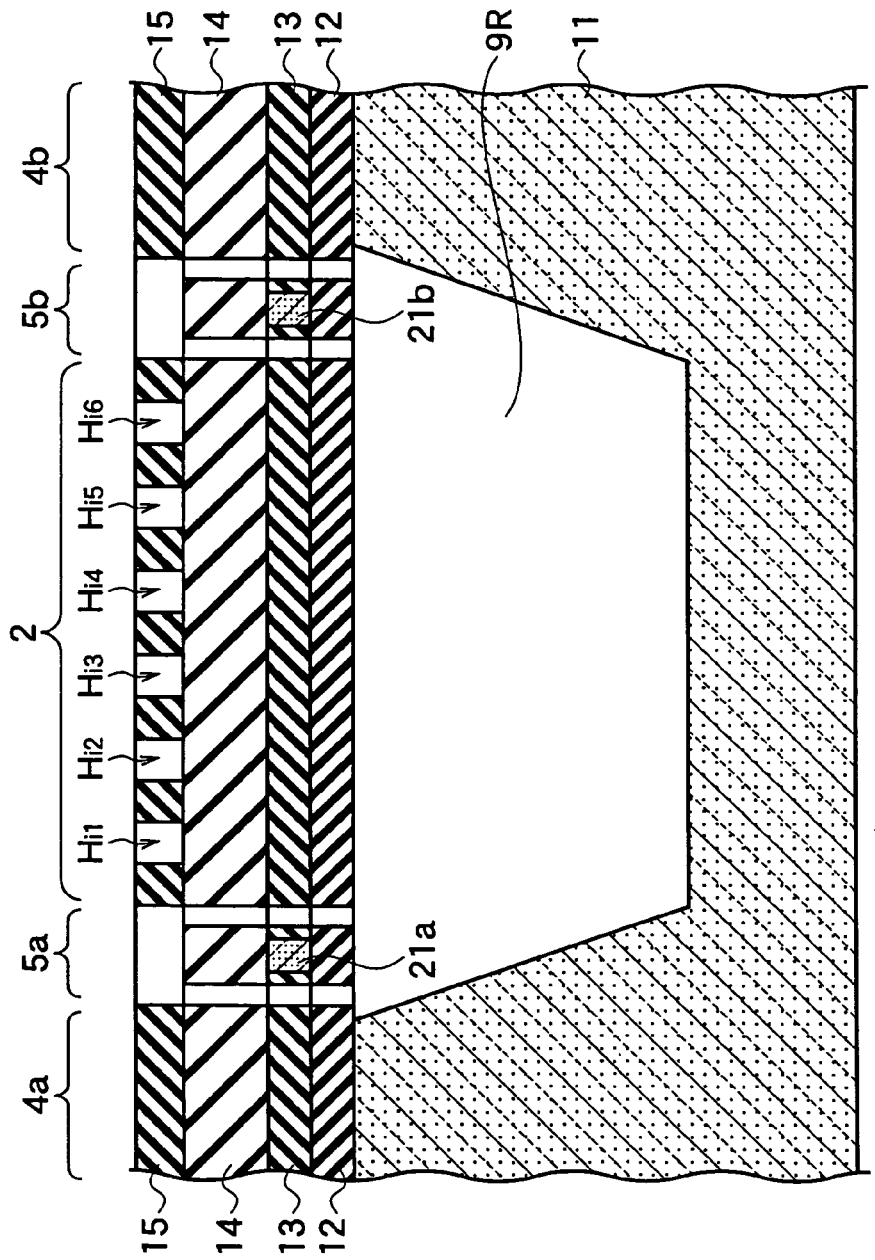
FIG. 2 is a cross-sectional view illustrating a concrete example of the structure of a mechanical vibration element, which implements a opto-acoustoelectric device according to the first embodiment of the present invention.

For this purpose, the diaphragm 2 is suspended from immovable members 4a, 4b by elastic connectors 5a, 5b. More specifically, as illustrated in FIG. 2, in a mechanical vibration element implementing the opto-acoustoelectric device of first embodiment, the diaphragm 2 is suspended by the elastic connectors 5a, 5b from the immovable members 4a, 4b, and the immovable members 4a, 4b are established on the supporting substrate 11. When viewed from a plan view, a bathtub-shaped cavity 9R is established in the surface of the supporting substrate 11 and the immovable members 4a, 4b surround the bathtub-shaped cavity 9R in a picture-frame fashion. And, the diaphragm 2 is disposed as a lid above the bathtub-shaped cavity 9R as illustrated in the cross-sectional view shown in FIG. 2.

The immovable members 4a and 4b are formed by sequentially stacking a buried dielectric film 12, an element isolation film 13, an interlayer dielectric film 14, and a passivation film 15 in this order on the supporting substrate 11, which is made of single crystal silicon. The diaphragm 2 is also a layered structure embracing the buried dielectric film 12, the element isolation dielectric film 13, the interlayer dielectric film 14, and the passivation film 15.

The elastic connectors 5a and 5b embrace the buried dielectric film 12, the element-isolation dielectric film 13, and the interlayer dielectric film 14. And polysilicon connectors 21a, 21b are buried in the layer of the element-isolation dielectric film 13.

Figure 3A:
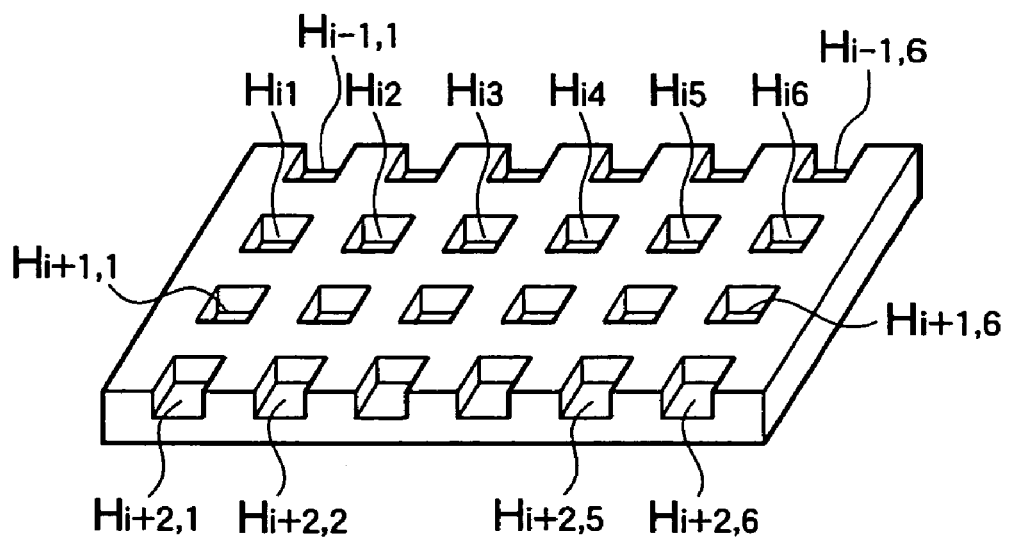
FIG. 3A is a birds-eye view of a reflection-type two-dimensional diffraction grating.
Figure 3B:
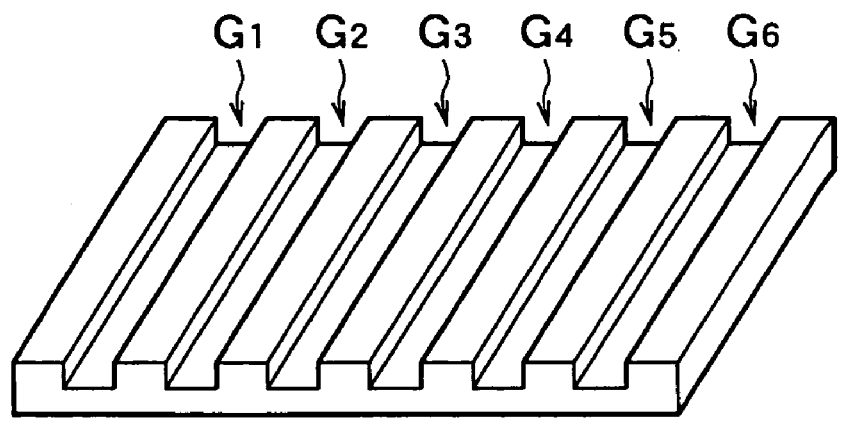
FIG. 3B is a birds-eye view of a reflection-type one-dimensional diffraction grating.

Both the two-dimensional diffraction grating shown in FIG. 3A and the one-dimensional diffraction grating shown in FIG. 3B are acceptable for use as the reflection-type diffraction grating, which will be established on the diaphragm 2. In FIG. 3A, the example shows a two-dimensional diffraction grating formed by a plurality of holes (well-shaped rectangular holes or rectangular pits) $H_{i-1,1}, \ldots, H_{i,1}, H_{i,2}, H_{i,3}, \ldots H_{i+2,6}$ disposed in a matrix configuration on the diaphragm 2. And in FIG. 3B, the example shows a one-dimensional diffraction grating formed by a plurality of grooves $G_1, G_2, G_3, \ldots, G_6$ disposed periodically on the diaphragm 2.

Figure 4:
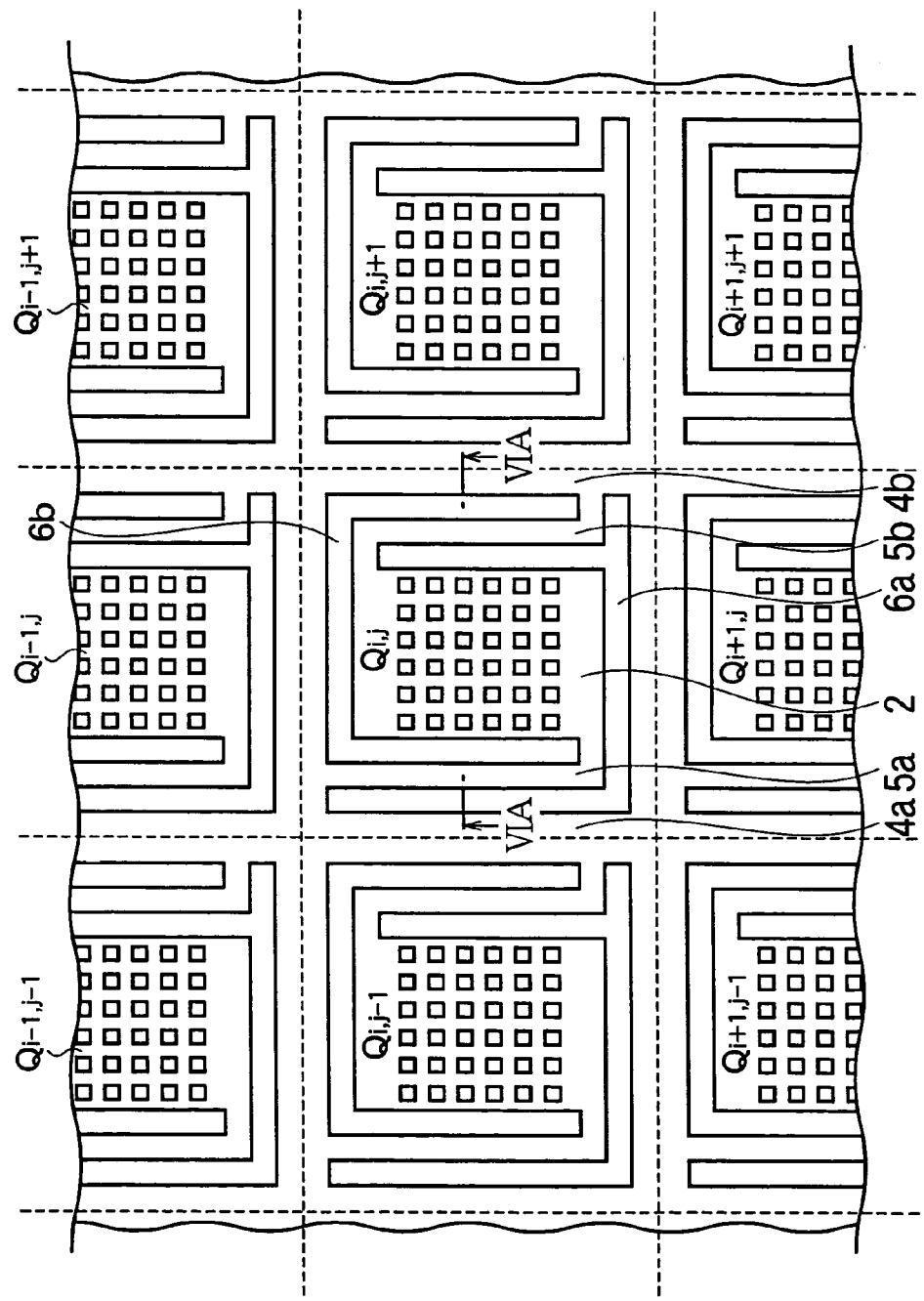
FIG. 4 is a plan view of the mechanical vibration element, which implements an opto-acoustoelectric device according to the first embodiment of the present invention, in a situation having a plurality of diaphragms disposed in a matrix configuration.

Further, it is also acceptable to arrange a plurality of the diaphragms (oscillating elements) $Q_{i-1, j-1}, Q_{i-1, j}, Q_{i-1, j+1}, \ldots, Q_{i, j-1}, Q_{i, j}, Q_{i, j+1}, \ldots, Q_{i+1, j-1}, Q_{i+1, j}, Q_{i+1, j+1}, \ldots$, in a matrix configuration as illustrated in FIG. 4. In FIG. 4, the plurality of the diaphragms (oscillating elements) $Q_{i-1, j-1}, Q_{i-1, j}, Q_{i-1, j+1}, \ldots, Q_{i, j-1}, Q_{i, j}, Q_{i, j+1}, \ldots, Q_{i+1, j-1}, Q_{i+1, j}, Q_{i+1, j+1}, \ldots$ are suspended by two narrow beams of the elastic connectors 5a, 5b from the immovable members 4a, 4b. The immovable members 4a, 4b are formed on the surface of the supporting substrate in a grid like pattern, and each of the elastic connectors 5a, 5b possess a perpendicularly bended structure. One elastic connector 5a is disposed wedged between piercing slits 6a, 6b and possesses one L-type bend. The other elastic connector 5b, is wedged between the piercing slits 6a, 6b and possesses two L-type bend. FIG. 2 corresponds to the cross-sectional view taken on line VIA—VIA in FIG. 4.

In FIG. 4, if the oscillating elements $Q_{i-1, j-1}, Q_{i-1, j}, Q_{i-1, j+1}, \ldots$ disposed in a row are linked together elastically to form an oscillating-element chain, and in the same manner the oscillating elements $Q_{i, j-1}, Q_{i, j}, Q_{i, j+1}, \ldots$, are linked in a row to form an oscillating-element chain, and the oscillating elements $Q_{i+1, j-1}, Q_{i+1, j}, Q_{i+1, j+1}, \ldots$, are linked in a row to form a chain, so that each row serves as an oscillating-element chain possessing a different resonance frequency, it becomes possible to provide an opto-acoustoelectric device having an extremely broad bandwidth. Or, it is also acceptable to form oscillating-element chains in the same manner but in columns instead of rows, so that each column serves as an oscillating-element chain possessing a different resonance frequency. Further, it is also possible employ a vibration mode in which a plurality of immovable members 4a, 4b aligned along the row direction are combined to function as "horizontal stationary beams" spanning parallel to the row direction, respectively, and a plurality of immovable members 4a, 4b aligned along the column direction are combined to function as "vertical stationary beams" spanning parallel to the column direction so as to form "a stationary grid" And by employing the immovable members 4a, 4b, each of the diaphragms (oscillating elements) $Q_{i-1, j-1}, Q_{i-1, j}, Q_{i-1, j+1}, \ldots, Q_{i, j-1}, Q_{i, j}, Q_{i, j+1}, \ldots, Q_{i+1, j-1}, Q_{i+1, j}, Q_{i+1, j+1}, \ldots$ can vibrate independently in each space of the grid. Thus if each one of the diaphragms (oscillating elements) $Q_{i-1, j-1}, Q_{i-1, j}, Q_{i-1, j+1}, \ldots, Q_{i, j-1}, Q_{i, j}, Q_{i, j+1}, \ldots, Q_{i+1, j-1}, Q_{i+1, j}, Q_{i+1, j+1}, \ldots$ disposed in the stationary grid, or in the two-dimensional stationary beams, is made to posses a different resonance frequency, it becomes possible to provide an opto-acoustoelectric device having an extremely broad bandwidth.

In the situation shown in FIG. 1, if sound pressure is transmitted to the diaphragm 2 having a diffraction grating structure as in FIGS. 2 to 4, the diaphragm 2 is driven to vibrate while supported by fulcrums on the perimeter. Fulcrums are defined by the boundary between the elastic connector 5a, 5b and the immovable members 4a, 4b. In FIG. 1, the thick solid and dashed lines show the diffraction image before the diaphragm 2 undergoes vertical displacement $\Delta d$. When the diaphragm 2 is motionless, that is, in a situation where there is no sound input, light is beamed from the light source 1, which causes the diffraction image to appear on the top surface of the photo detector 3 spanning the interval between the thick solid and dashed lines of FIG. 1.

When sound input is present, the vertical distance "f" between the diaphragm 2 and the photo detector 3 shifts. When the shift of the distance "f" is induced, as illustrated by the thin solid and dashed lines, the interval of the diffraction image on the top surface of the photo detector 3 shifts two-dimensionally. The thin solid and dashed lines of FIG. 1 illustrate the shift in the interval of the diffraction image brought about by the vibration of the diaphragm 2.

Therefore, concerning the diffraction images transferred on the photo detector 3, by observing two diffraction images having identical degree and orientation, the photo detector 3 can find difference in the two diffraction images throughout the span of the vibration. The photo detector 3 detects the horizontal displacement of the diffraction image being generated on the top surface of the photo detector 3, and provides an electric signal representing the vertical displacement Δd of the diaphragm 2.

According to the opto-acoustoelectric device concerned in the first embodiment, it becomes unnecessary to furnish the optical elements essential to the opto-acoustoelectric devices of earlier technology, such as lenses used to collimate light reflected from the diaphragm 2, as well as optical fiber or optical waveguide used as a path to guide light waves in an arbitrary direction. The optical diffraction effect is exploited, so imaging is self-focused without need of passing through any lenses. Because of the self-focused imaging, focusing can take place on the top surface of the photo detector 3, and detection at a high resolution is possible. The constraints upon the optical path of the incident light beamed onto the diaphragm 2 are also significantly reduced.

Because the optical constraints of the incident/reflected light to/from the diaphragm 2 are reduced with the opto-acoustoelectric device according to the first embodiment, a simple system can be formed, miniaturization is possible, and the number of usable applications is broadened.

Further, according to the opto-acoustoelectric device concerned in the first embodiment, by using one-dimensional or two dimensional photo diode arrays as the photo detector 3, it is possible to perform detection on the pixel level and achieve digital conversion at the same time. An A/D converter becomes unnecessary, response speed also improves, and circuit dimensions can be miniaturized. With a reflection-type diffraction grating such as shown in FIG. 1, it is possible to mount the light source 1, the power source of the photo detector 3, the drive circuitry, and the processing circuitry all on the same circuit board. Further, it is also possible to manufacture the diaphragm 2 having a diffraction grating using the same semiconductor-manufacturing process as for the photo detector 3 and its peripheral circuitry.

As a result, it is possible to reduce the manufacturing cost of the opto-acoustoelectric device according to the first embodiment. As can be easily understood from FIG. 2, in forming the diffraction grating of the diaphragm 2, that is when the formation of grooves/grating on the diaphragm 2 is required, it is useful to employ the semiconductor manufacturing process. By using the semiconductor manufacturing process it becomes possible to form a diffraction grating possessing an arbitrary grating period value, having good reproducibility and suited to mass production.

Also, because the semiconductor substrate used as the supporting substrate 11 possesses a variety of physical properties, it is possible to alter the mass or spring constant of the diaphragm 2 with ease. For instance, silicon (Si) can be used for the diaphragm 2 (See FIG. 13), and a laser with a wavelength below λ=1000 nm can be used for the light source 1. If the sidewalls of the grating are selectively coated with a highly reflective material so as to leave bare silicon top surface, the incident light beamed onto the bare silicon top surface will be absorbed by silicon, and only the light reflected at the sidewalls of the grating serves as the diffracted light, which reaches to the photo detector 3. This cuts the stray light headed to the photo detector 3, which as a result makes it possible to improve the S/N ratio.

Figure 5:
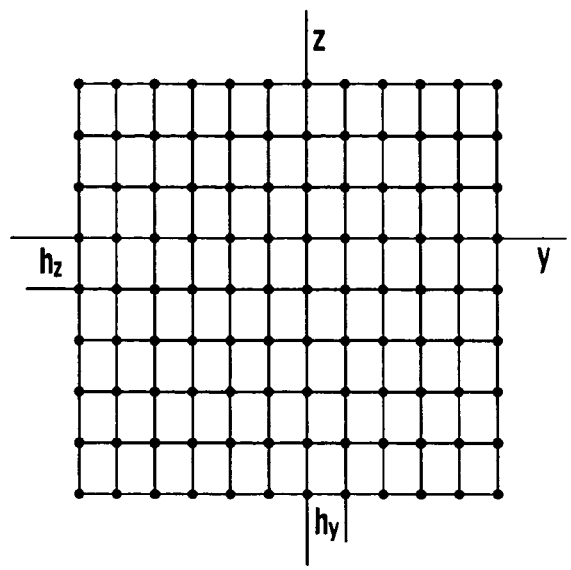
FIG. 5 is a schematic view showing a two-dimensional diffraction grating.

In describing the opto-acoustoelectric device according to the first embodiment, take the example of a two-dimensional diffraction grating implemented by a plane y-z to explain the phenomenon of the displacement of the diffraction image that takes place on the detection surface when the diaphragm 2 vibrates. As illustrated in FIG. 5, the two perpendicular axes of the grating plane, y and z are run parallel to the straight lines of holes. The intervals of the holes of both the y and z axis directions are marked $h_y$, $h_z$ respectively. If the center of one specific hole is taken as the starting point, the coordinates (y, z) of all the other holes will become integral multiples.

Figure 6:
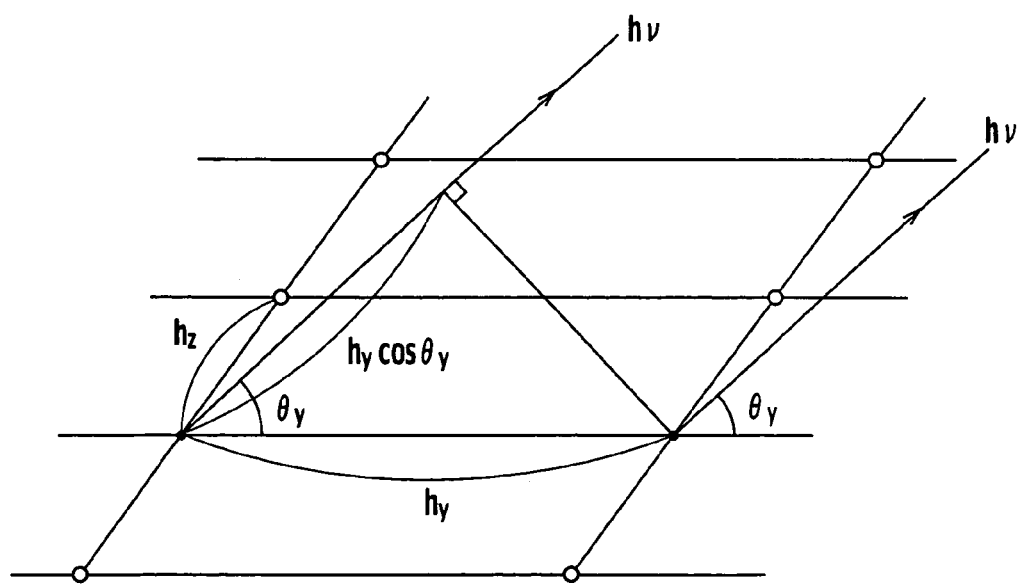
FIG. 6 is a schematic view showing the relationship of the phase of the diffraction light.

As illustrated in FIG. 6, the cosine (cos $θ_y$) of angle $θ_y$, which forms with the y-axis on a plane x-y, is determined by the direction of the diffraction light on the plane x-y, diffracted by a point on the plane y-z, as $γ_y$=cos $θ_y$. The cosine (cos $θ_z$) of angle $θ_z$, which forms with the z-axis on a plane z-x, is determined by the direction of diffraction light on the plane z-x, as $γ_z$=cos $θ_z$. With the degree $k_y$ of the y direction, which is an integer:

$$h_y γ_y = k_y λ \quad (1)$$

In order to satisfy the conditions of Equation (1), all disturbances to the light leaving on the plane x-y, and disturbances generated from holes running parallel to the y-axis direction, arrive at the focal plain in the same phase. In the same manner, with degree $k_z$ of the z direction, which is an integer:

$$h_z γ_z = k_z λ \quad (2)$$

In order to satisfy the conditions of Equation (2), all disturbances to light leaving on the plane z-x, and disturbances generated from holes running parallel to the z-axis direction, arrive at the focal plain in the same phase.

Figure 7A:
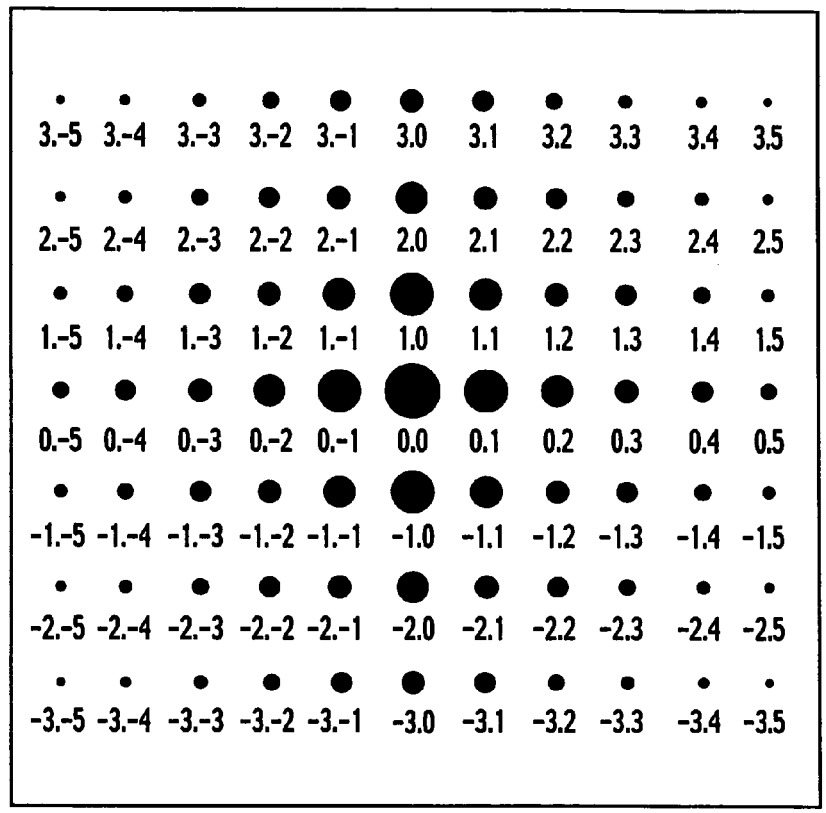
FIG. 7A shows the diffraction image generated in a situation using a two-dimensional diffraction grating.

At a spot on the diffraction grating corresponding to a direction that simultaneously satisfies the conditions of Equations (1) and (2), the disturbance generated from all holes must be in the same phase. If many holes exist, the light intensity is focused in very close proximity to the points at which Equations (1) and (2) are determined. Thus the focal plane of the photo detector 3 provides a pattern of an array of bright specks (bright spots) on a dark background on the rectangular grating. FIG. 7A illustrates the array of bright specks on the dark background. It is thought that each of the bright specks is a separate image of the point-light source 1. If the focal distance measured along a x-direction is expressed as $f_a$, the intervals $p_y$ of the bright specks running along the y-axis direction on the plane x-y are expressed by:

$$p_y = f_a λ / h_y \quad (3)$$

The intervals of the bright specks running along the z-axis direction on the plane z-x are expressed by:

$$p_z = f_a λ / h_z \quad (4)$$

Figure 7B:
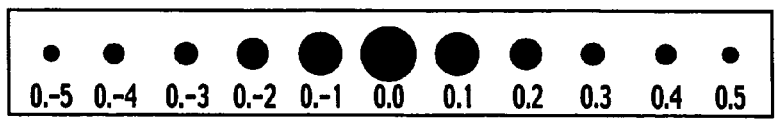
FIG. 7B shows the diffraction image generated in a situation using a one-dimensional diffraction grating.

The numbers assigned to each bright speck in FIG. 7A are indicated by $k_y$ and $k_z$. FIG. 7B shows the diffraction image generated in a case in which a one-dimensional diffraction grating is used.

Figure 8:
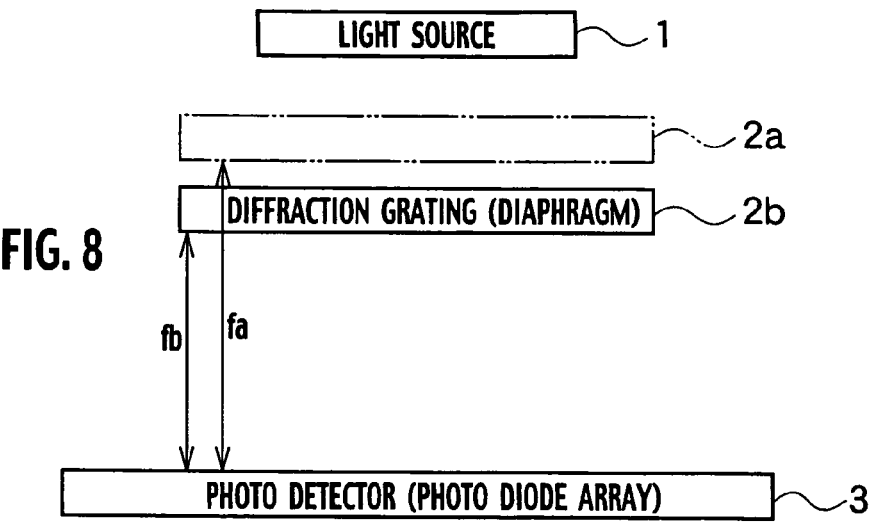
FIG. 8 is a schematic view showing the shift of the focal distance of the diffraction grating.

Here, the light wave detecting photo detector 3 is a fixed member, while the diaphragm 2 having a diffraction grating, is movable member, which displaces along the x-direction. Because of the relative relation between the fixed and movable members, vibration of the diaphragm 2 along the x-direction in response to sound pressure causes the focal distance between the diffraction grating and the photo detector 3 to shift, the diaphragm 2 is lying on a plane y-z. In other words, when the diaphragm 2 vibrates along the x-direction in response to sound pressure, the focal distance of the diffraction grating shifts from $f_a$ to $f_b$ along the x-direction, as illustrated in FIG. 8. When the shift of the focal distance along the x-direction occurs, in accordance with Equation (3) and Equation (4), because the grid period carved into the diffraction grating never change, the intervals $p_y$ of the bright specks running along the direction of the y-axis on the top surface of the photo detector 3 are expressed as:

$$p_y^{md} = f_b \lambda / h_y \qquad (5)$$

The intervals $p_z$ of the bright specks running along the direction of the z-axis are expressed as:

$$p_z^{md} = f_b \lambda / h_z \qquad (6)$$

Figure 9A:
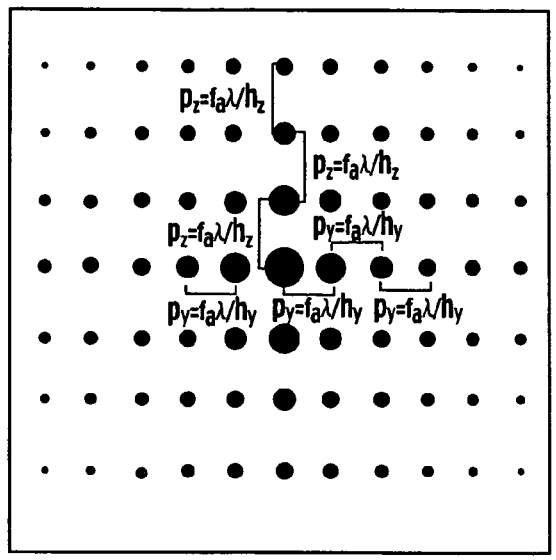
FIGS. 9A and 9B are schematic views illustrating a two-dimensional change, or the change of the inter-speck distances, which are transferred on the top surface of a photo detector (implemented by a photo diode array), in a situation where focal distance shifted vertically from $f_a$ to $f_b$ in response to the vibration of a two-dimensional diffraction grating.
Figure 9B:
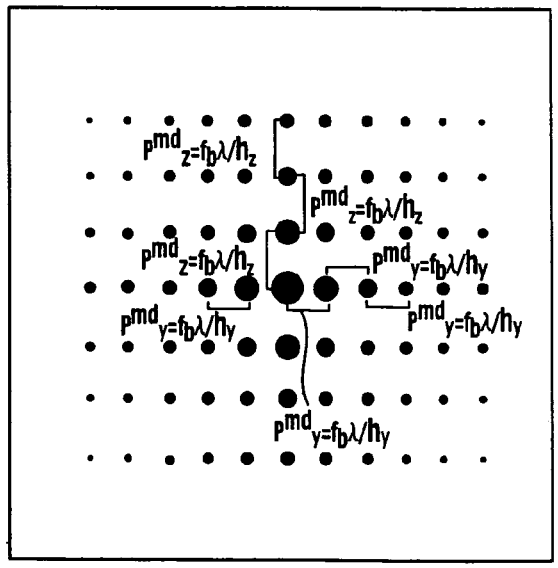

FIGS. 9A and 9B show the shift of the inter-speck intervals as a two-dimensional array of circular spots induced on the top surface of the photo detector 3, in a situation where the focal distance shifts from $f_a$ to $f_b$ along the x-direction in response to vibration of the two-dimensional diffraction grating. As represented by Equations (3), (4), (5) and (6), each diffraction image changes phase two-dimensionally on the top surface of the photo detector 3. When observing a certain diffraction image (any diffraction image except degree 0), there appears two-dimensional phase changing behavior corresponding to vibration of the diaphragm 2 on the top surface of the photo diode 3. With two-dimensional phase changing behavior, changes take place at extremely minute time intervals on the top surface of the photo diode 3 in an area where light waves are detected by the photo diode 3 and another area where light waves are not detected by the photo diode 3, associated with the vibration of diaphragm 2.

Figure 10A:
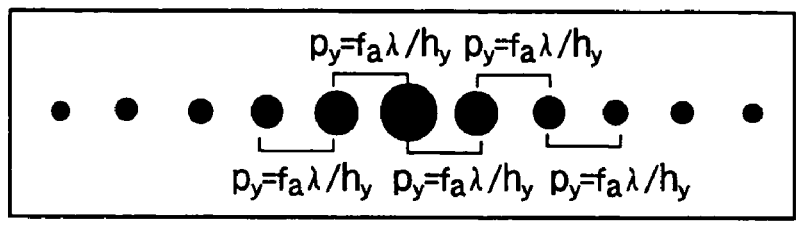
FIGS. 10A and 10B are schematic views illustrating the shift of the interval of the bright speck on the top surface of the photo detector, in a situation where focal distance shifted from $f_a$ to $f_b$ in response to the vibration of a one-dimensional diffraction grating.
Figure 10B:
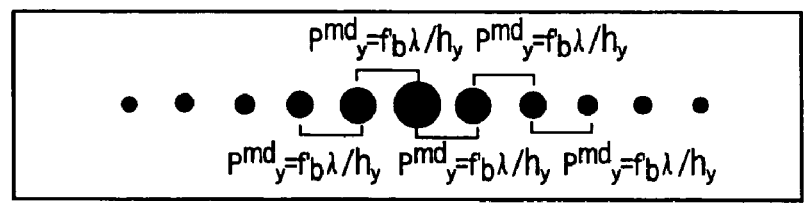

Again, FIGS. 10A and 10B show the shift of the inter-speck intervals as a one-dimensional array of circular spots, on the top surface of the photo detector 3 in a case in which the focal distance shifts from $f_a$ to $f_b$ with the vibration of a one-dimensional diffraction grating.

Now, in the opto-acoustoelectric device according to the first embodiment, imagine a situation in which a two-dimensional diffraction image is generated on the surface of the photo detector 3, which is implemented by the image sensor, at an arbitrary time $t=t_1$, as illustrated in FIG. 11A. In this situation, at time $t=t_1+t_2$ when sound pressure is applied, the diaphragm 2 sinks downward as shown in FIG. 11B. As a result, the diffraction image shifts. Next, the diaphragm 2 rebounds, passes through $t=t_1+t_2+t_3$, $t=t_1+t_2+t_3+t_4$, and returns to the starting position of the diaphragm 2 after $t=t_1+t_2+t_3+t_4+t_5$ as shown in FIGS. 11C to 11E. This is one period of the vibration of the diaphragm 2 corresponding to a specific frequency component of an input sound.

The vibration period of the diaphragm 2 can be attained by calculating the time of $t=t_1+t_2+t_3+t_4+t_5$. It is also possible to determine a period of a single vibration, after memorizing specific pixels (photo diodes) of the photo detector 3, which has established optical sensitivity, as time proceeds with vibration being applied to the diaphragm 2, by re-detecting the same specific pixel memorized in a photo diode array, because the specific pixel will re-establish the same optical sensitivity.

It is also possible to achieve a more highly sensitive detection by sequentially referencing a plurality of pixels implementing the photo diode array as a function of time. That is, a highly sensitive detection is achieved by detecting sequentially an array of pixels (photo diodes) so as to determine which pixel (photo diode) in the photo diode array establishes the optical sensitivity, for one period of vibration of the diaphragm 2.

In this manner, according to the opto-acoustoelectric device of the first embodiment, a signal directly corresponding to the amount of the vertical displacement $\Delta d$ of a diaphragm 2 is provided using periodically arranged photo diodes to detect the displacement of a diffraction image at minute intervals throughout the input of sound pressure. A more compact opto-acoustoelectric device can be provided at a lower cost by using the semiconductor manufacturing process to monolithically integrate the drive circuitry and the signal processing circuitry together on the same semiconductor chip that the photo detector 3 is merged in. Also, by forming the circuitry on the same chip, a system having a high sensitivity can be achieved. Furthermore, it becomes possible to reduce wiring resistance, thus achieving an opto-acoustoelectric device having high electrical stability.

Here, in order to achieve an even higher resolution in the two-dimensional displacement of the diffraction image, it is desirable to reduce the surface area of each pixel as well as the space in between the pixels. The array of pixels implants the photo detector 3.

Hereinafter, a manufacturing method of a mechanical vibration element, which implements the opto-acoustoelectric device of first embodiment, as shown in FIG. 2, will be described using FIGS. 12A to 12I. In addition, the manufacturing method of the mechanical vibration element put forth below is only one example. It is needless to state that there are various other feasible manufacturing methods of the mechanical vibration elements, including modifications of the following method of the mechanical vibration element.

Figure 12A:
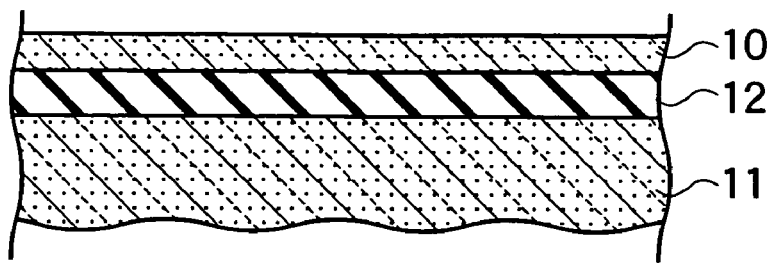
FIG. 12A is a cross-sectional view of a silicon on insulator (SOI) substrate on which a sequence of the manufacturing method of a mechanical vibration element is carried out. A mechanical vibration element implements an opto-acoustoelectric device according to the first embodiment of the present invention.
Figure 12B:
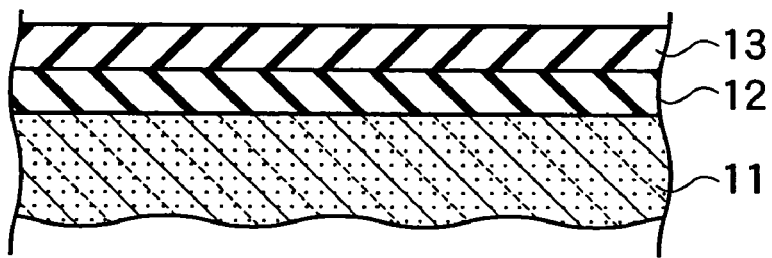
FIG. 12B is a cross-sectional view describing a process stage in a sequence of the manufacturing method of the mechanical vibration element, which implements the opto-acoustoelectric device according to the first embodiment of the present invention, in which a element-isolation dielectric film is deposited on a buried dielectric film (SOI oxide film) of the SOI substrate.

(a) As illustrated in FIG. 12A, the so-termed "SOI substrate" is prepared by stacking a buried dielectric film (SOI oxide film) 12, and a single crystal silicon layer (SOI layer) 10 in sequential order on a supporting substrate 11, the supporting substrate 11 is implemented by a single crystal silicon. Next, using a method such as reactive ion etching (RIE) technology for instance, the single crystal silicon layer 10 is selectively etched. Although the entire single crystal silicon layer 10 is shown appearing to have been etched away in FIG. 12A, a part of the single crystal silicon layer 10 disposed in regions allotted for the peripheral circuitry site remains. Next, using a method such as chemical vapor deposition (CVD) technology, an element-isolation dielectric film 13 is deposited and the surface of the element-isolation dielectric film 13 is planarized, using a method such as chemical mechanical polishing (CMP), as illustrated in FIG. 12B. At the peripheral circuitry site, the planarizing process shown in FIG. 12B defines the so-termed "active area" for implementing source and drain regions of the transistors, as the element-isolation dielectric film 13 surrounds the regions allotted for the peripheral circuitry, although the illustration of the peripheral circuitry site is omitted.

Figure 12C:
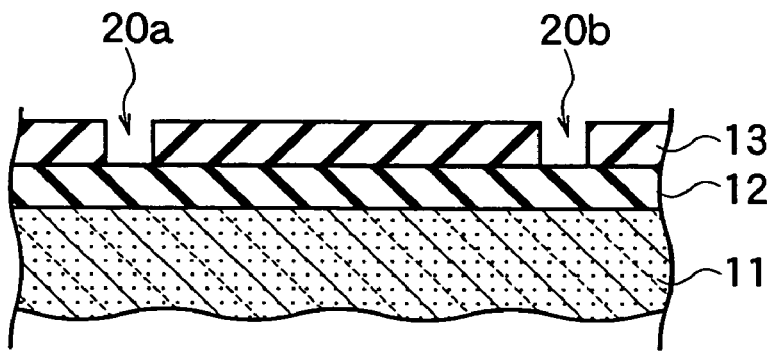
FIG. 12C is a cross-sectional view describing a process stage in a sequence of the manufacturing method of the mechanical vibration element, in which grooves are formed in the element-isolation dielectric film.
Figure 12D:
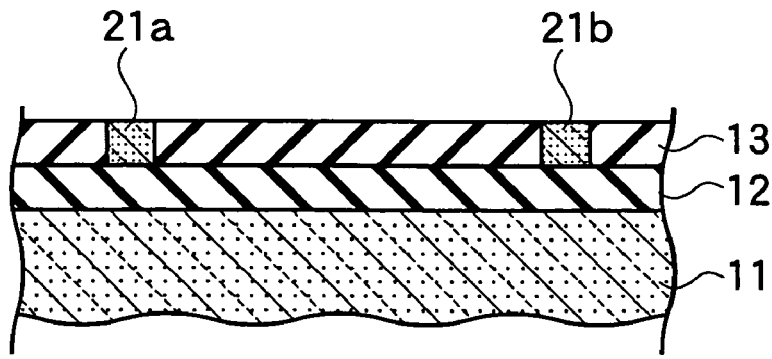
FIG. 12D is a cross-sectional view describing a process stage in a sequence of the manufacturing method of the mechanical vibration element, in which polysilicon connectors are buried in the grooves formed in the element-isolation dielectric film.

(b) Next, using a method such as RIE for instance, the element-isolation dielectric film 13 is selectively etched at the regions allotted for the formation of polysilicon connectors 21a, 21b shown in FIG. 2, so as to form grooves 20a, 20b as shown in FIG. 12C. The peripheral circuitry left out of illustration is usually built in at the same time using the standard MOS integrated-circuit manufacturing method. Although details are left out of the drawing, by thermal oxidization on the surface of the single crystal silicon 10 exposed as the active area a gate oxide film with a thickness of 50 nm–100 nm is formed. Vth control ion implantation may also be applied to the channel region under the gate oxide film. Next, using the CVD process, a polysilicon film is deposited on top of the entire surface of the gate oxide film, to a degree of 300 nm–600 nm, 400 nm for example. At this point, the polysilicon film fills in the grooves. 20a, 20b (See FIG. 12D). Next, on the surface of the polysilicon film, a photoresist film is spin-coated. Then, the photoresist film is delineated using photolithography process. Then the polysilicon film is selectively etched with a method such as RIE, using the photoresist film as a mask, to form the gate electrode and polysilicon wiring (not shown). After that, the photoresist film is removed and on the surface of the gate electrode a new photoresist film is spin coated. Then using photolithography process, windows used for ion implantation are opened on the peripheral circuitry site, in which MOS transistors are formed, so as to expose the polysilicon gate electrodes of the MOS transistors. Next using the exposed polysilicon gate electrodes and the new photoresist film as a mask, arsenic ions ($^{75}As^+$) at a dose order of $10^{15}$ $cm^{-2}$ are implanted. The polysilicon gate electrodes are also implanted with the arsenic ($^{75}As^+$) ions at this time. After etching away the new photoresist film, the single crystal silicon layer 10 is annealed to activate and diffuse the implanted impurity ions. Then the n-type source and n-type drain regions are formed on the active area of the single crystal silicon 10 at the peripheral circuitry site. Note however that the illustration of the active area of the single crystal silicon 10, the n-type source regions, n-type drain regions, n-type impurity regions and p-type impurity regions are omitted. Employing planarizing processes such as etchback method, as needed, the grooves 20a, 20b are buried with the polysilicon film.

(c) Next, an interlayer dielectric film 14 is deposited over the entire surface of the element-isolation dielectric film 13, as shown in FIG. 12E. The interlayer dielectric film 14 is even deposited on the polysilicon gate electrodes in the region allotted for the peripheral circuitry site, which is omitted from the drawing. After forming the interlayer dielectric film 14 over the whole surface, the surface of the interlayer dielectric film 14 is planarized with the CMP method. Further, a passivation film 15 is formed over the interlayer dielectric film 14 using the CVD process, as shown in FIG. 12F.

(d) Next as shown in FIG. 12G, using methods such as photolithography process and RIE, the passivation film 15 is selectively etched so as to form holes Hi1, $H_{i,2}$, ..., which establish the reflection-type two-dimensional diffraction grating. As shown in FIG. 12G, grooves 22a, 22b are formed at a location above polysilicon connectors 21a, 21b and their periphery.

Figure 12H:
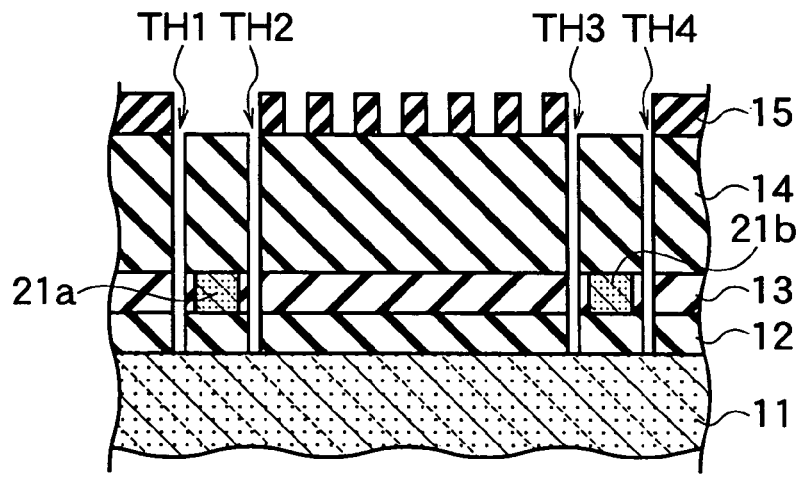
FIG. 12H is a cross-sectional view showing a process stage, in which a plurality of piercing slits, which penetrates the interlayer dielectric film, the element-isolation dielectric film and the buried dielectric film, are formed in the sequence of the manufacturing method of the mechanical vibration element.

(e) Using a photolithography process, and an etching processes such as RIE and electron cyclotron resonance (ECR) ion etching, the interlayer dielectric film 14, the element-isolation dielectric film 13, and the buried dielectric film (SOI oxide film) 12 are selectively etched vertically, from the position disposed at bottom corners of the respective grooves 22a, 22b, so as to form piercing slits TH1, TH2, TH3, TH4 as shown in FIG. 12H.

Figure 12I:
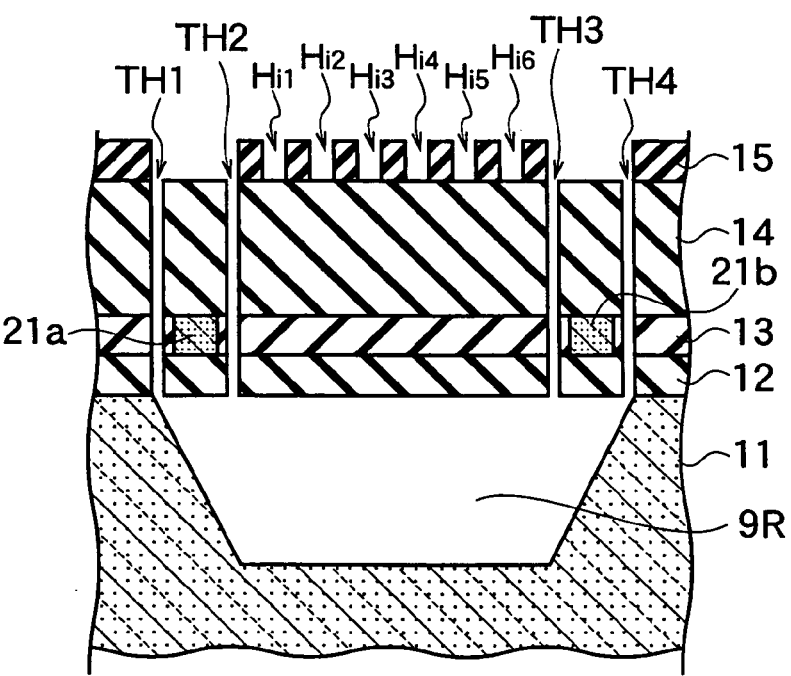
FIG. 12I is a cross-sectional view showing a process stage, in which a cavity is formed at a surface of and in the supporting substrate in the sequence of the manufacturing method of the mechanical vibration element.

(f) A bathtub-shaped cavity 9R is formed by performing anisotropic etching, injecting an anisotropic etchant solution such as tetramethylammonium hydroxide (TMAH) for instance, into piercing slits TH1, TH2, TH3, TH4 so as to anisotropically etch the surface of the supporting substrate (single crystal silicon substrate) 11 exposed at the bottom of the piercing slits TH1, TH2, TH3, TH4 as illustrated in FIG. 12I. Thus completing the mechanical vibration element, which implements the opto-acoustoelectric device according to the first embodiment of the present invention. The cavity 9R may be dry etched by injecting etching gas such as xenon difluoride ($KeF_2$) gas through the piercing slits TH1, TH2, TH3, TH4 to etch the surface of the supporting substrate 11 exposed at the bottom of the piercing slits TH1, TH2, TH3, TH4.

<First Modification of the First Embodiment>

Figure 13:
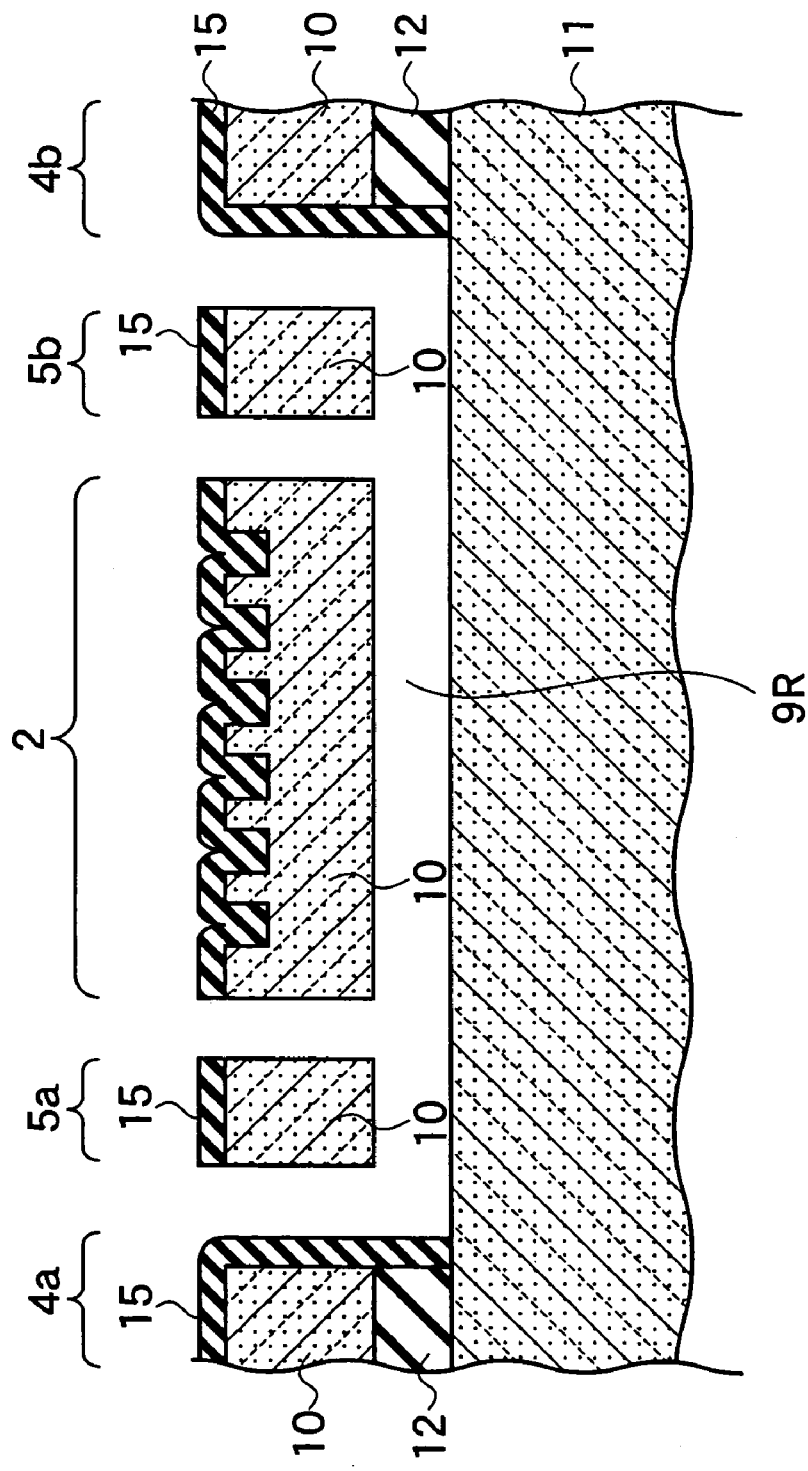
FIG. 13 is a cross-sectional view illustrating a concrete example of the structure of a mechanical vibration element, which implements an opto-acoustoelectric device according to according to a modification (first modification) of the first embodiment of the present invention.

FIG. 13 shows a cross-sectional view of a mechanical vibration element, which implements the opto-acoustoelectric device according to a modification (first modification) of the first embodiment of the present invention. In the same manner as the configuration shown in FIG. 2, the mechanical vibration element embraces a diaphragm 2 suspended by elastic connectors 5a, 5b from immovable members 4a, 4b, which are established on a supporting substrate 11. Immovable members 4a, 4b are established in a picture-frame like fashion on the surface of the supporting substrate 11. The diaphragm 2 of the mechanical vibration element is a thin film disposed to cover a cavity 9R like a lid Immovable members 4a, 4b are implemented by a buried dielectric film 12, a single crystal silicon layer (SOI layer) 10, and a passivation film 15 all deposited above the supporting substrate 11 in sequential order. The diaphragm 2 is a layered structure embracing the single crystal silicon layer 10 and the passivation film 15. Elastic connectors 5a and 5b are also layered structures embracing the single crystal silicon 10 and the passivation film 15.

When detecting the vibrational displacement Δd of the diaphragm 2 by light signal, the diaphragm vibrates in response to sound pressure, there is no need for light-path guiding elements even if one uses the diaphragm 2 possessing a reflection-type diffraction grating as shown in FIG. 13. This is because the diffraction associated with the diaphragm 2 possesses self-focusing capability. Also, it is possible to transform the vertical displacement of the diaphragm 2 to two-dimensional horizontal displacement on a surface of the photo diode array to achieve the detection.

Hereinafter, the manufacturing method of the mechanical vibration element, which implements the opto-acoustoelectric device according to the first modification will be described using FIGS. 14A to 14G. In addition, the manufacturing method of the mechanical vibration element put forth below is only one example. It is needless to state that various other manufacturing methods of the mechanical vibration elements are feasible as well.

Figure 14A:
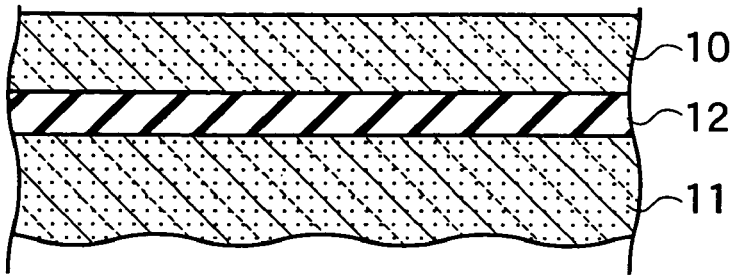
FIGS. 14A to 14G are cross-sectional views describing corresponding process stages in a sequence of the manufacturing method of the mechanical vibration element, which implements the opto-acoustoelectric device according to the first modification of the first embodiment of the present invention.
Figure 14B:
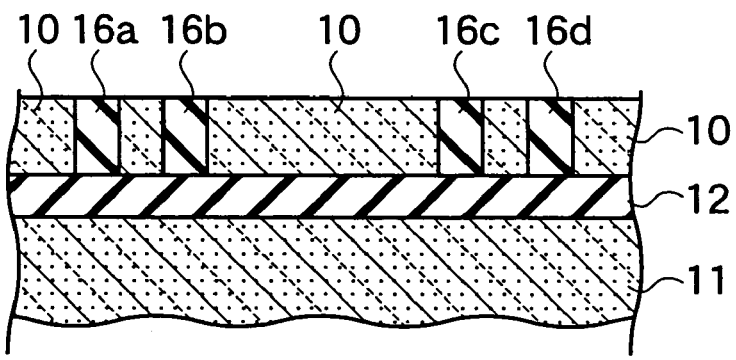

(a) As illustrated in FIG. 14A, first, an SOI substrate is provided by sequentially stacking a buried dielectric film (SOI oxide film) 12, and a single crystal silicon layer (SOI layer) 10 in this order on a supporting substrate 11, which is made of single crystal silicon. Next using a photolithography process, part of the single crystal silicon 10 is selectively etched to form grooves using a method such as an RIE for instance. With this selective etching, the element-isolation grooves are also defined in the single crystal silicon 10 at the parts allotted for the element-isolation region. Next, using a method such as CVD, the grooves are buried with silicon oxide film ($SiO_2$ film) as the element-isolation dielectric films 16a, 16b, 16c, 16d, and the surface of the single crystal silicon 10 and the element-isolation dielectric films 16a, 16b, 16c, 16 are planarized using a method such as CMP technology, as shown in FIG. 14B. The planarizing process shown in FIG. 14B defines the active area, as the element-isolation dielectric film surrounds the active areas allotted for the peripheral circuitry (In the following description, mention of peripheral circuitry is omitted).

Figure 14C:
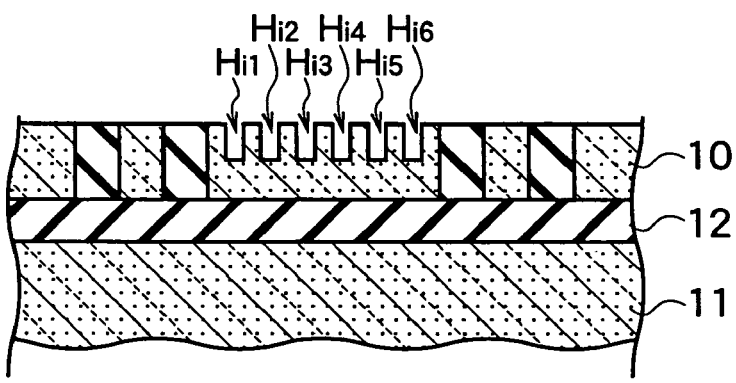

(b) Next, using methods such as photolithography process or RIE, the single crystal silicon layer 10 is selectively etched so as to form the holes $H_{i1}$, $H_{i,2}$, . . . $H_{i6}$, which implement the reflection-type two-dimensional diffraction grating. This time the bottom level of the holes $H_{i1}$, $H_{i,2}$, . . . , $H_{i6}$ is formed at a depth higher than the bottom level of the single crystal silicon layer 10, as shown in FIG. 14C.

Figure 14D:
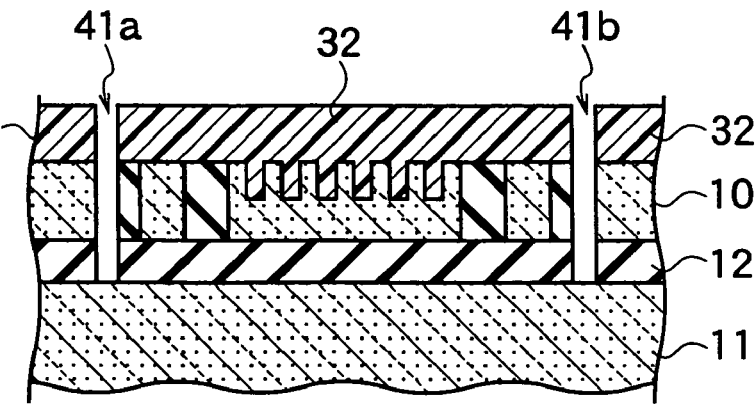

(c) Next, a photoresist film 32 is coated and the photoresist film 32 is then delineated using the photolithography process. Using the photoresist film 32 as a mask, the single crystal silicon layer 10 and the buried dielectric film 12 is selectively etched with a method such as RIE to form grooves 41a, 41b, as shown in FIG. 14D.

Figure 14E:
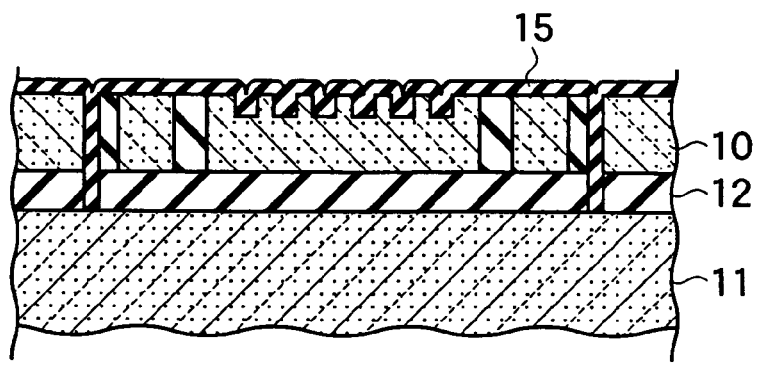
Figure 14F:
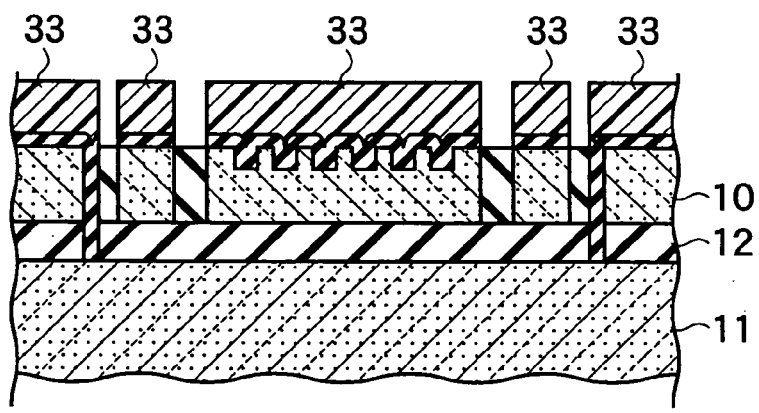

(d) Next, using a method such as reduced-pressure CVD, a passivation film 15 made of silicon nitride film ($Si_3N_4$ film) is deposited so as to bury the holes $H_{i1}$, $H_{i,2}$, . . . , $H_{i6}$ and the grooves 41a, 41b, as shown in FIG. 14E. Further, after coating with a new photoresist film 33 on the passivation film 15, the new photoresist film 33 is delineated by the photolithography process, and part of the passivation film ($Si_3N_4$ film) 15 is selectively etched using the photoresist film 33 as an etching mask, as shown in FIG. 14F.

Figure 14G:
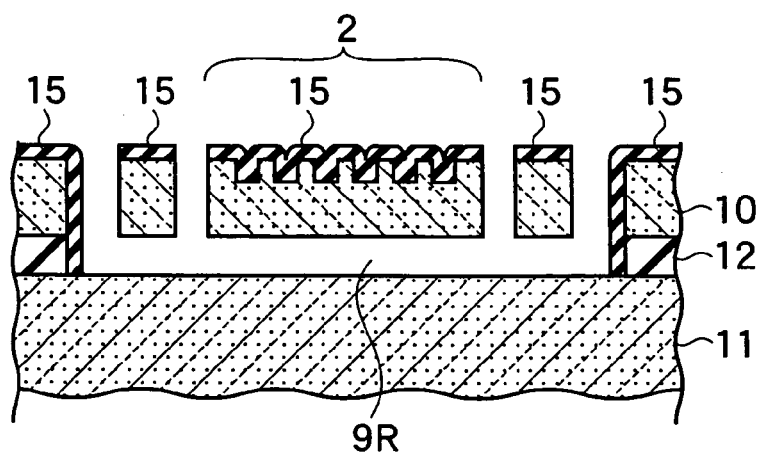

(e) After removing the photoresist film 33, using the silicon nitride film ($Si_3N_4$ film) covering the sidewall of the buried dielectric film 12 as an etching mask, the silicon oxide film ($SiO_2$ film) serving as the element-isolation dielectric films 16a, 16b, 16c, 16d, and the buried dielectric film 12 are selectively etched. This will selectively form a plat cavity 9R under the diaphragm 2, as shown in FIG. 14G. Thus completes the mechanical vibration element, which implements the opto-acoustoelectric device according to the first modification of the first embodiment of the present invention.

<Second Modification of the First Embodiment>

Figure 15:
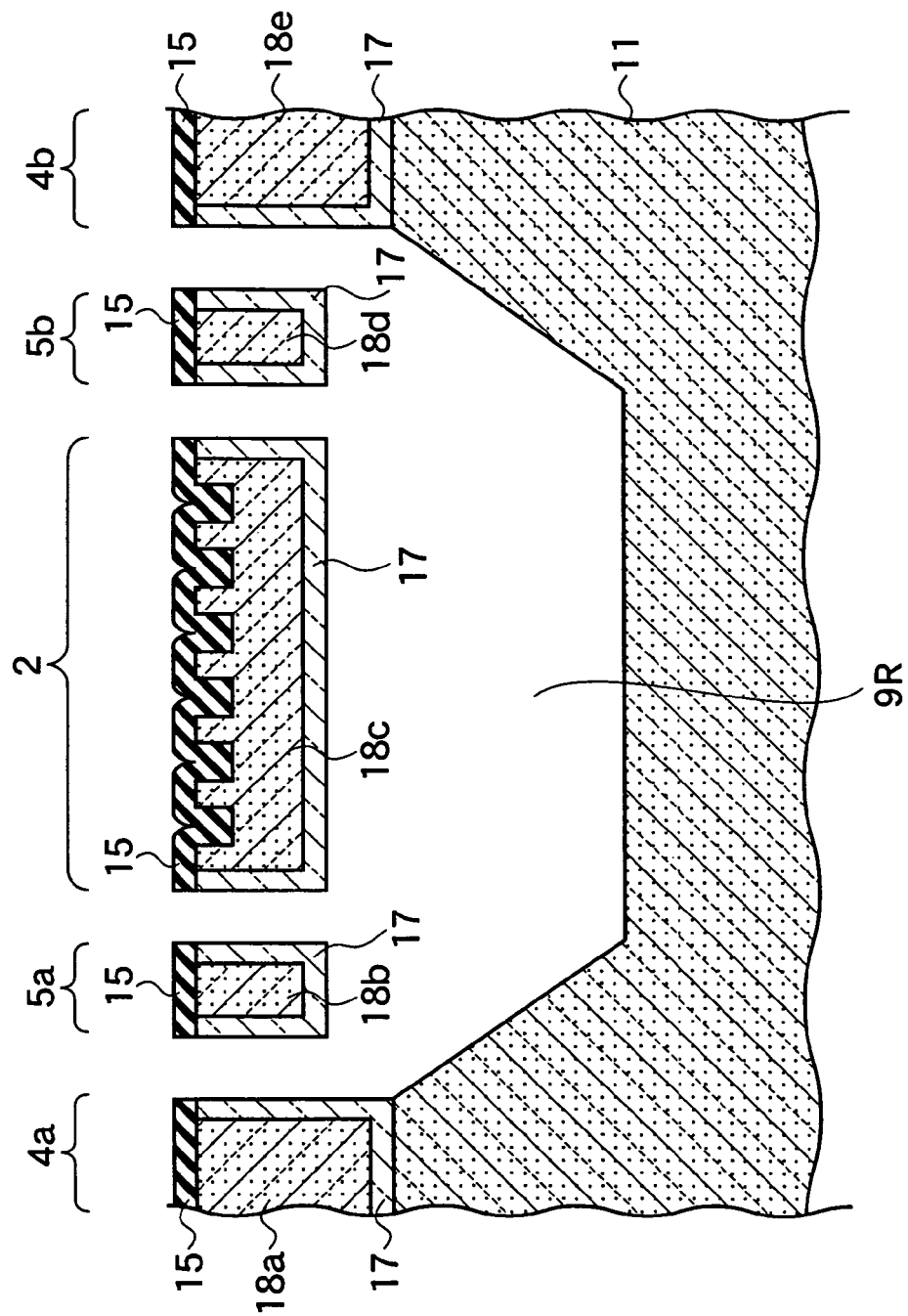
FIG. 15 is a cross-sectional view illustrating a concrete example of the structure of a mechanical vibration element, which implements an opto-acoustoelectric device according to another modification (second modification) of the first embodiment of the present invention.

FIG. 15 shows a cross-sectional view of a mechanical vibration element, which implements another opto-acoustoelectric device according to another modification (second modification) of the first embodiment of the present invention. In the same manner as in FIGS. 2 and 13, the mechanical vibration element embraces a diaphragm 2 suspended by elastic connectors 5a, 5b from immovable members 4a, 4b, which are established on a supporting substrate 11. The immovable members 4a, 4b are established in a picture-frame like fashion on the surface of the supporting substrate 11. The diaphragm 2 is a thin film disposed to cover a bathtub-shaped cavity 9R like a lid. The immovable members 4a, 4b encompasses a silicon nitride film ($Si_3N_4$ film) 17, buried-silicon layers 18a, 18e, which are made of a polysilicon layer, and a passivation film 15 each deposited above the supporting substrate 11 in sequential order. The diaphragm 2 is a layered structure including the $Si_3N_4$ film 17, the buried silicon layer 18c, which is a polysilicon layer, and the passivation film 15. Elastic connectors 5a and 5b are layered structures embracing the $Si_3N_4$ film 17, the buried silicon layers 18b, 18d, which are implemented by a polysilicon layer, and the passivation film 15.

When detecting optically the vibrational displacement $\Delta d$ of the diaphragm 2, the diaphragm is vibrating in response to sound pressure, there is no need for light-path guiding elements according to the configuration of the second modification of the first embodiment, in which the diaphragm 2 has a reflection-type diffraction grating, as shown in FIG. 15. This is because the diffraction associated with the diaphragm 2 possesses self-focusing capability. Also, it is possible to transform the vertical displacement of the diaphragm 2 to two-dimensional horizontal displacement on a surface of the photo diode array, which is configured to detect diffracted light.

Hereinafter, the manufacturing method of the mechanical vibration element, which implements the opto-acoustoelectric device according to the second modification of the first embodiment of the present invention, will be described using FIGS. 16A to 16I. In addition, the manufacturing method of the mechanical vibration element put forth below is only one example. It is needless to state that various other manufacturing methods of the mechanical vibration elements are feasible as well.

Figure 16A:
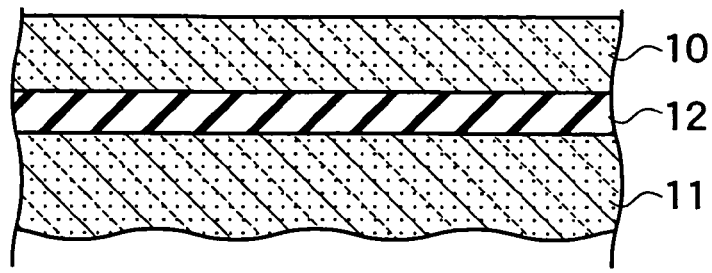
FIGS. 16A to 16I are cross-sectional views describing corresponding process stages in a sequence of the manufacturing method of the mechanical vibration element, which implements the opto-acoustoelectric device according to the second modification of the first embodiment of the present invention.
Figure 16B:
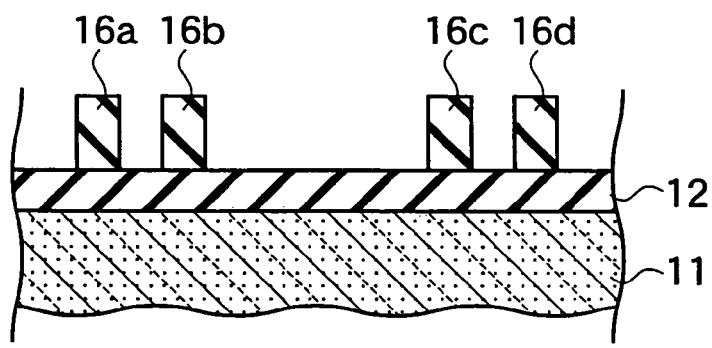

(a) As illustrated in FIG. 16A, first, an SOI substrate is prepared by sequentially stacking a buried dielectric film (SOI oxide film) 12, and a single crystal silicon layer 10 in this order on a supporting substrate 11, the supporting substrate 11 is made of single crystal silicon. Next using photolithography process, part of the single crystal silicon 10 is selectively etched to form grooves using a method such as RIE process for instance. With this selective etching, the element-isolation grooves are also defined in the single crystal silicon 10 at the parts allotted for the element-isolation region. Next, using a method such as CVD, the grooves are buried with silicon oxide film ($SiO_2$ film) as the element-isolation dielectric films 16a, 16b, 16c, 16d, and the surface of the single crystal silicon 10 and the element-isolation dielectric films 16a, 16b, 16c, 16 are planarized using a method such as CMP technology. The planarizing process defines the active area, as the element-isolation dielectric film surrounds the active areas allotted for the peripheral circuitry (In the following description, mention of peripheral circuitry is omitted). Further, the single crystal silicon layer 10 is selectively etched so as to leave rectangular ridges of the element-isolation dielectric films 16a, 16b, 16c, 16d, as shown in FIG. 16B. Although as if the single crystal silicon layer 10 is completely etched away in FIG. 16B, the single crystal silicon layer 10 remains in regions allotted for the peripheral circuitry, because, with aid of a photolithography process, the single crystal silicon layer 10 is selectively covered by a photoresist film so as to form a window of the photoresist film in the regions allotted for the diffraction grating.

Figure 16C:
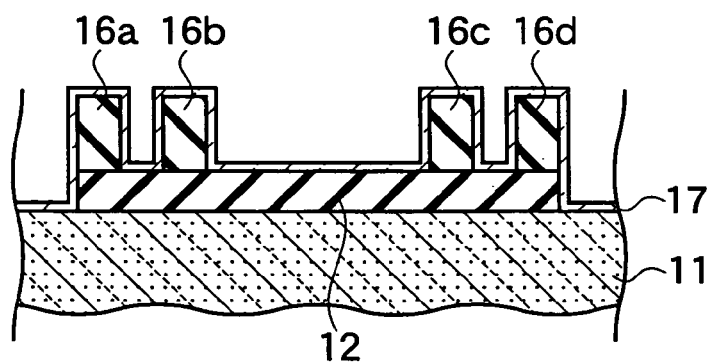

(b) Next, using methods such as a photolithography process and RIE, the buried dielectric film 12 is selectively etched. After that, using the CVD process, the silicon nitride film ($Si_3N_4$ film) 17 is blanketly deposited, as shown in FIG. 16C.

Figure 16D:
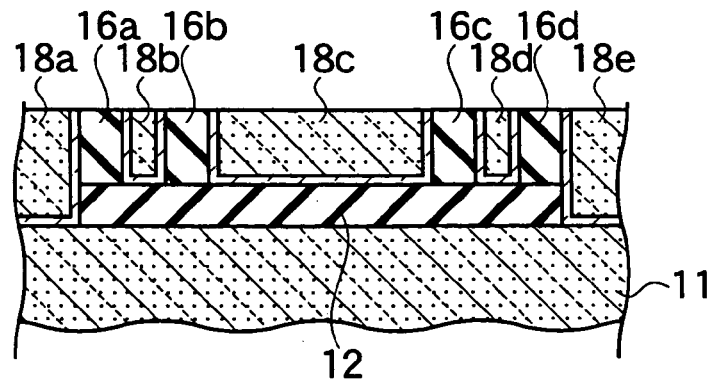

(c) Using a CVD process, the polysilicon layer is deposited over the entire surface of the $Si_3N_4$ film 17, then using a method such as a CMP process, the surface of the polysilicon layer is planarized until the surfaces of the element-isolation dielectric films 16a, 16b, 16c, 16d are exposed, as illustrated in FIG. 16D. As a result, the buried-silicon layer 18a, 18b, 18c, 18d, 18e, which is made of a polysilicon layer is buried in between the element-isolation dielectric films 16a, 16b, 16c, 16d.

Figure 16E:
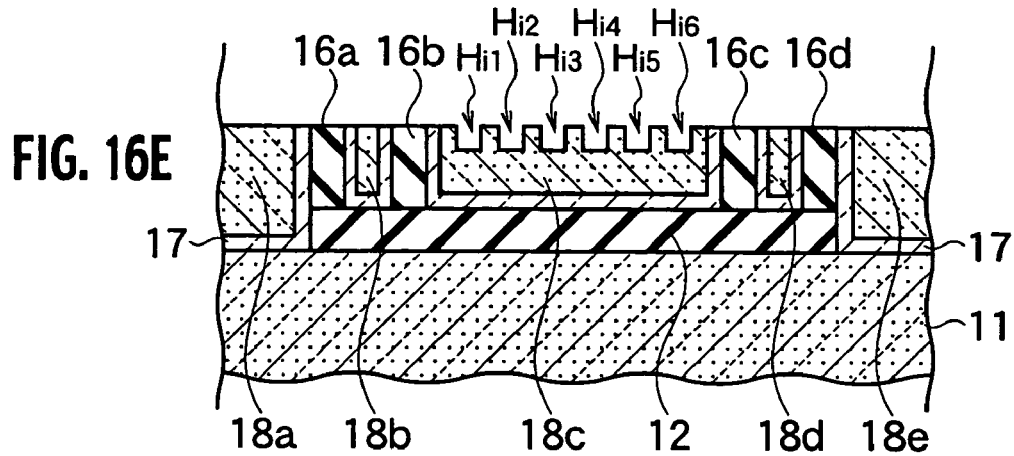
Figure 16F:
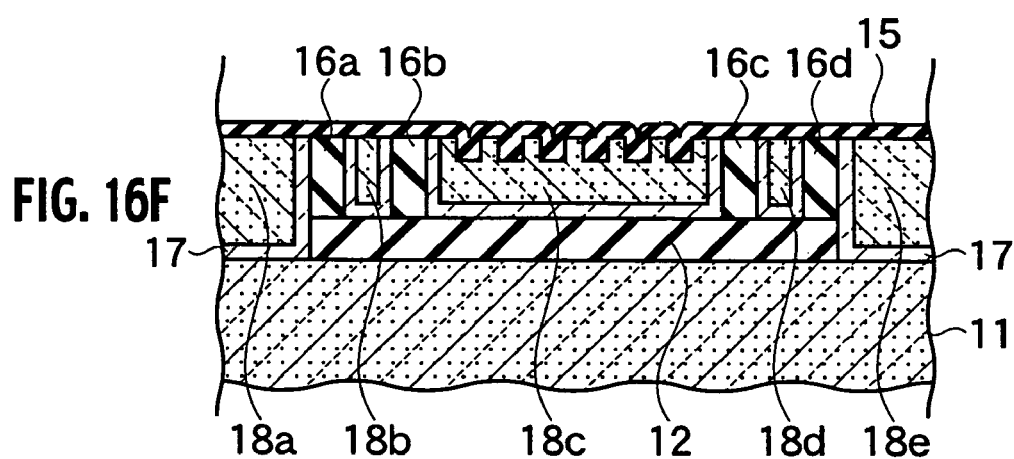

(d) Next, using methods such as photolithography process and RIE, part of the buried-silicon layer 18c is selectively etched to form the holes $H_{i1}, H_{i,2}, \ldots, H_{i6}$, which implement the reflection-type two-dimensional diffraction grating. This time, the bottom of the holes $H_{i1}, H_{i,2}, \ldots, H_{i6}$ is formed at a depth higher than the bottom of the single crystal silicon layer 10, as shown in FIG. 16E. Further, using methods such as CVD, a $Si_3N_4$ film as the passivation film 15 is deposited over the surface filling in the holes $H_{i1}, H_{i,2}, \ldots, H_{i6}$, as shown in FIG. 16F.

Figure 16G:
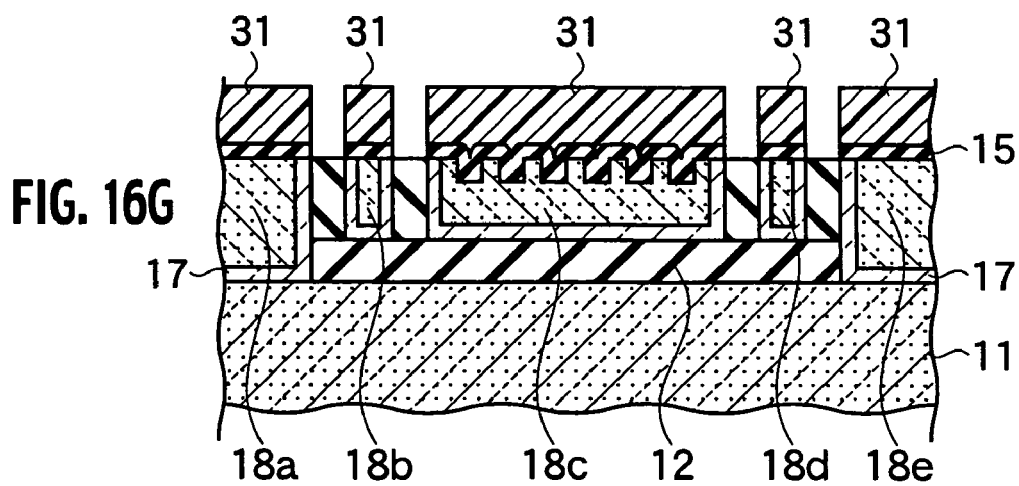

(e) Next, a photoresist film 31 is coated on the passivation film 15, and then the photoresist film 31 is delineated using photo photolithography process. Using the photoresist film 31 as a mask, part of the passivation film 15 is selectively etched on the surface of the element-isolation dielectric films 16a, 16b, 16c, 16d with a method such as RIE, as shown in FIG. 16G.

Figure 16H:
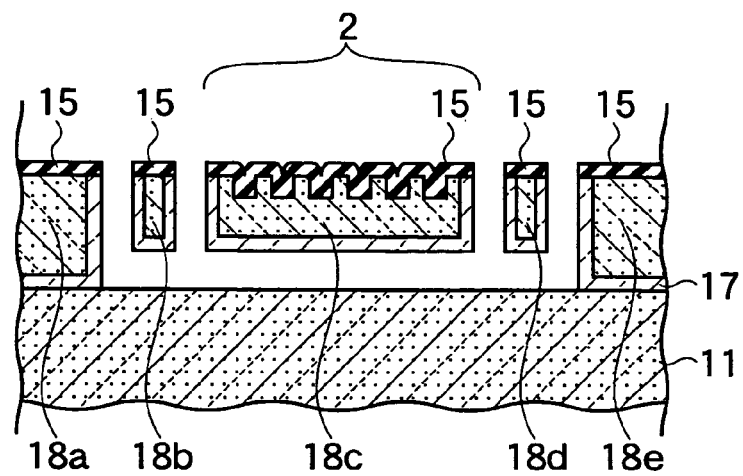
Figure 16I:
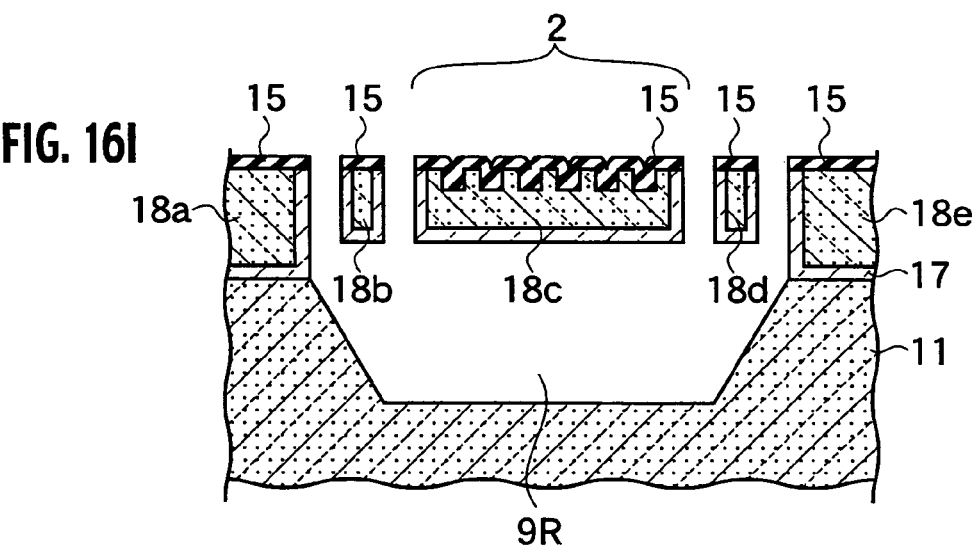

(f) Next, the photoresist film 31 is removed. Using the passivation film ($Si_3N_4$ film) 15 and the $Si_3N_4$ film 17 as a mask, the element-isolation dielectric films 16a, 16b, 16c, 16d and the silicon oxide film ($SiO_2$ film) serving as the buried dielectric film 12 are etched away. This will selectively form a flat hollow space under the diaphragm 2, as shown in FIG. 16H. The bathtub-shaped cavity 9R is further established beneath the diaphragm 2 by performing anisotropic etching using an anisotropic etchant solution such as TMAH for instance, on the part of the surface of the supporting substrate (single crystal silicon) 11 exposed by the previous etching as shown in FIG. 16I. Thus completing the mechanical vibration element, which implements the opto-acoustoelectric device according to the second modification of the first embodiment. The cavity 9R may be dry etched by injecting etching gas such as xenon difluoride ($KeF_2$) gas through the flat hollow space to etch the surface of the supporting substrate 11 exposed at the bottom of the flat hollow space.

<Third Modification of the First Embodiment>

Figure 17:
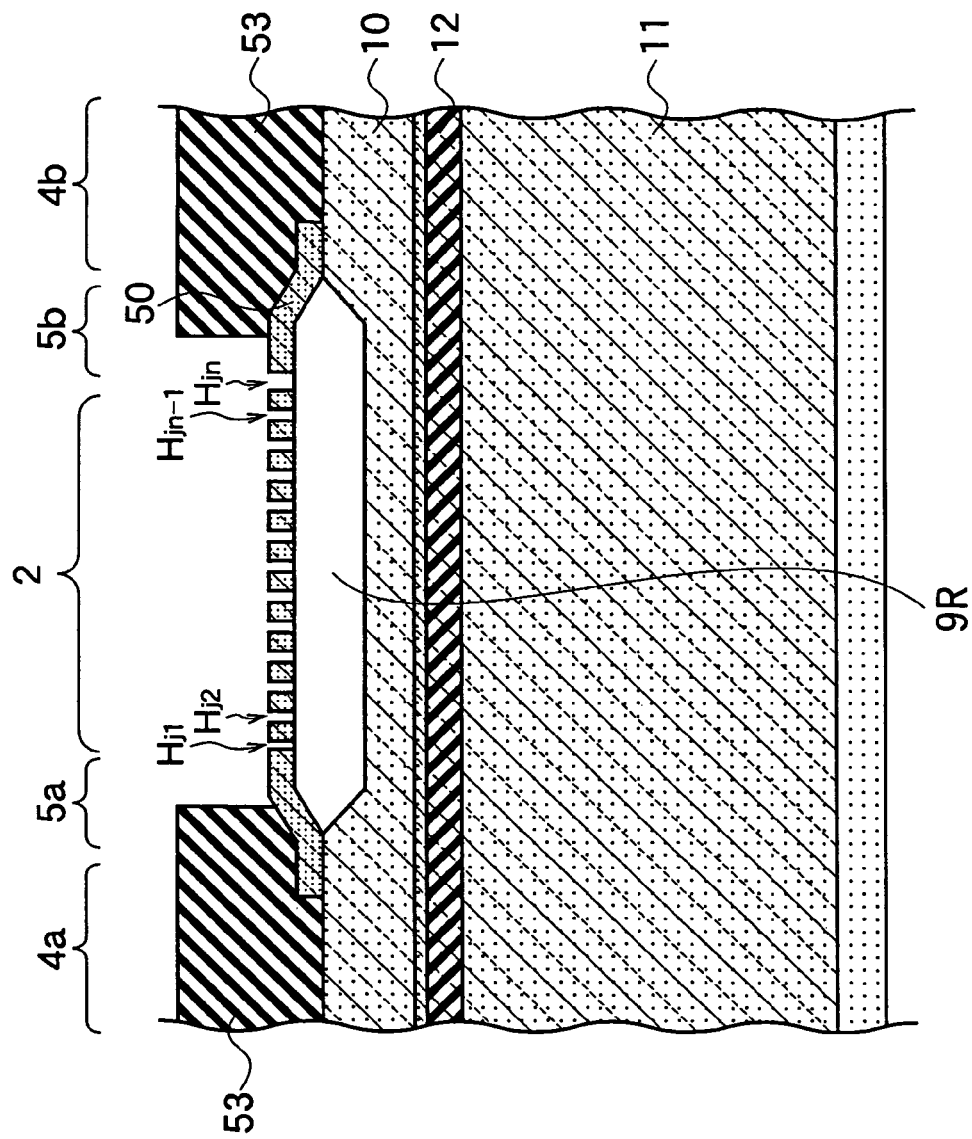
FIG. 17 is a cross-sectional view illustrating a concrete example of the structure of a mechanical vibration element, which implements an opto-acoustoelectric device according to yet another modification (third modification) of the first embodiment of the present invention.

FIG. 17 shows a cross-sectional view of a mechanical vibration element, which implements the opto-acoustoelectric device according to yet another modification (third modification) of the first embodiment of the present invention. The mechanical vibration element according to the third modification is established on the surface of the SOI substrate having an buried dielectric film (SOI oxide film) 12, and a single crystal silicon layer (SOI layer) 10 sequentially stacked in this order on a supporting substrate 11, the supporting substrate 11 is made of single crystal silicon. Immovable members 4a, 4b of the mechanical vibration element according to the third modification are established surrounding a double-convex-shaped cavity double-convex-shaped cavity 9R established on the surface of the single crystal silicon layer 10 in a picture-frame like fashion. A diaphragm 2 is formed above the double-convex-shaped cavity 9R having a flat bridge-like structure that is convex on top. The diaphragm 2 is a thin film made of a polysilicon layer 50. Holes $H_{i1}, H_{i,2}, H_{i6}$ are opened on the polysilicon layer 50 so as to implement the reflection-type two-dimensional diffraction grating. The immovable members 4a and 4b are each formed by the SOI substrate and a passivation layer 53 above the SOI substrate. Elastic connectors 5a and 5b are formed to use the slanted part of the edge of the polysilicon layer 50, which has a bridge-like structure.

When detecting vibration displacement Δd of the diaphragm 2 by light signal, the diaphragm vibrates in response to sound pressure, and there is no need for light-path guiding elements for the configuration of the mechanical vibration element, in which the diaphragm 2 has a reflection-type diffraction grating, as shown in FIG. 17. This is because the diffracted light associated with the diaphragm 2 possesses self-focusing capability. Also, it is possible to transform the vertical displacement of the diaphragm 2 to two-dimensional horizontal displacement on a surface of the photo diode array, which is configured to detect diffracted light.

The structure of the mechanical vibration element according to the third modification, which is shown in FIG. 17 can be obtained simply by previously burying within it a sacrificial oxide film in the shape of the double-convex-shaped cavity 9R, depositing the polysilicon layer 50 on the top surface of it, then opening the holes $H_{i,1}, H_{i,2}, H_{i,3}, \ldots H_{i,6}$, that implement the two-dimensional diffraction grating, and using the holes $H_{i,1}, H_{i,2}, H_{i,3}, \ldots, H_{i,6}$, injecting etchant to etch away the sacrificial oxide film.

(Second Embodiment)

Figure 18:
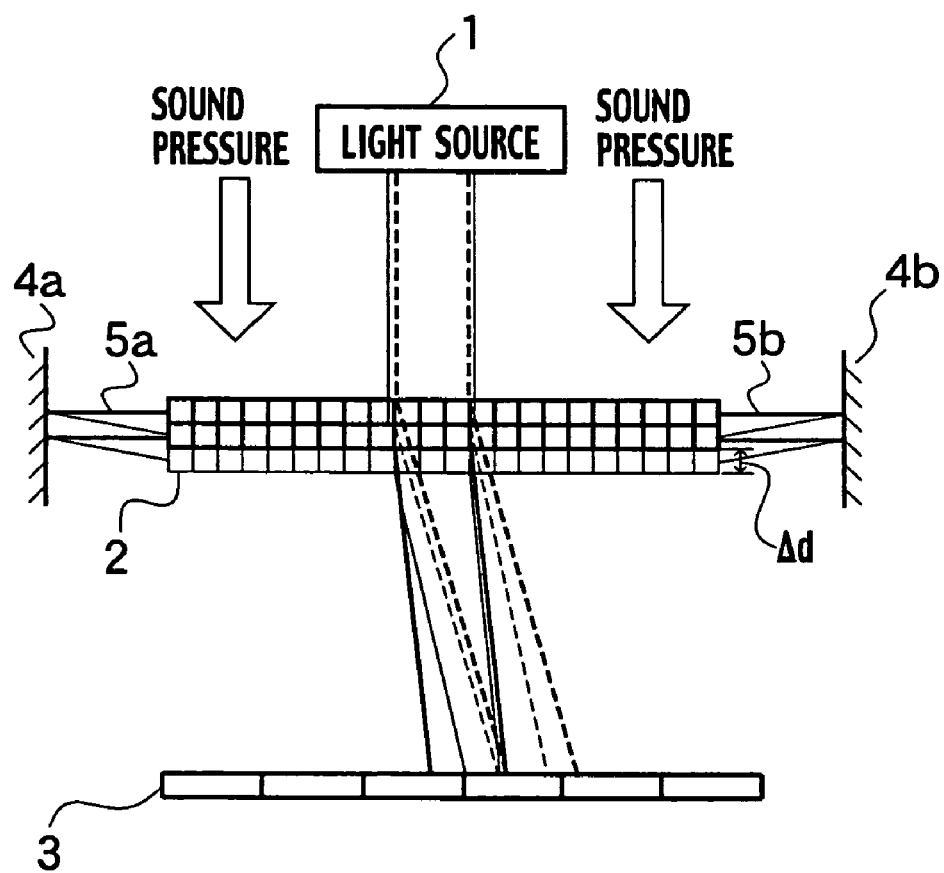
FIG. 18 is a schematic view illustrating a configuration of an opto-acoustoelectric device according to a second embodiment of the present invention.

As illustrated in FIG. 18, an opto-acoustoelectric device according to a second embodiment of the present invention encompasses a diaphragm 2 having a transmission-type diffraction grating that vibrates in response to sound pressure, a light source 1 configured to expose the diffraction grating to light, and a photo detector 3 configured to detect the light diffracted by the diffraction grating and convert it into an electric signal. A feature such that the transmission-type diffraction grating is formed onto the diaphragm 2 differs with the feature of the opto-acoustoelectric device according to the first embodiment. Another features such that the diaphragm 2 is suspended by elastic connectors 5a, 5b from immovable members 4a, 4b is identical to the features of the opto-acoustoelectric device according to the first embodiment.

In the same manner as in the first embodiment, it is desirable to use an image sensor such as a photo diode array for the photo detector 3 shown in FIG. 18. More specifically, the photo detector 3 does not detect differences lo in light intensity. Instead the photo detector 3 detects the two-dimensional displacement, which corresponds to the vertical displacement of the diaphragm, by sensing the pattern of the two-dimensional diffraction image. Thus the image sensor is ensured a sufficiently wide area for diffracted light so that it is possible to fully and completely detect the two-dimensional diffraction image. On the opto-acoustoelectric device according to the second embodiment of the present invention, when the light beamed from the light source 1 is incident upon the diaphragm 2, which because transmission-type diffraction grating is formed upon it, light waves beamed from the light source 1 pass through the diaphragm 2 and produce a two-dimensional diffraction image on the top surface of the photo detector 3.

FIG. 18 shows a situation where the diaphragm 2 vibrates vertically in response to sound input, shifting the two-dimensional diffraction image on the top surface of the photo detector 3. When the diaphragm 2 is motionless, that is, in a situation where there is no sound input, light is beamed from the light source 1, which causes the diffraction image to appear on the top surface of the photo detector 3 spanning the interval shown between the thick solid and dashed lines of FIG. 18. Next, if sound pressure is input in this situation, the diaphragm 2 vibrates vertically using the boundaries between the elastic connectors 5a, 5b and the immovable members 4a, 4b as fulcrums. When the vertical vibration of the diaphragm 2 is generated, distance "f" between the diaphragm 2 and the photo detector 3 shifts, and the interval of the diffraction image on the top surface of the photo detector 3 changes two-dimensionally along a horizontal plane, as illustrated by the thin solid and dashed lines. The thin solid and dashed lines of FIG. 18 illustrate the shift of the interval of the diffraction image brought about by vibration of the diaphragm 2.

Concerning the diffraction image obtained from the photo detector 3, if one observes diffraction images having identical degree and orientation, the photo detector 3 can find differences in diffraction images throughout the span of the vibration. The photo detector 3 is configured to detect the displacement of the diffraction image being generated on the surface of the photo detector 3, and provides an electric signal corresponding to the vertical displacement Δd of the diaphragm 2. In these times, regardless of whether the diaphragm 2 is motionless or vibrating, the photo detector 3 detects the continuous vibrations of the diaphragm 2 and provides an output signal. The diaphragm 2, having a diffraction grating formed upon it, is configured to display flat characteristics in response to all frequencies of mechanical vibration. It is also acceptable however, to use a structure having a broad bandwidth that is highly sensitive to the frequencies of the mechanical vibration. This is accomplished by establishing a plurality of diaphragms 2, wherein the masses of each diaphragm vary, as do the spring constants of the elastic connectors 5a, 5b, which link the diaphragm 2 to the immovable members 4a, 4b.

Also, it is possible to produce the diffraction-grating merged diaphragm 2 using the same semiconductor-manufacturing process as for the photo detector 3 and its peripheral circuitry. In forming the diffraction grating of the diaphragm 2, by cutting grooves/grating on the diaphragm 2, it is useful to employ the semiconductor manufacturing process. By using the semiconductor manufacturing process, it becomes possible to form a diffraction grating possessing an arbitrary number of grating periods, having good reproducibility and suited to mass production. Also, it possesses a variety of physical properties, which makes it possible to alter the mass or spring constant of the diaphragm 2 with ease. Imagine an instance in which silicon (Si) is used for the diaphragm 2, and a laser with a wavelength below $\lambda=1000$ nm is used for the light source 1. In this instance, if the sidewalls of the grating are coated selectively with a highly reflective material so as to leave bare silicon top surfaces, the incident light beamed onto the bare silicon top surfaces will be absorbed by silicon, only the light reflected by the sidewalls of the grating serves as the diffracted light, which will reach to the photo detector 3. This cuts the stray light to the photo detector 3, which as a result makes it possible to improve the S/N ratio.

Figure 19:
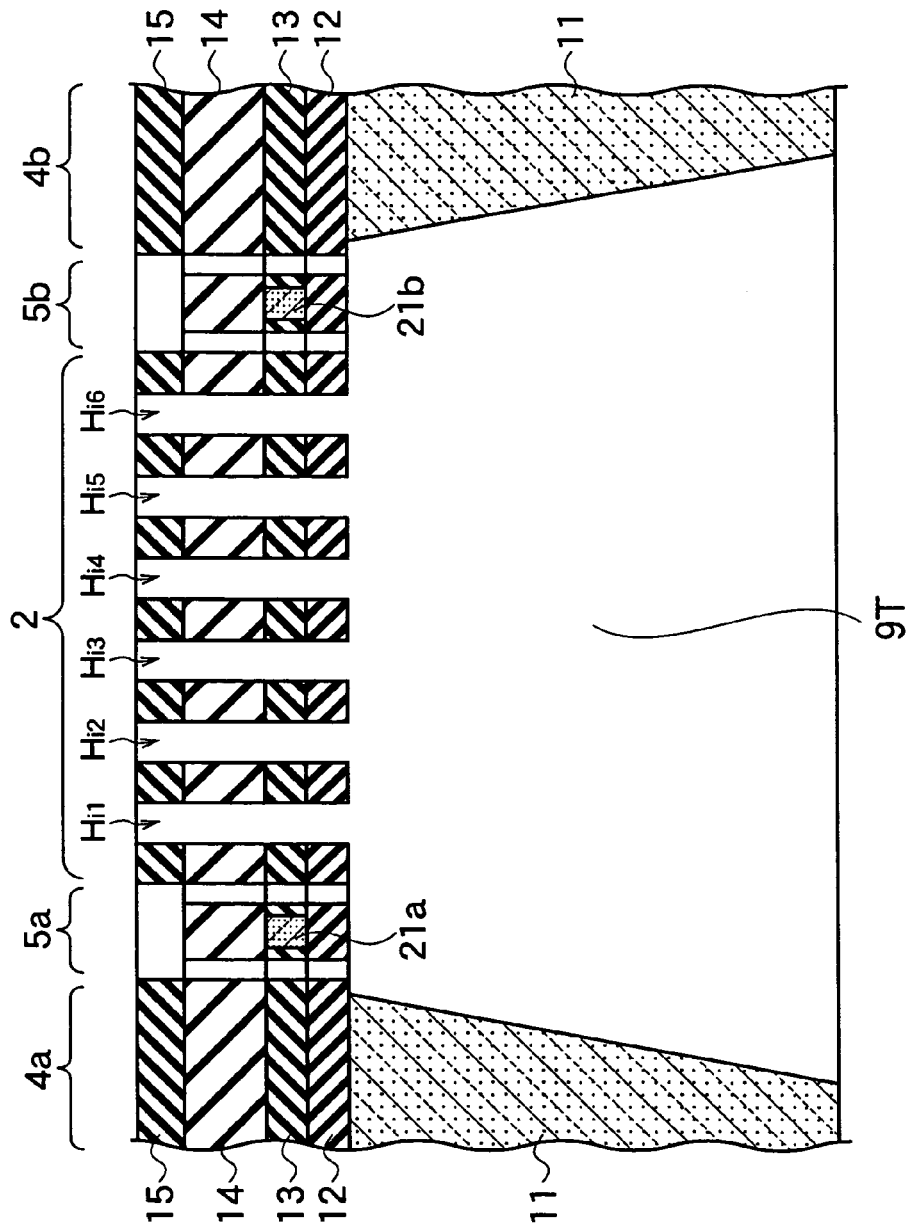
FIG. 19 is a cross-sectional view illustrating a concrete example of the structure of a mechanical vibration element, which implements the opto-acoustoelectric device according to the second embodiment of the present invention.

FIG. 19 shows a cross-sectional view of a mechanical vibration element, which implements the opto-acoustoelectric device according to the second embodiment of the present invention. According to the mechanical vibration element of the second embodiment of the present invention, specifically stated, the diaphragm 2 is suspended by the elastic connectors 5a, 5b from the immovable members 4a, 4b, which are established on the supporting substrate 11. The immovable members 4a, 4b are established in a picture-frame like fashion surrounding an open cavity 9T, which penetrates through the supporting substrate 11 so as to form a horn-shape. The diaphragm 2 is a thin film disposed to cover the open cavity 9T like a lid.

The immovable members 4a and 4b are formed by sequentially stacking a buried dielectric film 12, an element-isolation dielectric film 13, an interlayer dielectric film 14, and a passivation film 15 in this order on the supporting substrate 11, the supporting substrate 11 is made of single crystal silicon. The diaphragm 2 is also a layered structure encompassing the buried dielectric film 12, the element-isolation dielectric film 13, the interlayer dielectric film 14, and the passivation film 15.

The elastic connectors 5a and 5b embrace the buried dielectric film 12, the element-isolation dielectric film 13, and the interlayer dielectric film 14, wherein polysilicon connectors 21a, 21b are buried in the layer of the element-isolation dielectric film 13.

Figure 20A:
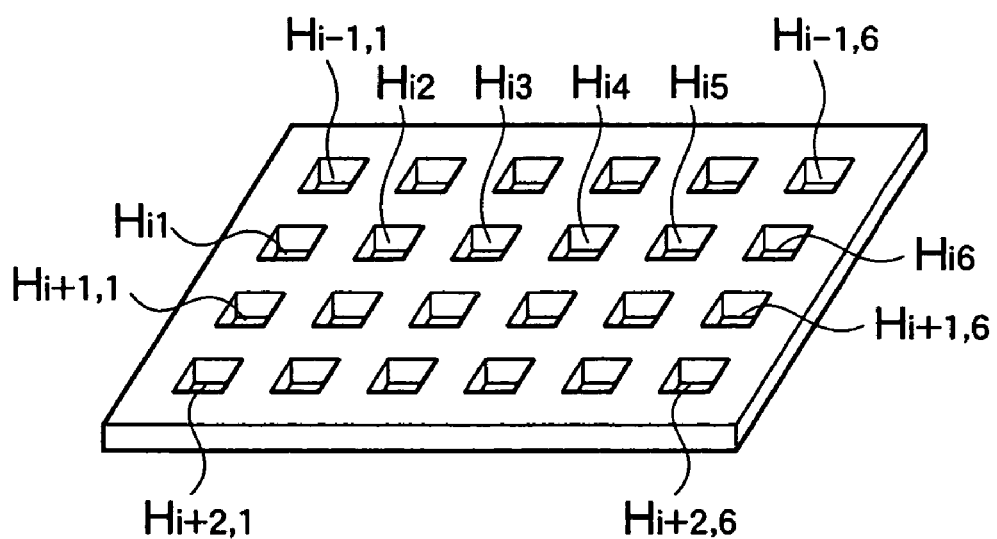
FIG. 20A is a birds-eye view of a transmission-type two-dimensional diffraction grating.
Figure 20B:
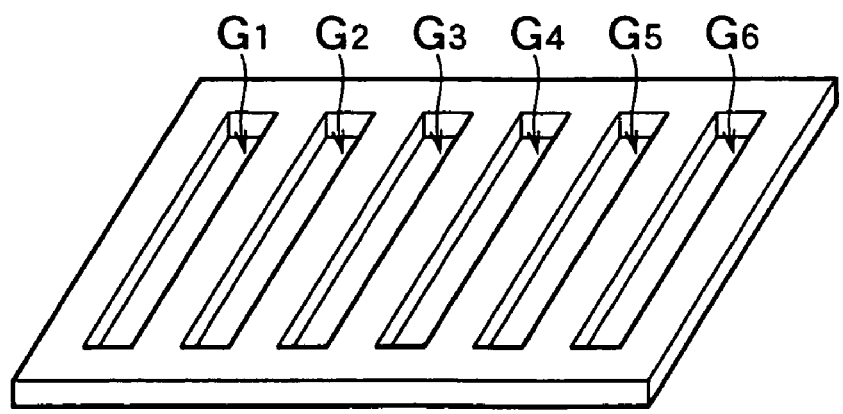
FIG. 20B is a birds-eye view of a transmission-type one-dimensional diffraction grating.

Both a two-dimensional diffraction grating shown in FIG. 20A and a one-dimensional diffraction grating shown in FIG. 20B are acceptable for use as the transmission-type diffraction grating established on the diaphragm 2. In FIG. 20A, the example shows a two-dimensional diffraction grating formed by a plurality of holes (through-holes) $H_{i-1,1}, \ldots, H_{i,1}, H_{i,3}, \ldots, H_{i+2,6}$ arranged in a matrix configuration on the diaphragm 2. And in FIG. 20B, the example shows a one-dimensional diffraction grating formed by a plurality of grooves (slits) $G_1, G_2, G_3, \ldots, G_6$ arranged periodically on the diaphragm 2.

In FIG. 19, piercing the layered structure encompassing the buried dielectric film 12, the element-isolation dielectric film 13, the interlayer dielectric film 14, and the passivation film 15, through-holes $H_{i-1,1}, \ldots, H_{i-1}, H_{i,2}, H_{i,3}, \ldots, H_{i+2,6}$ are opened, forming the transmission-type two-dimensional diffraction grating.

Because the horizon levels of the elastic connectors 5a and 5b sit lower than the horizon level of the apex of the diaphragm 2, the light diffracted at the two-dimensional diffraction grating, which is implemented by a plurality of the holes (through-holes) $H_{i-1,1}, \ldots, H_{i,1}, H_{i,2}, H_{i,3}, \ldots, H_{i+2,6}$ can be easily separated from the light reflected by the elastic connectors 5a and 5b. This gives the structural advantages in sensitivity and an improved S/N ratio. Because the vibration modes of the elastic connectors 5a and 5b differ from the vibration mode of the diaphragm 2, the light reflected from the elastic connectors 5a and 5b functions as a noise component of the light diffracted at the two-dimensional diffraction grating.

<First Modification of the Second Embodiment>

FIG. 21 shows a cross-sectional view of a mechanical vibration element, which implements the opto-acoustoelectric device according to a modification (first modification) of the second embodiment of the present invention. In the same manner as the configuration shown in FIG. 19, the mechanical vibration element embraces a diaphragm 2 suspended by elastic connectors 5a, 5b from immovable members 4a, 4b, which are established on a supporting substrate 11. The immovable members 4a, 4b are established on the surface of the supporting substrate 11 in a picture-frame like fashion. The diaphragm 2 is a thin film covering a open cavity 9T like a lid. The immovable members 4a and 4b are formed by a silicon nitride film ($Si_3N_4$ film) 17, buried-silicon layers 18a, 18e, which are made of a polysilicon layer, and a passivation film 15 each deposited above the supporting substrate 11 in sequential order. The diaphragm 2 is a layered structure including the $Si_3N_4$ film 17, the buried silicon layer 18c, which is made of a polysilicon layer, and the passivation film 15. The elastic connectors 5a and 5b are layered structures including the $Si_3N_4$ film 17, the buried silicon layers 18b, 18d, which are made of a polysilicon layer, and the passivation film 15. In FIG. 21, through-holes $H_{i-1,1}, \ldots, H_{i,1}, H_{i,2}, H_{i,3}, \ldots, H_{i+2,6}$ are opened through the layered structure embracing the $Si_3N_4$ film 17, the buried silicon layer 18c, which is made of a polysilicon layer, and the passivation film 15, forming the transmission-type two-dimensional diffraction grating. The passivation film 15 is also deposited on the interior walls of the through-holes $H_{i-1,1}, \ldots, H_{i,1}, H_{i,2}, H_{i,3}, \ldots, H_{i+2,6}$.

According to the mechanical vibration element, which implements the opto-acoustoelectric device of the first modification, when detecting optically the vibrational displacement $\Delta d$ of the diaphragm 2, the diaphragm is vibrating in response to sound pressure, there is no need for light-path guiding elements, if the diaphragm 2 possesses a transmission-type diffraction grating as shown in FIG. 21. This is because the diffracted light associated with diaphragm 2 possesses self-focusing capability. Also, it is possible to transform the vertical displacement of the diaphragm 2 to two-dimensional horizontal displacement on a surface of the photo diode array, which is configured to detect diffracted light.

<Second Modification of the Second Embodiment>

Figure 22:
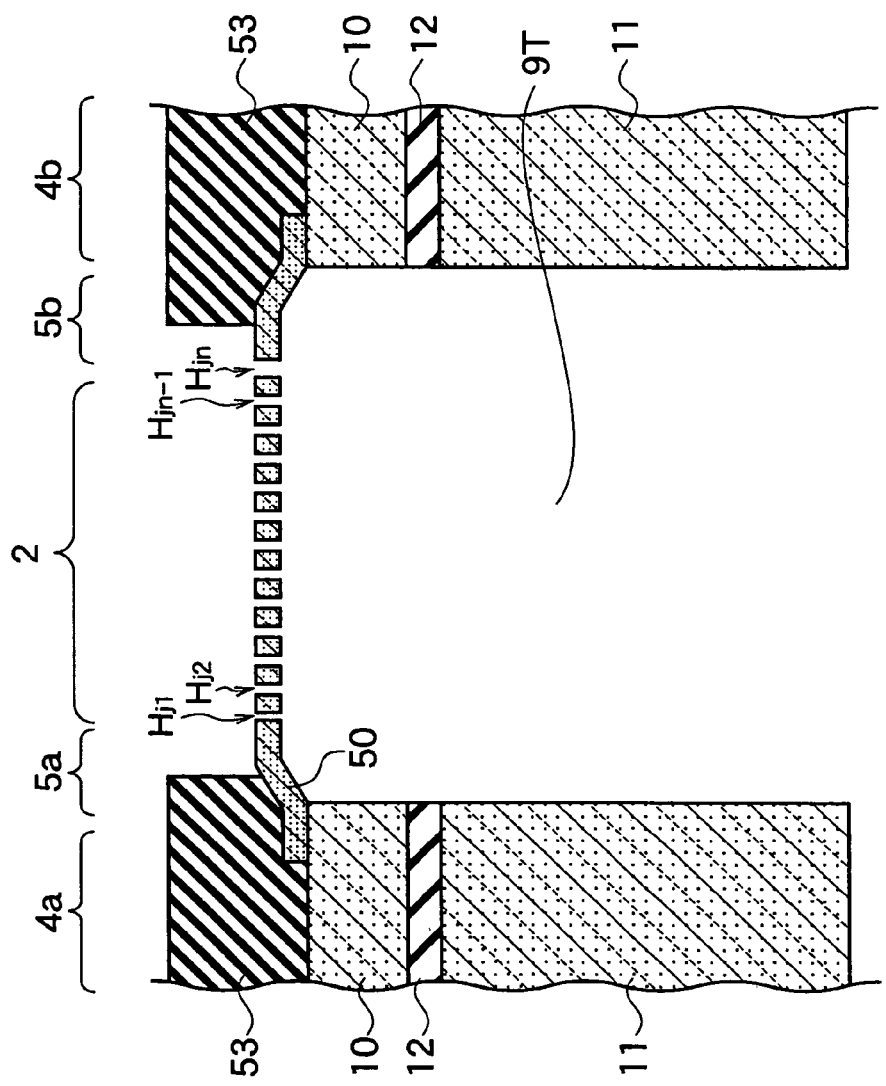
FIG. 22 is a cross-sectional view illustrating a concrete example of the structure of a mechanical vibration element, which implements an opto-acoustoelectric device according to another modification (second modification) of the second embodiment of the present invention.

FIG. 22 shows a cross-sectional view of a mechanical vibration element, which implements the opto-acoustoelectric device according to another modification (second modification) of the second embodiment of the present invention. The mechanical vibration element according to the second modification is established on the surface of an SOI substrate having a buried-dielectric film (SOI oxide film) 12, and a single crystal silicon layer (SOI layer) 10 stacked in sequential order on a supporting substrate 11, which is made of single crystal silicon. The immovable members 4a, 4b of the mechanical vibration element according to the second modification is established to surround the open cavity 9T that penetrates through the SOI substrate, in a picture-frame like fashion. The diaphragm 2, having a flat bridge-like structure that is convex on top, is formed above the open cavity 9T. The diaphragm 2 is a thin film made of a polysilicon layer 50. The holes $H_{i,1}, H_{i,2}, H_{i,3}, \ldots, H_{i,6}$ are opened on the polysilicon layer 50, and implement the transmission-type two-dimensional diffraction grating. The immovable members 4a and 4b are each formed by the SOI substrate and the passivation layer 53 on the SOI substrate. The elastic connectors 5a and 5b are formed configured to use the slanted perimeter of the polysilicon layer 50, which has a bridge-like structure.

According to the mechanical vibration element of the second modification of the second embodiment of the present invention, for detecting the vibrational displacement $\Delta d$ of the diaphragm 2 by light signal, the diaphragm is vibrating in response to sound pressure, there is no need for light-path guiding elements, if the diaphragm 2 possess the transmission-type diffraction grating as shown in FIG. 22. This is because the diffracted light associated with diaphragm 2 possesses self-focusing capability. Also, it is possible to transform the vertical displacement of the diaphragm 2 to two-dimensional horizontal displacement on a surface of the photo diode array, which is configured to detect diffracted light.

(Third Embodiment)

Figure 23:
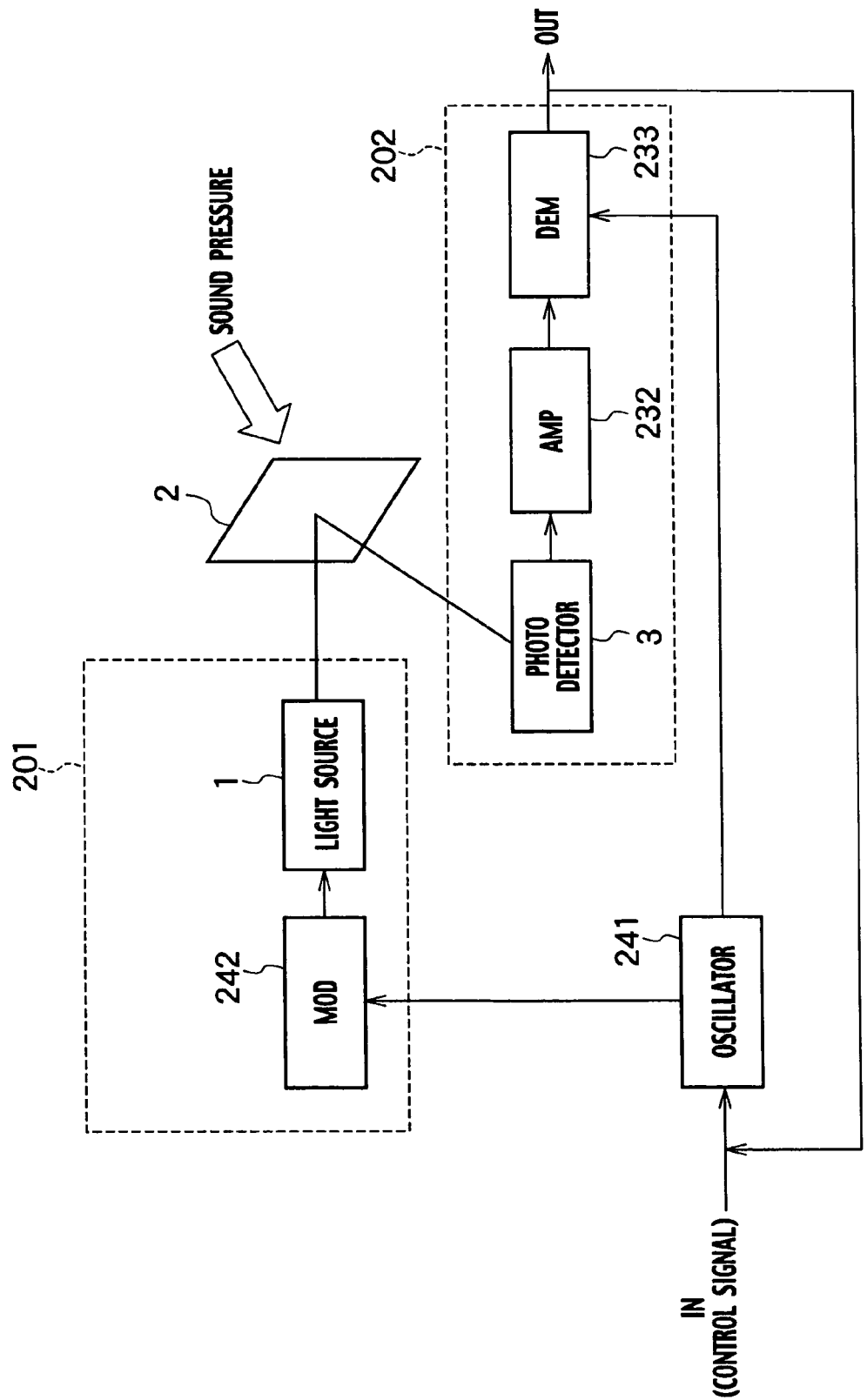
FIG. 23 is a block diagram illustrating a schematic configuration of an opto-acoustoelectric device according to a third embodiment of the present invention.

As illustrated in FIG. 23, an opto-acoustoelectric device according to a third embodiment of the present invention encompasses a diaphragm 2 configured to vibrate with an external mechanical vibration, a light modulation unit 201 configured to modulate the intensity of light by a repetitive periodic signal and to beam the light onto the diaphragm 2, and a demodulation unit 202 configured to detect the light interacted with the vibration of the diaphragm 2, and to analyze the frequency of the mechanical vibration by demodulating with the repetitive periodic signal used as a synchronizing signal for demodulation. Not limited to a triangular wave or a rectangular wave, an arbitrary rippled waveform may be acceptable for the "repetitive periodic signal", if the signal can manifest a repetitive periodic change.

Here, an explanation will be made to describe the situation where the light intensity $x_{in}(t)$ changes sinusoidally, as represented by the following Equation (7). In other words, the opto-acoustoelectric device according to the third embodiment of the present invention encompasses a light modulation unit 201 configured to beam the light, the intensity of the light varies sinusoidally as represented by the following Equation (7), and the demodulation unit 202 configured to analyze the frequency of the mechanical vibration by detecting the light interacted with the vibration of the diaphragm 2, and to demodulate (synchronously detect) with the sinusoidal wave, which is the same as the modulation signal.

The light modulation unit 201 includes a light source 1 configured to beam light onto the diaphragm 2 and an optical modulator 242 configured to modulate an output of the light source 1 so that the light intensity $x_{in}(t)$ change sinusoidally according to Equation (7). When the light source 1 is implemented by a semiconductor light-emitting element such as a light emitting diode (LED) or a semiconductor laser, the optical modulator 242 modulates the driving current of the semiconductor light-emitting element, the modulation may be sinusoidal as represented by Equation (7):

$$x_{in}(t)=\sin(\omega_{OA} t+\Phi) \qquad (7)$$

The demodulation unit 202 includes a photo detector 3 configured to detect the light interacted with the vibration of the diaphragm 2 and to convert it into an electric signal, an amplifier 232 configured to amplify an electric signal and an demodulator 233 configured to analyze the frequency of the mechanical vibration, getting the information on the amplitude and/or phase of the vibration of the diaphragm 2, after the demodulation of an electric signal, which is amplified by the amplifier 232, using a sinusoidal signal, as represented by Equation (7), for the synchronized detection. The optical modulator 242 and the demodulator 233 are connected to an oscillator 241. The oscillator 241 supplies a sinusoidal signal of frequency $\omega_{OA}$ to the optical modulator 242 and the demodulator 233 as the synchronizing signal for synchronized detection; The amplifier 232 and the demodulator 233 may be merged into a single piece of an electronic apparatus such as a lock-in amplifier, which is designed for synchronized detection.

In the optical microphones of earlier technology, in order to optically measure the diaphragm's vibrational displacement, a collimated light must be beamed onto a diaphragm with a constant intensity. In the opto-acoustoelectric device according to the third embodiment of the present invention, however, the light with a varying intensity, modulated by a sinusoidal signal of the frequency $\omega_{OA}$, can be incident upon the diaphragm 2. Thus, the frequency analysis of the vibration of the diaphragm 2 can be made with greater simplicity, because the reflected light from the diaphragm 2 includes only the fundamental frequency $\omega_{OA}=2\pi f_{OA}$ and its harmonic waves. And as illustrated in FIG. 23, the fundamental frequency $\omega_{OA}$ can be adjusted to the resonant frequency $f_0$ of the diaphragm 2, by feedbacking part of the output signal of the demodulation unit 202 into the input side of the oscillator 241. In addition, through above-mentioned feedback mechanism, an adjustment of the sensitivity, an extension of the dynamic range and an improvement in the SN ratio, etc. can be achieved.

Furthermore, by using time-division architecture providing a plurality of sinusoidal waves, each having different frequencies $\omega_{0A}$s, at different timing, or by using sweeping methodology, in which the frequency $\omega_{0A}$ of the sinusoidal wave is swept to cover a wide frequency band, the simultaneous detection of the multiple frequencies $\omega_{0A}$s can be achieved. In order to generate a plurality of sinusoidal waves, each having different frequencies $\omega_{0A}$s as employed in the time-division architecture, a plurality of oscillator 241 may be prepared for the configuration shown in FIG. 23. And, a control equipment may well be prepared to control the plurality of oscillator 241 by the time-division architecture. In the situation where different multiple frequencies $\omega_{0A}$s are equivalently covered by the sweeping methodology, the frequency $\omega_{0A}$ of the sinusoidal wave will be swept at a constant period, employing a sweeping oscillator for the oscillator 241 of FIG. 23.

For example, in a situation where the diaphragm 2 vibrates in response to sound pressure of the human voice, when human vocal tract is assumed to be a single acoustic tube, the nth degree resonance frequency "$f_n$" of acoustic tube is given by Equation (8), using "c" as sound velocity and using "l" as length of acoustic tube:

$$f_n = (2n-1)c/4l \tag{8}$$

Since human voice is a weighted superposition of the fundamental frequency $f_0$ and its harmonic waves $f_1, f_2, f_3, \ldots f_n, \ldots$, the amplitude of the vibration of the diaphragm is represented by Equation (9).

$$x(t) = \sum_n A_n \sin(n\omega_0 t + \varphi) \tag{9}$$

According to a sound source filter theory, vocalized output spectrum P(f) can be expressed as the product of larynx sound source spectrum U(f) with transfer function T(f) of the vocal tract and radiation characteristics R(f).

$$P(f) = U(f)T(f)R(f) \tag{10}$$

(See "The Acoustic Analysis of Speech" written by Ray D Kent and Charles Read, Thomson Learning). For example, when it is assumed that the terms of U(f) and R(f) are constant, using an analogue filter such as filter bank wherein a plurality of filters, each having different characteristics are connected in parallel, or a digital filter, sound voice can be analyzed by obtaining T(f). In order to analyze the waveform in frequency domain, the waveforms is obtained in the above-mentioned method, spectral analysis is done using the fast Fourier transform (FFT). For example, Fourier transform is done using a relation expressed by the following Equation (11):

$$F(\omega) = \frac{1}{2\pi} \int_{-\infty}^{\infty} x(t) e^{-j\omega t} dt \tag{11}$$

This is analog processing, on the other hand, discrete Fourier transform (DFT) is normally used in digital processing, in which the signal is processed by a relation expressed by:

$$X_i = \frac{1}{\sqrt{N}} \sum_{k=0}^{N-1} x_k e^{-jk\frac{2\pi}{N}i} \tag{12}$$

Or discrete cosine transform (DCT) represented by Equation (13) can be used for frequency analysis:

$$X_i = \sqrt{\frac{2}{N}} C_i \sum_{k=0}^{N-1} x_k \cos \frac{2(k+1)i\pi}{2N} \tag{13}$$

Or the modification of the DCT represented by Equation (13), that is, modified discrete cosine transform (MDCT) was also used as follows:

$$X_i = \frac{1}{\sqrt{N}} \sum_{k=0}^{2N-1} x_k \cos \frac{(2k+1+N)(2i+1)\pi}{4N} \tag{14}$$

In this case, an accurate spectrum is not obtained because of "the aliasing", which is a high frequency noise associate with the discrete factorization, when the high frequency component is not removed. In opto-acoustoelectric device of the third embodiment of the present invention, complicated processing using such FFT, etc. is not required. When the light modulated with a sinusoidal signal of the frequency $\omega_0$ beams onto the diaphragm 2, by demodulating (synchronously detecting) a detected electric signal, information of the amplitude and/or phase of the vibration of the diaphragm 2, associated with each of the characteristic frequencies of the diaphragm 2, are conveniently obtained for the acoustic signal input.

Figure 24:
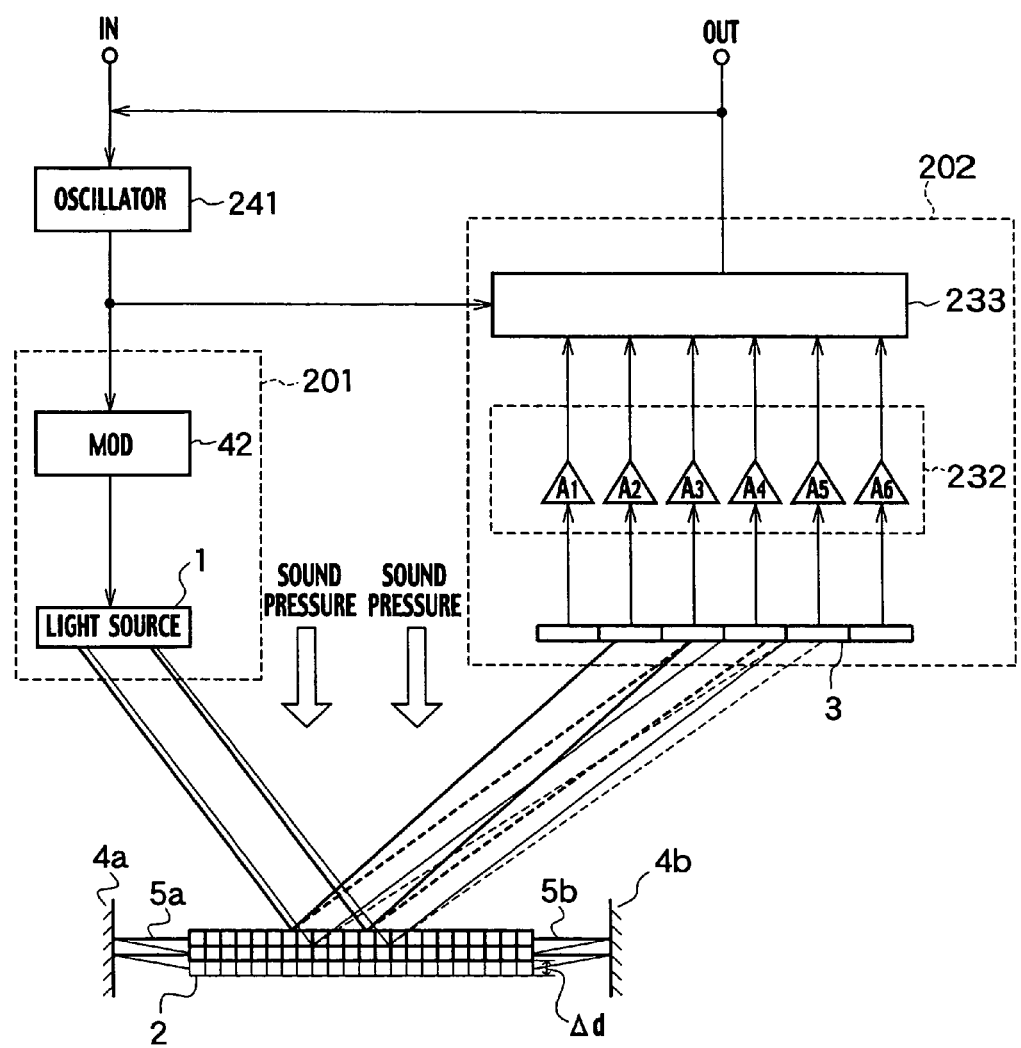
FIG. 24 is a schematic view illustrating details of the surrounding elements associated with the diaphragm of the opto-acoustoelectric device according to the third embodiment of the present invention.

As illustrated in FIG. 24, the diaphragm 2 of the opto-acoustoelectric device according to the third embodiment of the present invention has a reflection-type diffraction grating. FIG. 24 shows details of the opto-acoustoelectric device shown in FIG. 23, and the opto-acoustoelectric device encompasses the diaphragm 2 configured to vibrate in response to sound pressure, a light source 1 configured to emit the light so as to irradiate the diffraction grating, and a photo detector-3 configured to detect the light diffracted by the diffraction grating and convert it into an electric signal.

It is preferable to use an image sensor such as a photo diode array etc. as the photo detector 3, as illustrated in FIG. 24. More specifically, it is not a function of the photo detector 3 to detect differences in light intensity, but instead to detect the two-dimensional displacement of the diaphragm 2 by sensing the two-dimensional pattern of the diffraction image. Thus, the photo detector (photo diode array) 3 is ensured a sufficiently wide area for detecting the diffracted light so that it is possible to fully and completely detect the two-dimensional diffraction image.

With the opto-acoustoelectric device having the diaphragm 2, when the light beamed from the light source 1 is incident upon the diaphragm 2, because a reflection-type diffraction grating is formed on the diaphragm 2, the light beamed from the light source 1 is reflected by the diffraction grating and produce a two-dimensional diffraction image on the top surface of the photo detector 3. That is, the photo detector 3 optically detects the vertical displacement $\Delta d$ of the diaphragm 2, which has the reflection-type diffraction grating, and then converts the information representing the vertical displacement Δd into an electric signal.

For facilitating the mechanical vibration, the diaphragm 2 is suspended from immovable members 4a, 4b by elastic connectors 5a, 5b. Since the concrete example of the structure associated with the diaphragm 2 is the same as the configuration explained in the first embodiment referring to FIG. 2, overlapped explanation of the opto-acoustoelectric device is omitted. And both the two-dimensional diffraction grating shown in FIG. 3A and the one-dimensional diffraction grating shown in FIG. 3B are acceptable for use as the reflection-type diffraction grating established on the diaphragm 2.

In the configuration shown in FIG. 24, if sound pressure is applied to the diaphragm 2 having the diffraction grating as shown in FIGS. 3A and 3B, the diaphragm 2 vibrates supported by fulcrums, which are defined by the boundaries between the elastic connector 5a, 5b and the immovable members 4a, 4b. In FIG. 24, the thick solid and dashed lines show the diffraction image before the diaphragm 2 undergoes vertical displacement Δd. When the diaphragm 2 is motionless, that is, in a situation where there is no sound input, light is beamed from the light source 1, which causes the diffraction image to appear on the top surface of the photo detector 3 spanning the interval between the thick solid line and the thick dashed line shown in FIG. 24.

When the sound input is present, the distance between the diaphragm 2 and the photo detector 3 shifts. When the shift of the distance is generated by the sound input, as illustrated by the thin solid line and thin dashed line, the interval of the diffraction image on the top surface of the photo detector 3 shifts two-dimensionally. The thin solid and dashed lines of FIG. 24 illustrate the shift in the interval of the diffraction image brought about by the vibration of the diaphragm 2.

If two diffraction images each having identical degree and orientation are compared, the photo detector 3 can find differences in the two diffraction images throughout the span of the vibration. The photo detector 3 detects the displacement between the two diffraction images being generated on the top surface of the photo detector 3, and provides output signals representing the vertical displacement Δd of the diaphragm 2.

According to the opto-acoustoelectric device of the third embodiment, it becomes unnecessary to furnish the elements which has been essential to the optical microphones of earlier technology, such as lenses used to collimate the light reflected from the diaphragm 2, as well as an optical fiber or an optical waveguide used as a path for guiding the light to an arbitrary desired direction. By the optical diffraction effect, the imaging is self-focused without using any lenses. Because of the self-focused imaging, an image is automatically converged on the top surface of the photo detector 3, and detection at a high resolution is possible. The constraints upon the optical path of the incident light beamed onto the diaphragm 2 are also significantly reduced.

Because the optical constraints of the incident/reflected light to/from the diaphragm 2 are reduced in the opto-acoustoelectric device of the third embodiment, a simple system can facilitate the desired measurement specification, and the miniaturization is possible, and the number of usable applications is broadened.

Further, according to the opto-acoustoelectric device of the third embodiment, by using the photo diode array as the photo detector 3, it is possible to perform detection on the pixel level and achieve the digital acoustoelectric conversion at the same time. Because an A/D converter is unnecessary, the response speed improves, and circuit dimensions can be miniaturized. With a reflection-type diffraction grating such as shown in FIG. 24, it is possible to dispose the light source 1, the photo detector 3, the power source of the photo detector 3, the drive circuitry of the light source 1, and the processing circuitry of the output signal provided by the photo detector 3 all on the same circuit board. Further, it is also possible to manufacture the diaphragm 2 having a diffraction grating using the same semiconductor-manufacturing process as for the photo detector 3 and its peripheral circuitry.

As a result, it is possible to reduce the manufacturing cost of the opto-acoustoelectric device according to the third embodiment.

As can be easily understood from FIG. 2, in forming the diffraction grating of the diaphragm 2, especially for the formation of grooves/grating on the diaphragm 2, it is useful to employ the semiconductor manufacturing process. By using the semiconductor manufacturing process it becomes possible to form a diffraction grating possessing an arbitrary value of grating periods, having good reproducibility and suited to mass production.

Also, because the semiconductor substrate used as the supporting substrate 11 possesses a variety of physical properties, it is possible to alter the mass or spring constant of the diaphragm 2 with ease. For instance, silicon (Si) is used for the diaphragm 2 (See FIG. 13), and a laser with a wavelength below λ=1000 nm is used for the light source 1. If the sidewalls of the grating are coated with a highly reflective material, the incident light beamed onto the silicon part will be absorbed, diffracting only the light diffracted off of the sidewalls of the grating to the photo detector 3. This cuts the stray light headed to the photo detector 3, which as a result makes it possible to improve the S/N ratio.

As a result, it is possible to reduce the manufacturing cost of the opto-acoustoelectric device according to the third embodiment.

As can be easily understood from FIG. 2, to form the diffraction grating on the diaphragm 2, that is, when the fabrication of grooves/grating on the diaphragm 2 is required, it is useful to employ the semiconductor manufacturing process. By using the semiconductor manufacturing process it becomes possible to fabricate a diffraction grating possessing an arbitrary grating period value, having a good reproducibility and suited for mass production.

Also, because the semiconductor substrate used as the supporting substrate 11 possesses a variety of physical properties, it is possible to alter the mass or spring constant of the diaphragm 2 with ease. For instance, when silicon (Si) is used for the diaphragm 2 (See FIG. 13), a laser having a wavelength shorter than λ=1000 nm can be used for the light source 1. If the sidewalls of the grating are selectively coated with a highly reflective material so as to leave bare silicon top surface, the incident light beamed onto the bare silicon top surface will be absorbed by silicon, so that the light reflected by the sidewalls of the grating can implement the diffracted light, which reaches to the photo detector 3. This cuts the stray light headed toward the photo detector 3, which as a result makes it possible to improve the S/N ratio.

Figure 26A:
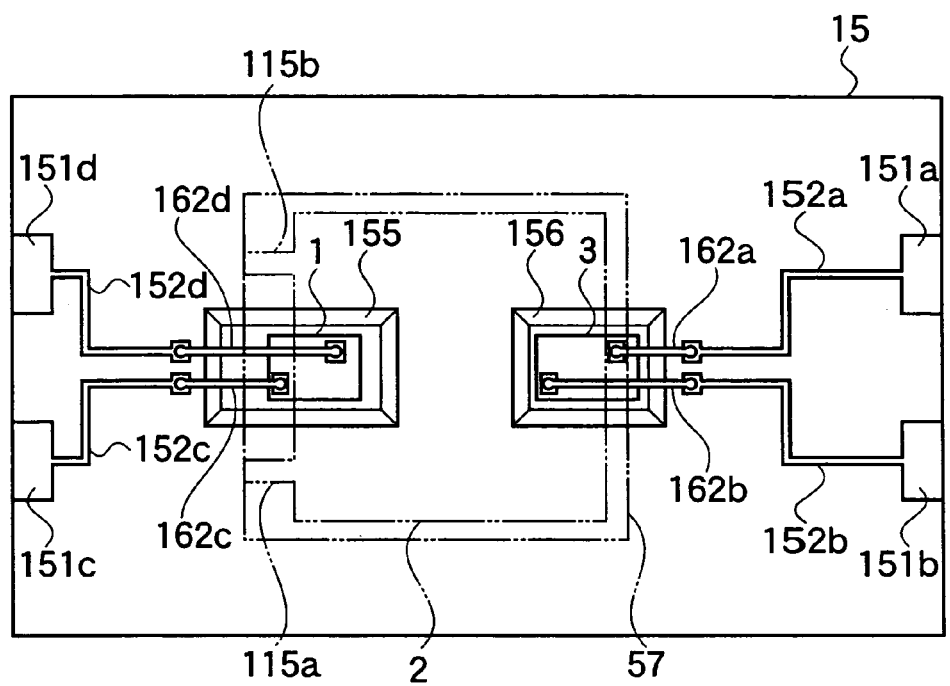
FIG. 26A is a plan view illustrating a pattern of the back surface of the packaging substrate so as to show the example of the packaged structure of an acoustoelectric transducer, which implements the opto-acoustoelectric device according to the third embodiment of the present invention.
Figure 26B:
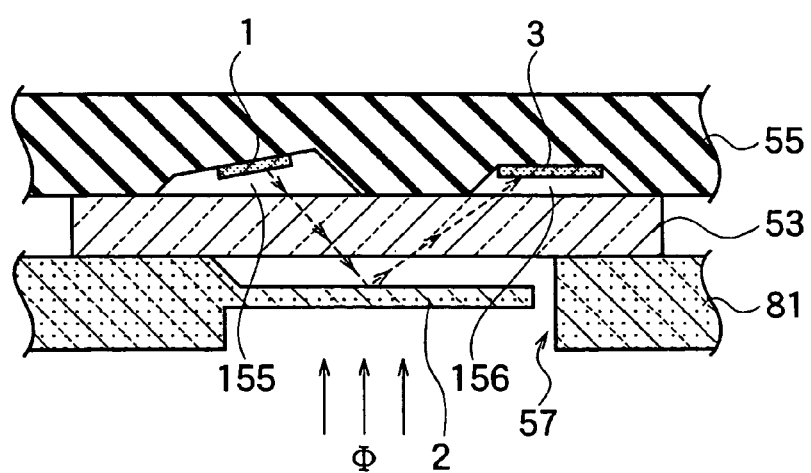
FIG. 26B is a cross-sectional view explaining the triple-level structure encompassing the packaging substrate, the glass substrate (transparent interposer) and the semiconductor substrate.

FIGS. 26A and 26B show an example of an acoustoelectric transducer, which implements the opto-acoustoelectric device according to the third embodiment of the present invention. As illustrated in FIG. 26B, a packaging substrate 55 is laminated on a semiconductor substrate 81, which has a diaphragm configured to be vibrated by the sound pressure of acoustic wave Φ, which is irradiated from the downward. Although the illustration is omitted so as not cluttering the drawing, the diaphragm 2 has a diffraction grating as shown in FIGS. 3A and 3B. The semiconductor substrate 81 has a surface-emitting laser (light source) 43 configured to expose the diffraction grating to light, and the photodiode (photo detector) 31 configured to detect the light diffracted by the diffraction grating and to convert it into an electric signal. The semiconductor substrate 81 and the packaging substrate 55 are being bonded through the glass substrate (transparent substrate) 53, which serves as a transparent interposer. As a result, the opto-acoustoelectric device of the third embodiment implements the triple-level structure, encompassing the packaging substrate 55, the glass substrate (transparent interposer) 53 disposed under the packaging substrate 55 and the semiconductor substrate 81 disposed under the glass substrates (transparent interposer) 53, detecting the mechanical displacement of the diaphragm 2 generated by sound pressure, and converting the mechanical displacement into an electric signal. For example, the triple-level structure may be united by heat fusion technology or adhesive.

FIG. 26A is a plan view of the pattern of the back surface of the packaging substrate 55. As illustrated in FIG. 26, two bonding pads on the top surface of the light source 1, which is mounted in a light source concavity 155, are being connected to two wirings 152c, 152d through using two bonding wires 162c and 162d. In this case in which the back surface of light source 1 serves as one of the electrodes, for instance, the wiring 152d can be lead to the bottom surface of the light source 1 and a single bonding pad on the top surface of the light source 1 and the wiring 152c can be connected by the bonding wire 162c. Through the wiring 152c and 152d formed on the surface of the packaging substrate 55, the bonding pads on the light source 1 are respectively and electrically connected with the packaging pads (electrode pads) 151c, 151d. The packaging pads (electrode pads) 151c, 151d are connected to the optical modulator 242, though the illustration of which was omitted in the FIG. 26 (See FIG. 23).

In the same manner, two bonding pads on the top surface of the photo detector 3, which is mounted in a detector concavity 156, are being connected to two wirings 152a, 152b through using two bonding wires 162a and 162b. In this case, if the bottom surface of the photo detector 3 serves as one of the electrodes, for instance, the wiring 152b can be lead to the bottom surface of the photo detector 3 and a single bonding pad on the top surface of the photo detector 3 and the wiring 152a can be connected by the bonding wire 162a. Through the wiring 152a and 152b formed on the surface of the packaging substrate 55, the bonding pads on the top surface of the photo detector 3 are respectively and electrically connected with the packaging pads (electrode pads) 151a, 151b. The packaging pads (electrode pads) 151a, 151b are connected to the amplifier 232, though the illustration of which was omitted in FIG. 26 (See FIG. 23).

As can be easily understood from the cross sectional view shown in FIG. 26B, as each of the packaging pads 151a, 151b, 151c, 151d is partially exposed at the perimeter of the packaging substrate 55, at near the both ends of the glass substrate (transparent interposer) 53, an electrical connection between the external driving wirings and the light source 1 and an electrical connection between the external signal extraction wirings and the photo detector 3 are facilitated. As materials for the packaging substrate 55, various synthetic resin or inorganic materials such as ceramics, glass and the semiconductor are usable. As materials for the organic resin, phenol resin, polyester resin, epoxy resin, polyimide resin, fluorine resin, etc. are usable. As a base material for the core substrate, which will be used when a plate-shaped configuration of the packaging substrate 55 is required, papers, glass cloth, glass board material, etc. can be used. As a general inorganic material for the packaging substrate 55, ceramic or semiconductor can be elected. A glass substrate can be used when a transparent substrate is required, and a metal substrate can be used for improving the thermal dissipation characteristics. An alumina ($Al_2O_3$) substrate, a mullite ($3Al_2O_3.2SiO_2$) substrate, a beryllium (BeO) substrate, an aluminum nitride (AlN) substrate, a silicon nitride (SiC) substrate, etc. are usable as a material of the ceramic substrate. In addition, a metal base substrate (metal insulated substrate) is acceptable, in which a polyimide based resin film is stacked on a metal base plate such as iron (Fe) and copper (Cu) so as to make a multi-level structure, the polyimide based resin film has a high heat-resistance characteristics. Among these materials, a semiconductor substrate is preferable for making the packaging substrate 55, because the concavity 155 for the light source and the concavity 156 for the photo detector can be easily and-simply formed by using the same semiconductor-integrated circuit manufacturing process, such as a photolithography technique and an etching technology. The monolayer of the semiconductor substrate 81 is exemplified as the packaging substrate 55 in FIG. 26, however, a multi-level composite substrate such as the SOI substrate is also acceptable.

As already shown in FIG. 3A, the semiconductor vibration film (diaphragm) 2 shown in FIG. 26B also has a two-dimensional diffraction grating, which is implemented by a plurality of holes (concavities) $H_{i-1,1}, \ldots, H_{i,1}, H_{i,2}, H_{i,3}, \ldots H_{i+2,6}$ disposed in a matrix configuration with fixed depth The semiconductor vibration film (diaphragm) 2 with such a periodic pattern as the two-dimensional diffraction grating is being fixed by elastic beams 115a and 115b to the sidewall of the bottom cavity 57 established in the semiconductor substrate 81 in FIGS. 26A and 26B. As illustrated in the two-point chain line in FIG. 26A, when observed as a planar pattern, the bottom cavity 57 is established in the shape of the rectangular frame in the semiconductor substrate 81. Then, as shown in FIGS. 26A and 26B, inside the bottom cavity 57, the rectangular diaphragm 2 is provided. FIG. 26A shows the elastic beam 115a and 115b by the two-point chain line.

As illustrated in FIGS. 26A and 26B, the optical beam of the semiconductor laser (light source) 43, transmitting the glass substrate (transparent interposer) 53, is diffracted by the diffraction grating of the semiconductor vibration film (diaphragm) 2 and again transmitting the glass substrate (transparent interposer) 53, is detected by the photodiode (photo detector) 31.

With the packaging substrate 55, the glass substrate (transparent interposer) 53 and the semiconductor substrate 81, the opto-acoustoelectric device of the third embodiment implements a structure in which thin films about 60 µm–600 µm, or more preferable 100 µm–300 µm are laminated in a triple-level-stacked configuration. The triple-level-stacked configuration is suitable for miniaturization and thinning of the packaged structure of the opto-acoustoelectric device. In addition, since it is possible to observe the minute vibrational displacement Δd of diaphragm as large differences of the reflected light intensity according to the third embodiment of the present invention, the opto-acoustoelectric device, with small limitation on the use range, can be realized in low-cost. Therefore, the opto-acoustoelectric device having a high manufacturing yield, a high directivity, an excellent stability, an excellent environment immunity, with a small and thin assembled geometry can be provided. Especially, when the semiconductor substrate 81 has a matrix or in an array configuration with a plurality of diaphragms 2, each of which having a specific resonant frequency $f_0$ different from another specific resonant frequencies of another diaphragms, when a plurality of light sources 1 and a plurality of photo detectors 3 are respectively used, in a configuration such that a plurality of surface-emission lasers (light sources) 43 emit a plurality of lights to shine the plurality of diaphragms 2, respectively, and a plurality of photodiodes (photo detectors) 31 detect the plurality of lights diffracted respectively by the plurality of diaphragms and convert respectively the plurality of lights into a plurality of electric signals, and when the plurality of lights, modulated by a plurality of sinusoidal waves with different frequencies $\omega_{0A}$s, are beamed respectively from the plurality of light sources 1 and demodulated (lock-in amplified) respectively, using the sinusoidal waves with different frequencies $\omega_{0A}$s as the synchronizing signals, a simultaneous analysis of the different frequencies $\omega_{0A}$s becomes possible.

Figure 27A:
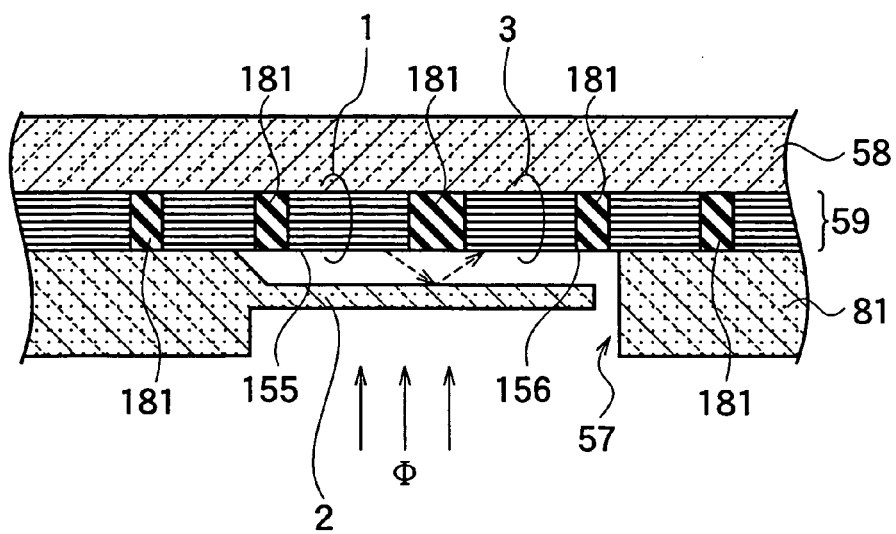
FIG. 27A is a schematic cross-sectional view explaining another packaged structure of an acoustoelectric transducer, which implements the opto-acoustoelectric device according to the third embodiment of the present invention.

In addition, in a certain case, in the opto-acoustoelectric device of the third embodiment of the present invention, it is also possible to omit the transparent interposer 53. As illustrated in FIG. 27A, for instance, a simpler double-level-stacked configuration is acceptable, in which a second semiconductor substrate 58, which mounts a surface-emission laser (light source) 1 and a photodiode (photo detector) 3, is stacked on a first semiconductor substrate 81, in which a semiconductor vibration film (diaphragm) 2 is formed, by direct bond method.

Figure 27B:
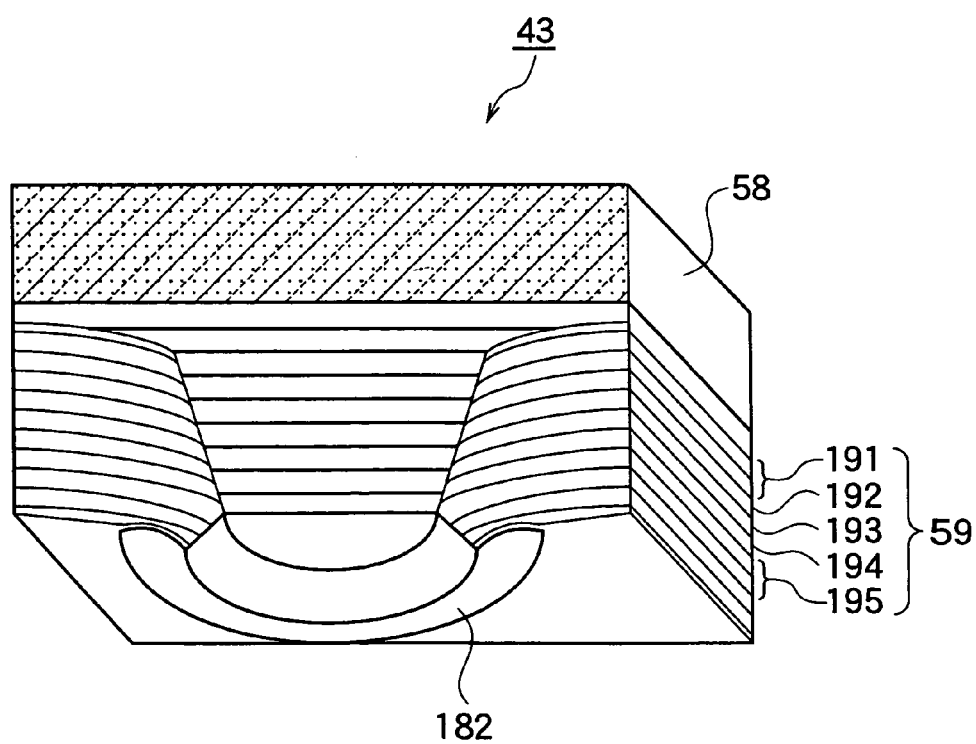
FIG. 27B is a birds-eye view showing details of a surface-emission laser, which serves as the light source incorporated in the acoustoelectric transducer shown in FIG. 27A.

In FIG. 27A, the light source 1 and the photo detector 3 are formed by a multi-level-stacked epitaxial growth layer 59 on the second semiconductor substrate 58 made of the compound semiconductor. And the interval between the light source 1 and the photo detector 3 is electrically isolated by the element isolation region 181, which may be a proton (H$^+$) irradiated high resistivity region or an insulating film. For the first semiconductor substrate 81, though it is preferable to use silicon (Si) if the mechanical strength of the thin semiconductor vibration film (diaphragm) 21 is required, a compound semiconductor substrate is also acceptable. Because the distance between the surface-emission laser (light source) 43 and the photodiode (photo detector) 3 can be defined by photolithography technique, the configuration shown in FIG. 27A can achieve a miniaturization of the device size and thickness with ease. As illustrated in FIG. 27B, the light source 1 may be implemented by the surface-emission laser with an n-side Bragg-reflector mirror 191, an n-side cladding layer 192, an active layer 193, a p-side cladding layer, a p-side Bragg-reflector mirror 195 and a p-side electrode 182, etc. When using the surface-emission laser shown in FIG. 27B as the photodiode, the photodiode can have a band gap identical with the band gap of the surface-emission laser. The identical band gap architecture achieves a high sensitivity detection in the opto-acoustoelectric device, free from noise and stray light, because of the resonance effect of the wavelength. According to the opto-acoustoelectric device and the vibration analysis method of the third embodiment, even if complicated techniques such as the FFT are not used, it is possible to achieve direct digitization and frequency analysis.

In developing further the structure illustrated in FIGS. 27A and 27B, if a semiconductor substrate 81 merges a plurality of diaphragms 2, each of which having different resonant frequencies $f_0$s, and the diaphragms 2 are arranged in a matrix configuration or an array configuration, and when a plurality of incident lights modulated with sinusoidal waves, each of the sinusoidal waves having different frequencies $\omega_{0A}$s, are beamed from a plurality of light sources 1, so that they can be demodulated (synchronous detected) by using corresponding sinusoidal signals of the frequencies $\omega_{0A}$s, simultaneous analysis of different frequencies $\omega_{0A}$s becomes possible.

According to the opto-acoustoelectric device and the vibration analysis method of the third embodiment of the present invention, the direct digitalization and the frequency analysis become possible without using such a complicated method as FFT etc.

(Fourth Embodiment)

Figure 28:
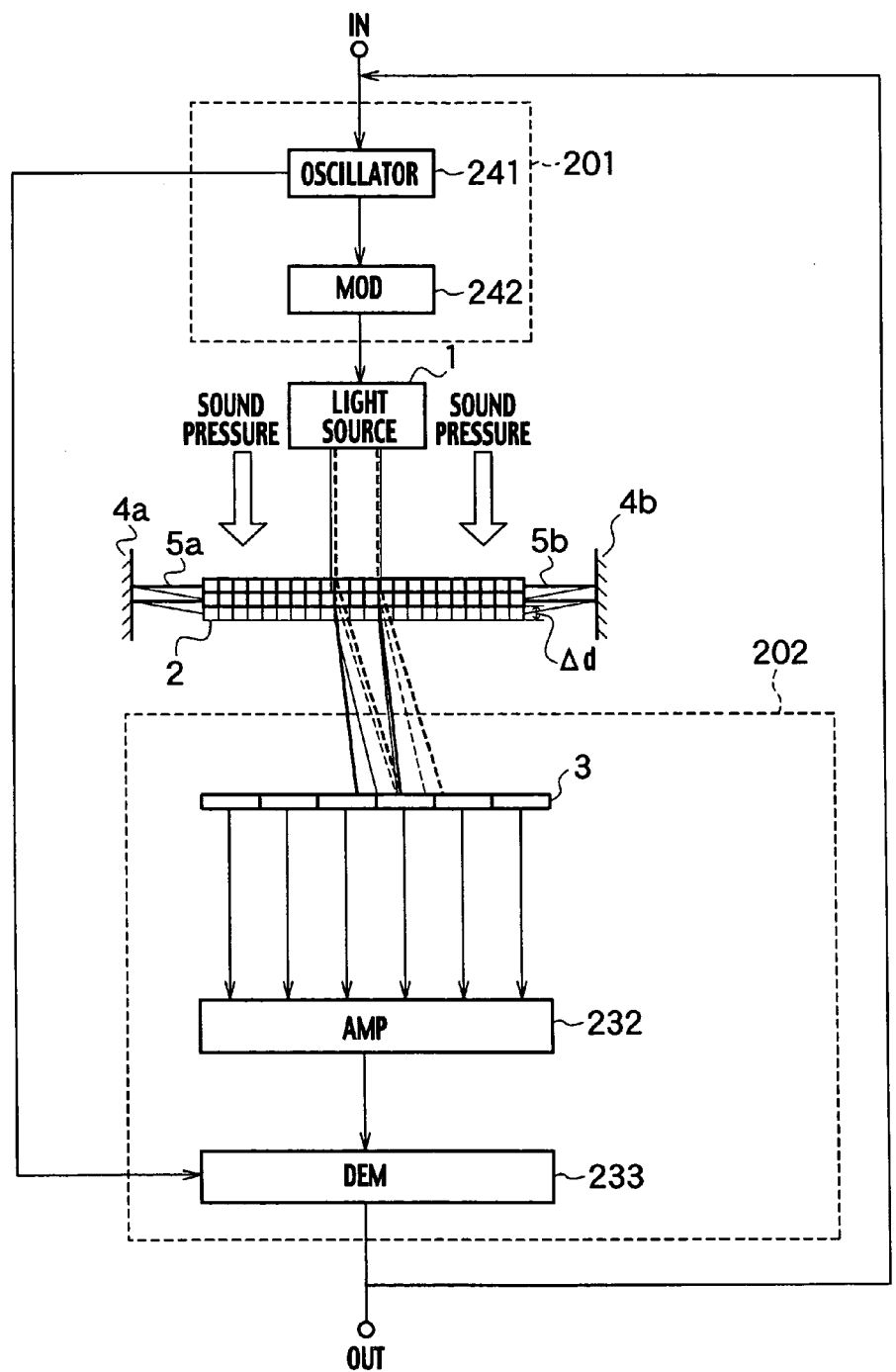
FIG. 28 is a schematic view illustrating a configuration of an opto-acoustoelectric device according to a fourth embodiment of the present invention.

As illustrated in FIG. 28, a feature of the opto-acoustoelectric device of the fourth embodiment of the present lies in a diaphragm 2, which is configured to vibrate by mechanical vibration, having a transmission-type diffraction grating, and the feature differs from the opto-acoustoelectric device of the third embodiment having a reflection-type diffraction grating shown in FIG. 24.

In other words, the opto-acoustoelectric device according to the fourth embodiment of the present invention encompasses the diaphragm 2 having the transmission-type diffraction grating, a light modulation unit 201 configured to beam the light, the intensity $x_{in}(t)$ of the light is modulated so as to change sinusoidally, onto the diaphragm 2, a demodulation unit 202 configured to analyze the frequency of the mechanical vibration after detecting the light transmitted through the diaphragm 2, and demodulating(synchronous detecting) with the sinusoidal wave of frequency $\omega_{0A}$.

As mentioned in the opto-acoustoelectric device of the third embodiment, more generally, the light modulation unit 201 emits the light, the intensity of the light is modulated periodically by using a repetitive periodic signal, and the demodulation unit 202 demodulates the detected light with the repetitive periodic signal as the synchronizing signal for the synchronized detection. Not limited to a triangular wave or a rectangular wave, an arbitrary rippled wave may be acceptable for the "repetitive periodic signal" if a repetitive periodic waveform can be obtained. Here, an explanation will be made to describe the case in which the light intensity $x_{in}(t)$ may change sinusoidally according to Equation (7) for simplification.

The feature in which the diaphragm 2 is suspended from immovable members 4a and 4b by elastic connectors 5a and 5b is identical with the configuration of the opto-acoustoelectric device already explained in the third embodiment, which is illustrated in FIG. 24. In the same manner as the opto-acoustoelectric device of the third embodiment, the light modulation unit 201 includes the light source 1 configured to beam light onto the diaphragm 2 and an optical modulator 242 configured to modulate an output of the light source 1 so that the light intensity $x_{in}(t)$ may change sinusoidally according to Equation (7). When the light source 1 is made of a semiconductor light-emitting element such as light emitting diode (LED) or semiconductor laser, the optical modulator 242 can modulate the driving current of the semiconductor light-emitting element sinusoidally according to Equation (7). The demodulation means 202 includes a photo detector 3 (photo diode array) 31 configured to detect the light which transmitted and was diffracted by the diaphragm 2 and to convert it into an electric signal, and an amplifier 232 configured to amplify an electric signal and an demodulator 233 configured to analyze the frequency of the mechanical vibration, getting the information on the amplitude and/or phase of the mechanical vibration of the diaphragm 2, after demodulating an electric signal amplified by the amplifier 232 using the sinusoidal synchronizing signal according to Equation (7). The optical modulator 242 and the demodulator 233 are connected to an oscillator 241.

In the same manner as the opto-acoustoelectric device shown in FIG. 24, it is desirable to use an image sensor such as a photo diode array for the photo detector 3 shown in FIG. 28. More specifically, the photo detector 3 does not detect differences in light intensity. Instead the photo detector 3 carries out detection of the two-dimensional displacement of the diaphragm 2 by sensing the pattern of the two-dimensional diffraction image. Thus the image sensor is ensured a sufficiently wide area for detecting the diffracted light so that it is possible to fully and completely detect the diffraction image.

In the opto-acoustoelectric device concerned in the forth embodiment, when the light beamed from the light source 1 is incident upon the diaphragm 2, because transmission-type diffraction grating is formed on the diaphragm 2, light beamed from the light source 1 pass through the diaphragm 2 and produce a diffraction image on the top surface of the photo detector 3.

FIG. 28 shows a situation in which the diaphragm 2 vibrates in response to sound input, shifting the diffraction image on the top surface of the photo detector 3. When the diaphragm 2 is motionless, that is, in a situation where there is no sound input, light is beamed from the light source 1, which causes the diffraction image to appear on the top surface of the photo detector 3 spanning the interval shown between the thick solid and dashed lines of FIG. 28. Next, if sound pressure is input in this situation, the diaphragm 2 vibrates being fixed by fulcrums, which are defined as the boundaries between the elastic connectors 5a, 5b and the immovable members 4a, 4b. When vertical vibration of the diaphragm 2 is generated, distance between the diaphragm 2 and the photo detector 3 shifts by vertical displacement $\Delta d$, and the interval of the diffraction image on the top surface of the photo detector 3 changes two-dimensionally, as illustrated by the thin solid and dashed lines. The thin solid and dashed lines of FIG. 28 illustrate horizontal shift of the interval of the diffraction image generated by vertical vibration of the diaphragm 2.

Concerning the diffraction image obtained from the photo detector 3, if two diffraction images having identical degree and orientation are compared, the photo detector 3 can find differences in them throughout the span $\Delta d$ of the vibration. The photo detector 3 detects the horizontal displacement of the diffraction images being generated on the top surface of the photo detector 3, and provides an electric signal corresponding to the vertical displacement $\Delta d$ of the diaphragm 2. In the operation of the opto-acoustoelectric device, regardless of whether the diaphragm 2 is motionless or vibrating, the photo detector 3 detects the continuous vibrations of the diaphragm 2 and provides an output signal. The diaphragm 2, having a diffraction grating formed upon it, is configured to display flat characteristics in response to all frequencies of mechanical vibration. It is also acceptable however, to use a structure having a broad bandwidth that is highly sensitive to the frequencies of the mechanical vibration. The broad bandwidth characteristics are accomplished by establishing a configuration having a plurality of diaphragms 2, wherein the masses of the diaphragms have mutually different values, or the spring constants of the elastic connectors 5a, 5b may have mutually different values, which link the diaphragm 2 to the immovable members 4a, 4b.

Also, it is possible to produce the diffraction-grating merged diaphragm 2 using the same semiconductor-manufacturing process as for the photo detector 3 and its peripheral circuitry. In forming the diffraction grating on the diaphragm 2, that is, when the formation of grooves/grating on the diaphragm 2 is required, it is useful to employ the semiconductor manufacturing process. By using the semiconductor manufacturing process it becomes possible to form a diffraction grating possessing an arbitrary number of grating periods, having good reproducibility and suited to mass production. Also, it possesses a variety of physical properties that make it possible to alter the mass or spring constant of the diaphragm 2 with ease. Imagine an instance in which silicon (Si) is used for the diaphragm 2, and a laser with a wavelength below $\lambda=1000$ nm is used for the light source 1. In this situation, if the sidewalls of the grating are selectively coated with a highly reflective material so as to leave bare the top surface of silicon, the incident light beamed onto the bare top surface of silicon will be absorbed in the silicon, the light reflected from the sidewalls of the grating implements the diffracted light, which will reach to the top surface of the photo detector 3. This cuts the stray light to the photo detector 3, which as a result makes it possible to improve the S/N ratio.

According to the opto-acoustoelectric device and the vibration analysis method of the fourth embodiment of the present invention, in the same manner as that of the third embodiment, direct digitalization and frequency analysis become possible without using such complicated methods as FFT etc. According to the opto-acoustoelectric device and the vibration analysis method of the fourth embodiment of the present invention, in the same manner as that of the third embodiment, by using a plurality of sinusoidal waves, each of which having different frequencies $\omega_{0A}$s, which may be implemented by a time-division architecture or a sweeping methodology, by which frequencies $\omega_{0A}$ of sinusoidal wave is swept in a constant period, it is possible to identify the frequency component of complicated mechanical vibration.

(Fifth Embodiment)

According to the opto-acoustoelectric device and the vibration analysis method of the third and fourth embodiments of the present invention, the case in which frequency components of the complicated mechanical vibration are identified by the synchronous detection, using a plurality of sinusoidal waves, each having different frequencies $\omega_{0A}$s, which may be implemented by time-division architecture or sweeping methodology, by which frequencies $\omega_{0A}$ of sinusoidal wave is swept in a constant period. Essentially, the sweeping methodology is an equivalent to the technology of frequency modulation.

Stated plainly, in the opto-acoustoelectric device and the vibration analysis methods of the third and fourth embodiments of the present invention, the case in which the incident light is-modulated by a sinusoidal wave having a constant frequency $\omega_{0A}$ and a detected electric signal is synchronous detected by the same sinusoidal wave, as represented by Equation (7), have been explained. In the opto-acoustoelectric device of the fifth embodiment of the present invention, the following case will be explained, in which the frequency of carrier wave is modulated by a modulating signal $\sin \omega_s t$, having an angular frequency $\omega_s$, and a modulation index $\delta$, as represented by Equation (15) instead of Equation (7):

$$x_{in}(t)=\sin(\omega_{0A}t+\delta \sin \omega_s t+\phi) \qquad (15)$$

Figure 25A:
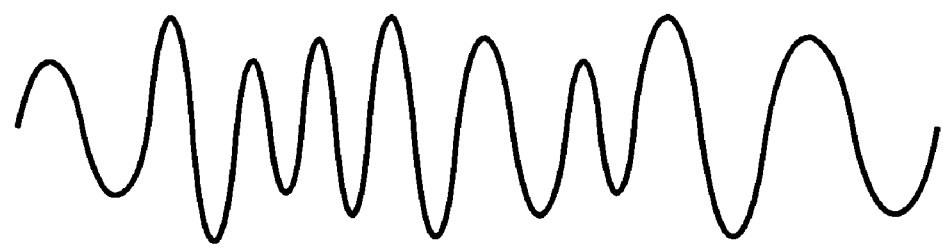
FIG. 25A is a schematic waveform of the vibration of the incident acoustic wave.
Figure 25B:
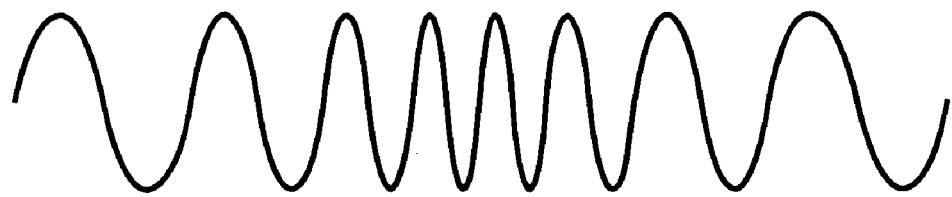
FIG. 25B is a schematic waveform of the vibration, in which the sinusoidal wave is modulated by an angular frequency of signal wave.

FIG. 25B shows a concrete example of a case in which incident light of angular frequency $\omega_{0A}$s of the carrier wave was modulated by the angular frequency $\omega_s$ of the signal wave. FIG. 25A shows the vibration of the incident sound wave. Under the condition that the frequency of the carrier wave is modulated by the signal wave $\sin \omega_s t$, and if the modulated frequency is tuned to the frequency of the incident mechanical vibration, the frequency analysis of the incident mechanical vibration become possible.

Figure 29:
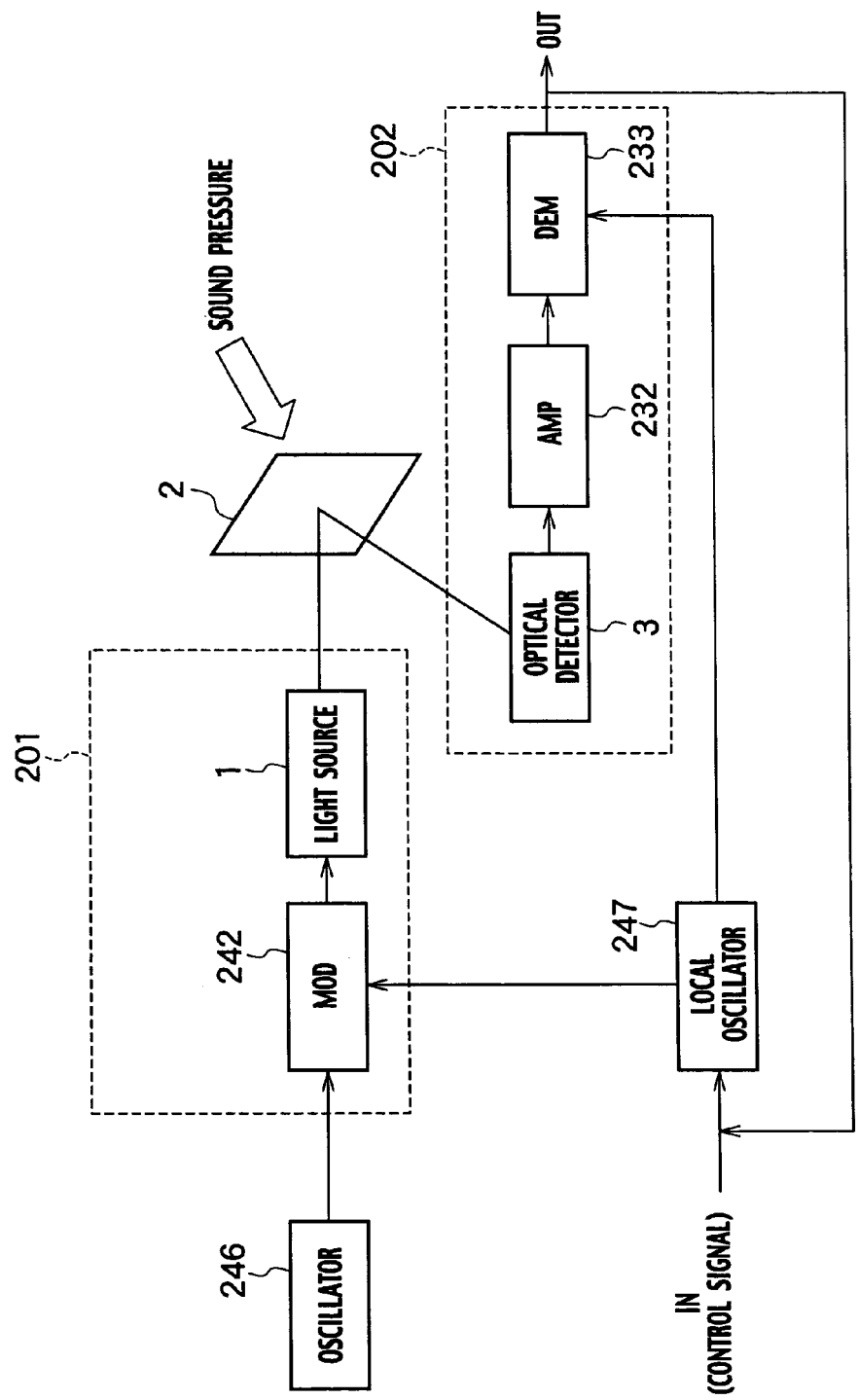
FIG. 29 is a block diagram illustrating a configuration of an opto-acoustoelectric device according to a fifth embodiment of the present invention.

Thus, as shown in FIG. 29, the opto-acoustoelectric device of the fifth embodiment of the present invention encompasses a diaphragm 2 configured to vibrate through mechanical vibration, and a light modulation unit 201 configured to beam the light onto the diaphragm 2, the intensity $x_{in}$ (t) of the light is frequency modulated as represented by Equation (15), and the demodulation unit 202 configured to analyze the frequency of the mechanical vibration by detecting the light interacted with the vibration of the diaphragm 2, and by demodulating a detected electric signal by the signal wave $\sin \omega_s t$. The light modulation unit 201 and the demodulation unit 202 are connected to a local oscillator 247 configured to supply the signal wave $\sin \omega_s t$. In addition, the light modulation unit 201 is connected to an oscillator (carrier wave oscillator) 246 configured to supply the carrier wave oscillating with the angular frequency $\omega_{OA}$.

Figure 30:
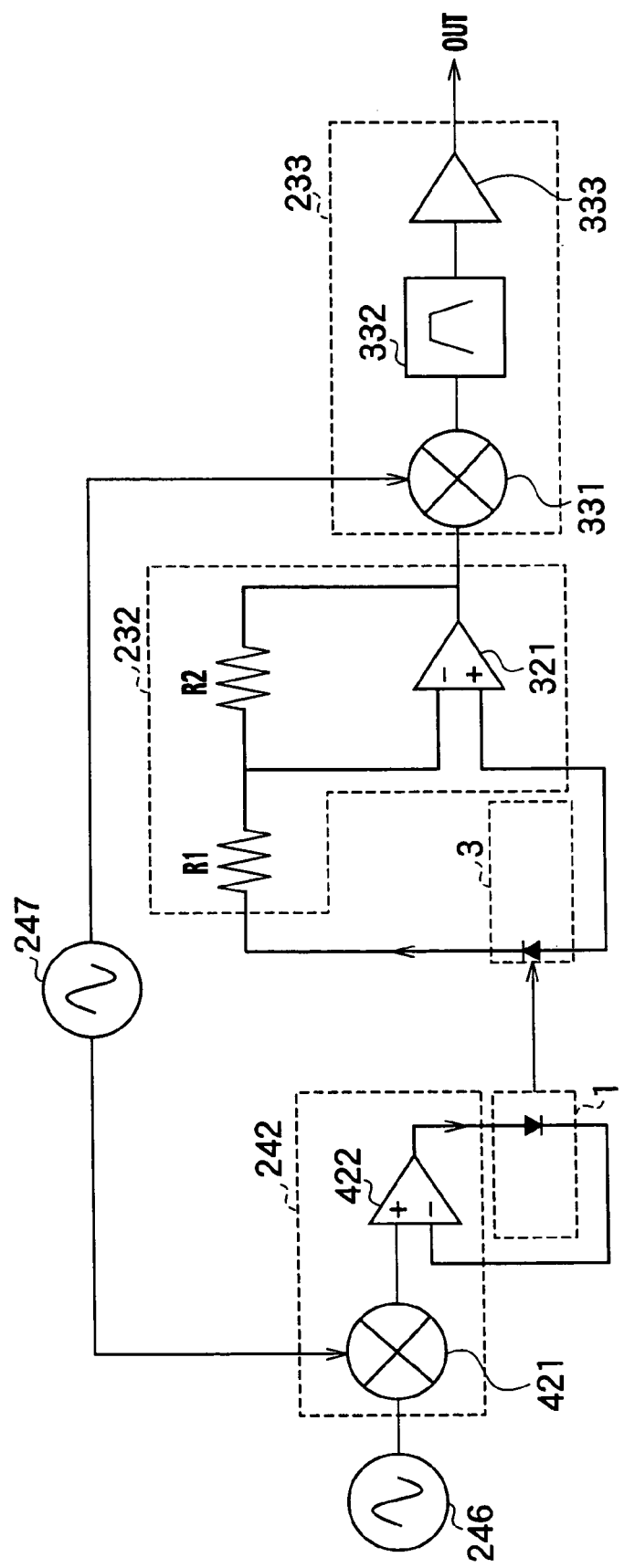
FIG. 30 is a schematic view illustrating details of the surrounding elements associated with the diaphragm of the opto-acoustoelectric device according to the fifth embodiment of the present invention.

The light modulation unit 201 includes a light source 1 configured to beam light onto the diaphragm 2 and the optical modulator 242 configured to modulate the output of the light source of 1 so that the light intensity $x_{in}$ (t) changes sinusoidally according to Equation (15). As shown in FIG. 30, the optical modulator 242 embraces a mixer 421 and an operational amplifier 422. The light source 1 is connected between an output terminal and an inverting input terminal (− terminal) of the operational amplifier 422, and an output terminal of the mixer 421 is connected to a noninverting input terminal (+ terminal) of the operational amplifier 422. By the mixer 421, the carrier wave from the carrier wave oscillator 246 and the signal wave $\sin \omega_s t$ from the local oscillator 247 are mixed so as to generate a modulated sinusoidal wave, the frequency of the modulated sinusoidal wave is represented by Equation (15). When the light source 1 is implemented by a semiconductor light-emitting element such as a light emitting diode (LED) or a semiconductor laser, the optical modulator 242 can modulate the driving current of the semiconductor light-emitting element using the modulated sinusoidal wave, the frequency of the modulated sinusoidal wave is represented by Equation (15).

The demodulation unit 202 includes a photo detector 3 configured to detect the light interacted with the vibration of the diaphragm 2 and to convert the detected light into an electric signal, and a amplifier 232 configured to amplify an electric signal and a demodulator 233 configured to analyze the frequency of the mechanical vibration, getting the information on the amplitude and/or phase of the vibration of the diaphragm 2, after demodulating an electric signal amplified by the amplifier 232, using the signal wave $\sin \omega_s t$, represented by Equation (15), as the demodulation signal. The amplifier 232 is made of an operational amplifier 321. The cathode electrode of the photo detector 3 is connected to the inverting input terminal (− terminal) of the operational amplifier 321 through an input resistance R1. Between an output terminal and an inverting input terminal (− terminal) of the operational amplifier 321, a feedback resistance R2 is connected. The demodulator 233 embraces a mixer 331, a band pass filter (BPF) 332 and an amplifier 333 as shown in FIG. 30. In the mixer 331, the sinusoidal wave being transferred from the output terminal of the operational amplifier 321 and the signal wave $\sin \omega_s t$ from the local oscillator 247 are supplied and mixed. In the mixer 331, according to the frequency mixing, the signal having a frequency corresponding to the difference between the sinusoidal wave of a carrier wave and the signal wave $\sin \omega_s t$ from the local oscillator 247 is extracted. The signal corresponding to the difference frequency is amplified by the amplifier 333, after passing the band pass filter (BPF) 332.

According to the opto-acoustoelectric device and vibration analysis method of the fifth embodiment of the present invention, in the same manner as that of the third and forth embodiments, it is possible to directly digitalize and analyze the frequencies without using such complicated methods as FFT etc.

(Sixth Embodiment)

A feature of the opto-acoustoelectric device according to a sixth embodiment of the present invention lies in a vibration driving mechanism configured to drive actively the vibration of the diaphragm Namely the vibration driving mechanism encompasses a stationary electrode fixed to the supporting substrate and a movable electrode fixed to the diaphragm, and an electrostatic force is applied across the stationary and movable electrodes so as to drive actively the vibration of the diaphragm Especially, the opto-acoustoelectric device according to the sixth embodiment of the present invention encompasses the acoustoelectric transducer and a control unit configured to process a signal provided by the acoustoelectric transducer, and the control unit induces an oscillating electrostatic force, which corresponds to an electrical sound signal ascribable to displacement of the diaphragm, between the diaphragm and the supporting substrate in the acoustoelectric transducer so that the diaphragm can vibrate actively. For this purpose, the control unit may embrace a driving circuit, which applies a drive voltage across the stationary and movable electrodes.

FIG. 31 is a schematic diagram of the opto-acoustoelectric device equipped with the acoustoelectric transducer of the sixth embodiment. As shown in FIG. 31, the opto-acoustoelectric device embraces an acoustoelectric transducer 60 and a control unit 603. The acoustoelectric transducer 60 encompasses a mechanical vibration element 601 and optical measurement system 602. The mechanical vibration element 601 is equipped with a supporting substrate 11, immovable members 4a, 4b established on the perimeter of the supporting substrate 11, a diaphragm 2 configured to vibrate by sound pressure, and a plurality of elastic connectors 5a, 5b configured to connect the diaphragm 2 to the immovable members 4a, 4b respectively. Although two immovable members 4a, 4b are apparently illustrated in the cross-sectional view in FIG. 31, the immovable members 4a, 4b can be actually merged into a single piece of flame-shaped member in a plan view, which is connected at near side and rear side of the paper showing the cross-sectional view. A hollow space or a cavity 9 is established between the diaphragm 2 and the supporting substrate 11. The bottom surface of the diaphragm 2 is facing to the top surface of the supporting substrate 11. In other words, the diaphragm 2 is suspended by the elastic connectors 5a, 5b and can be vibrated in the up and down direction defined as thickness direction (vertical direction) of the diaphragm 2 by receiving the acoustic wave.

And, the movable electrode 65, implementing the vibration driving mechanism, is illustrated such that it is formed at the bottom surface of the diaphragm 2 in FIG. 31. It is preferable that movable electrode 65 is formed in the diaphragm 2 near the bottom surface of the diaphragm 2, but the movable electrode 65 can be disposed on any plane defined in the diaphragm 2, actually. In addition, the top surface of the diaphragm 2 is equipped with the diffraction grating.

The vibration driving mechanism (65, 11) of the sixth embodiment further encompasses a stationary electrode fixed to the supporting substrate 11 in addition to the movable electrode 65 fixed to the diaphragm 2. For implementing the stationary electrode, at least a part of the supporting substrate 11 may be made of a conductive substrate, and generally, it is preferable to use a low resistivity semiconductor substrate such as a low resistivity silicon substrate, which can facilitate the integration of semiconductor integrated circuits, for providing the stationary electrode by the conductive substrate. The immovable members 4a, 4b, the diaphragm 2, the elastic connectors 5a, 5b and the cavity 9 can be formed by using the technology for manufacturing semiconductor integrated circuits. That is to say, it is possible to manufacture the mechanical vibration element 601 by film formation process, photolithography process and etching process using materials for implementing the semiconductor integrated circuit.

In the case that the supporting substrate 11 serves as the stationary electrode, the movable electrode 65 and the supporting substrate (stationary electrode) 11 are electrically connected through corresponding wirings to control unit 603, which is a peripheral circuit of the mechanical vibration element 601, respectively. Still, the supporting substrate 11 does not need to manifest low resistivity (high conductivity) by itself, as long as a stationary electrode is buried in the inside of the supporting substrate 11 or is mounted at the surface of the supporting substrate 11. A metallic film or a doped polysilicon film may be buried in the inside of the supporting substrate 11 or may be deposited at the surface of the supporting substrate 11 for serving as the stationary electrode. Or a heavily doped semiconductor layer may be buried in the inside of the supporting substrate 11 as the stationary electrode. In the case that the supporting substrate 11 has the stationary electrode, the stationary electrode is connected to the control unit 603.

The optical measurement system 602 encompasses a light source 1 and a photo detector 3. The light source 1 may be a semiconductor light-emitting element of high directivity and it is preferable to be made of a semiconductor laser. The light source 1 is provided at a position where the light source 1 can beam the top surface of the diaphragm 2, or more preferably around the central area of the top surface of the diaphragm 2 along an oblique direction. The light hv beamed from the light source 1 is reflected by the top surface of diaphragm 2. The photo detector 3 is provided at a position where the photo detector 3 can receive the reflected light, and for example, it is made of a bisectional photo detector or an image sensor.

Besides, the vertical position of the diaphragm 2 shifts by the vibration associated with the sound pressure. Therefore, the position of the light at which the light reaches to the top surface of the diaphragm 2 also fluctuates on a horizontal plane of the top surface in proportion to the fluctuation. And, the optical path of the reflected light also fluctuates. The fluctuation of the optical path of reflected light is detected by the photo detector 3 as a change of the intensity distribution of the light, and the detected light signal is fed from the photo detector 3 as a detected electric signal. More specifically, the photo detector 3 does not detect differences in light intensity. Instead the photo detector 3 detects the two-dimensional displacement, which corresponds to the vertical displacement of the diaphragm 2, by sensing the pattern of the two-dimensional diffraction image. Thus the image sensor is ensured a sufficiently wide area for diffracted light so that it is possible to fully and completely detect the two-dimensional diffraction image.

The detected electric signal fed from the photo detector 3 is in turn delivered to the control unit 603 disposed at outside of the acoustoelectric transducer 60. The control unit 603 has a processor 61, and the processor 61 converts the detected electric signal into electrical sound signal. And, the control unit 603 has a driving circuit 62 and the driving circuit 62 provides the driving voltage Vp, in which an arbitrary frequency signal is superposed on a fixed bias voltage Vb, based on the control signal transferred from the processor. The driving circuit 62 may be implemented by a voltage-controlled oscillator (VCO). The driving voltage Vp is applied across the space between the movable electrode 65 and the supporting substrate (stationary electrode) 11, the movable electrode 65 is formed at the bottom surface of the diaphragm 2. By the bias voltage Vp, the electrostatic force is established between the movable electrode 65 and the supporting substrate (stationary electrode) 11, and the movable electrode 65 is pulled down to the supporting substrate (stationary electrode) 11. Consequently, the diaphragm 2 vibrates actively in proportion to the frequency, which is superposed on the driving voltage Vp. In other words, while the diaphragm 2 is actively vibrated by the driving voltage Vp, a passive vibration of the diaphragm 2 induced by a sound pressure is superposed on the active vibration in the diaphragm 2.

When the movable electrode 65 is formed at the bottom surface of the diaphragm 2, the threshold voltage $V_{th}$ required for the diaphragm 2 being pulled down to the supporting substrate (stationary electrode) 11 is given by:

$$V_{th} = (8kd^3/27A \in \in_0)^{1/2} \quad (16)$$

Here, "D" represents the distance between the bottom surface of the diaphragm 2 and the top surface of the supporting substrate (stationary electrode) 11, "k" represents the spring constant associated with the diaphragm 2, and "A" represents the area of the bottom surface of the diaphragm 2. And, $\in_0 = 8.854 \times 10^{-12}$ (N/m) and $\in$ is the dielectric constant of air and it is equal to 1. And under these conditions, the electrostatic force $F_e$ between the diaphragm 2 and the supporting substrate (stationary electrode) 11 is given by:

$$F_e = A \in \in_0 V^2/2d^2 \quad (17)$$

Figure 32A:
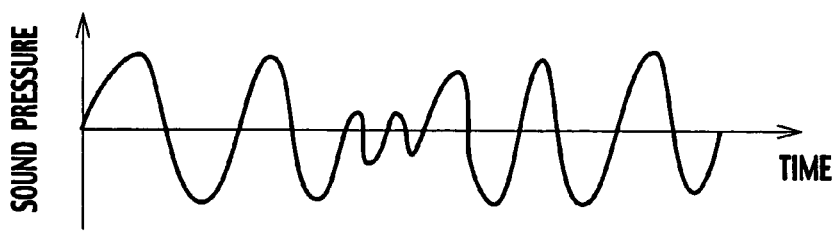
FIG. 32A is a diagram showing the waveform of the sound pressure which the diaphragm is supposed to receives.
Figure 32B:
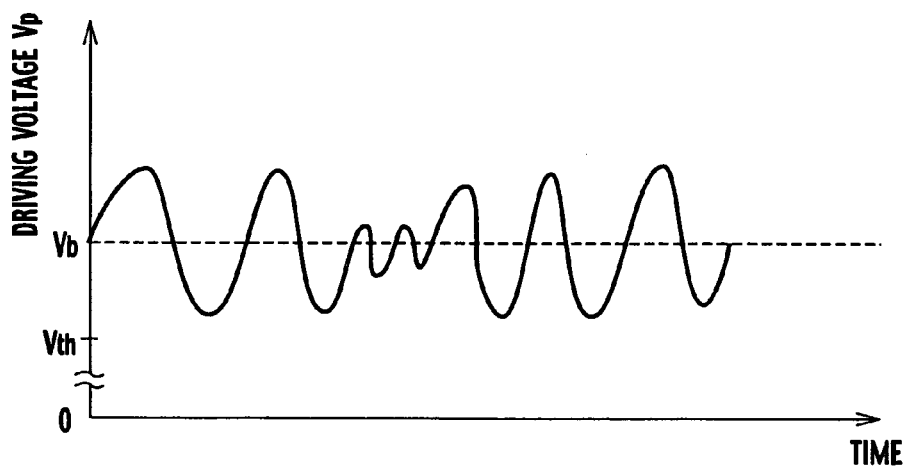
FIG. 32B is a diagram describing the waveform of the driving voltage Vp, which is generated by feedbacking the detected vibration of the diaphragm, associated with the sound pressure.
Figure 32C:
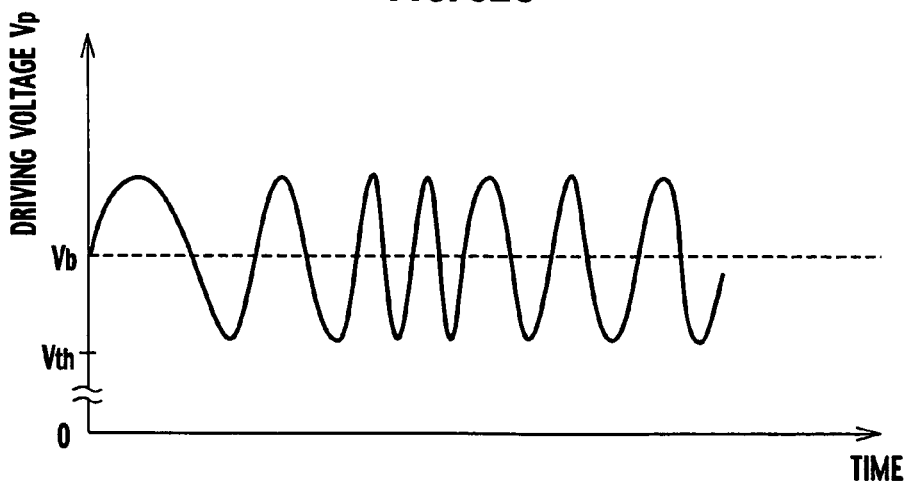
FIG. 32C is another diagram describing the waveform of the driving voltage Vp, which is generated by feedbacking the detected vibration of the diaphragm, associated with the sound pressure.

Therefore, the bias voltage Vb applied across the diaphragm 2 and the supporting substrate 11 must be larger than the threshold voltage $V_{th}$ represented by above-mentioned Equation (16). FIG. 32A to FIG. 32C explain the relationship between the passive vibration of the diaphragm 2 associated with sound pressure and the active vibration of the diaphragm 2 driven by the application of the bias voltage Vp. FIG. 32A shows an example of sound pressure which diaphragm 2 receives and FIG. 32B shows an example where the driving voltage Vp is generated based on the result (namely, a detected electric signal) of detecting the vibration of diaphragm 2 by the sound pressure. Drive voltage Vp shown in the FIG. 32B is the signal in which the frequency component equal to the electrical sound signal generated from the detected electric signal is superposed upon the bias voltage Vb. Especially, the amplitude of the respective frequency components, which implements the bias voltage Vp, also fluctuates with respect to the frequency of the vibration, which is generated by an electrical sound signal.

By applying the bias voltage Vp shown in FIG. 32B across the space between the movable electrode 65 and the supporting substrate (stationary electrode) 11, the diaphragm is actively vibrated, as the waveform is shown in FIG. 32B. The diaphragm 2 vibrates passively in addition to the active vibration, by sound pressure. While the diaphragm 2 is actively vibrating with the waveform shown FIG. 32B, when the diaphragm 2 receives further the acoustic wave having the frequency components as shown FIG. 32A, the passive vibration of the corresponding frequency component is selectively intensified. The intensified vibration is processed as the amplified electrical sound signal by the photo detector 3 and the processor 61. In other words, the amplifying function of an electrical sound signal can be realized through the acoustoelectric transducer 60 and the control unit 603. Especially, as shown in FIG. 32B, large sound pressure is amplified as a larger electrical sound signal, since the amplitude of the drive signal voltage Vp also fluctuates in proportion to sound pressure.

FIG. 32C shows another example of the bias voltage Vp, which is generated based on the result (namely, detected electric signal) of the detection of the vibration of diaphragm 2 associated with the sound pressure shown in FIG. 32A. Though the driving voltage Vp shown in FIG. 32C has the frequency component equal to the sound pressure shown in FIG. 32A, the amplitude is fixed. Therefore, the sound pressure with the frequency component shown in FIG. 32A can be amplified at a constant amplification factor, when the bias voltage Vp is applied across the space between the movable electrode 65 and the supporting substrate (stationary electrode) 11.

The above-mentioned amplification can be realized, when the phase of the active vibration of the diaphragm 2 is tuned to the phase of the passive vibration generated by the sound pressure. Conversely, in the case in which the phase of active vibration of the diaphragm 2 is inverse to the phase of the passive vibration induced by sound pressure, the active vibration of the diaphragm 2 and the passive vibration induced by the sound pressure are canceled each other and the sensitivity decreases. By utilizing the phase relationships, information on the phase of the passive vibration induced by the sound pressure can be detected. Since the phase of the passive vibration induced by sound pressure is dependent on the distance between the acoustoelectric transducer 60 and the sound source, for example, phase difference in the case in which acoustic waves are irradiated from the right and left directions of the acoustoelectric transducer 60 is different from phase difference in the case in which acoustic wave is irradiated from the upper direction of the acoustoelectric transducer 60. By utilizing the orientation dependence of the phase relationships, and by detecting phase difference corresponding to one wavelength, it becomes possible to specify the location of the sound source. In the sound field where various sound sources intermingle, the function that the specific position of sound source can be extracted with ease achieves a great technical advantage in the field of speech recognition technology.

Next, a concrete structure of the mechanical vibration element 601 according to the sixth embodiment of the present invention will be explained. As shown in FIG. 33, the mechanical vibration element 601 encompasses a layered structure implemented by a buried dielectric film 12, an element-isolation dielectric film 13, an interlayer dielectric film 14, a conductive grid ($131_1$, $131_2$, . . . $131_9$) and a passivation film 15, which are sequentially deposited in this order on the top surface of the supporting substrate 11. The conductive grid ($131_1$, $131_2$, . . . $131_9$), or the framework of crisscrossed conductive wires $131_1$, $131_2$, . . . $131_9$ serves as the movable electrode 65 illustrated in the schematic view shown in FIG. 31. As mentioned above, the movable electrode 65 can be disposed on any plane defined in the diaphragm 2, although it is preferable that movable electrode 65 is formed near the bottom surface of the diaphragm 2. And the conductive grid ($131_1$, $131_2$, . . . , $131_9$) serving as the movable electrode 65 is disposed near the top surface of the diaphragm 2 in the actual configuration shown in FIG. 33.

The supporting substrate 11 is made of a single crystal silicon and the buried dielectric film 12 is made of a SOI oxide film and the element-isolation dielectric film 13 is made of a tetraethoxyorthosilicate (TEOS) oxide film. And, the interlayer dielectric film 14 is made of a silicone oxide ($SiO_2$) film and the conductive grid ($131_1$, $131_2$, . . . $131_9$) is made of aluminum (Al) films and the passivation film 15 is made of a silicon nitride ($Si_3N_4$) film.

The bathtub-shaped cavity 9R is formed in the supporting substrate 11. Within the above-mentioned layered structure, the immovable members 4a, 4b are implemented by the parts which are located both at perimeter of the bathtub-shaped cavity 9R and on the top surface of the supporting substrate 11. Concretely, the immovable members 4a, 4b are made of a stacked structure embracing the buried dielectric film 12, the element-isolation dielectric film 13, the interlayer dielectric film 14 and the passivation film 15.

Figure 34A:
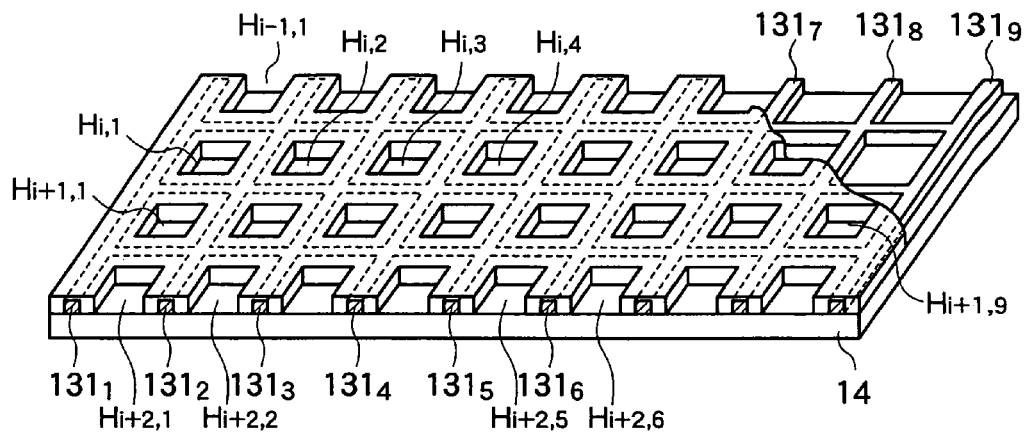
FIG. 34A is a birds-eye view of a reflection-type two-dimensional reflection-type diffraction grating, burying a conductive grid therein.
Figure 34B:
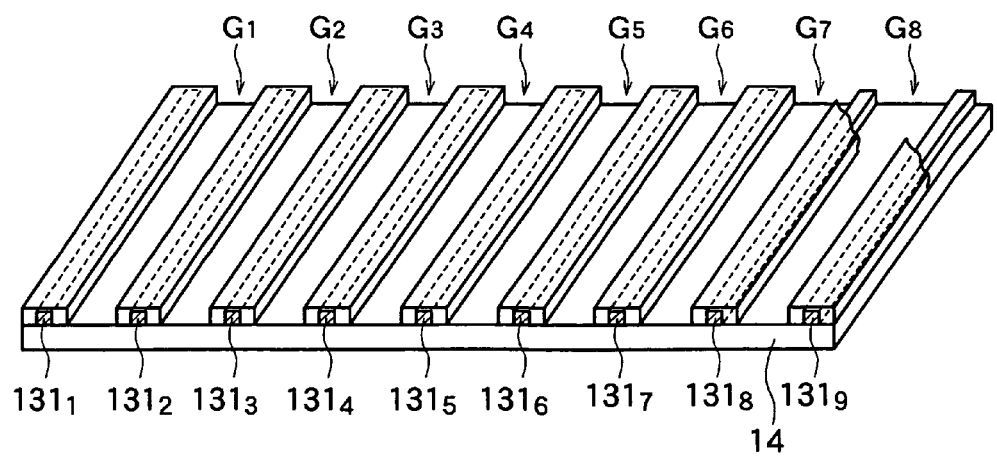
FIG. 34B is a birds-eye view of a reflection-type one-dimensional reflection-type diffraction grating, burying a conductive grid therein.

Especially, the passivation film 15, which is incorporated in the diaphragm 2, implements the diffraction grating shown in FIG. 34A and FIG. 34B. The conductive grid ($131_1$, $131_2$, . . . , $131_9$) is buried in the diffraction grating. Within the above-mentioned layered structure, the elastic connectors 5a, 5b are made of stacked composite structures, which are located above the peripheral portion of the bathtub-shaped cavity 9R Concretely, the elastic connectors 5a, 5b are made of the stacked composite structures embracing the buried dielectric film 12, the element-isolation dielectric film 13, and the interlayer dielectric film 14. Furthermore, polysilicon connectors 21a, 21b are respectively buried in the element-isolation dielectric film 13 so as to make the elastic connectors 5a, 5b. The elastic connectors 5a, 5b connect the diaphragm 2 to the immovable members 4a, 4b so as to suspend the diaphragm 2 above the bathtub-shaped cavity 9R.

In the space between the immovable member 4a and the elastic connector 5a, the space between the elastic connector 5a and the diaphragm 2, the space between the elastic connector 5b and the diaphragm 2, and the space between the immovable member 4b and the elastic connector 5b, piercing slits TH1, TH2, TH3 and TH4, which penetrate the stacked composite structure from the top surface to the bathtub-shaped cavity 9R, are formed respectively. The piercing slits TH1, TH2, TH3 and TH4 function as etchant supplying paths for forming bathtub-shaped cavity 9R.

FIG. 34A and FIG. 34B show examples of the diffraction grating. FIG. 34A is a bird's-eye view illustrating an example of a two-dimensional diffraction grating and FIG. 34B is a bird's-eye view illustrating the example of a one-dimensional diffraction grating. As illustrated in FIG. 34A, in the two-dimensional diffraction grating, a framework of crisscrossed conductive wires $131_1$, $131_2$, . . . , $131_9$, which is serving as the movable electrode 65 shown in FIG. 31, is buried in the passivation film 15 disposed on the interlayer dielectric film 14 so as to form a two-dimensional configuration. In FIG. 34, a pattern of regularly spaced horizontal and vertical conductive wires $131_1$, $131_2$, . . . , $131_9$ forms a two-dimensional grating.

And as illustrated in FIG. 34B, in the one-dimensional diffraction grating, a framework of parallel conductive wires $131_1$, $131_2$, . . . , $131_9$, which is serving as the movable electrode 65 shown in FIG. 31, is buried in the passivation film 15 disposed on the interlayer dielectric film 14. In FIG.

34B, a plurality of straight conductive wires are running in parallel so as to form a one-dimensional grating.

When the light emitted from the light source 1 is incident upon the diffraction grating on the diaphragm 2, the reflected light is self-focused according to the optical characteristic of the diffracted light, and the focused beam impinges the top surface of the photo detector 3. In other words, because the self-focused behavior of the diffracted light is established by the diffraction grating, in the optical measurement system 602, any optical components for guiding the light emitted from the light source 1 and any optical components for collimating the reflected light from the diaphragm 2 to the photo detector 3, such as lenses, optical fiber and optical waveguide, are not required.

Figure 35:
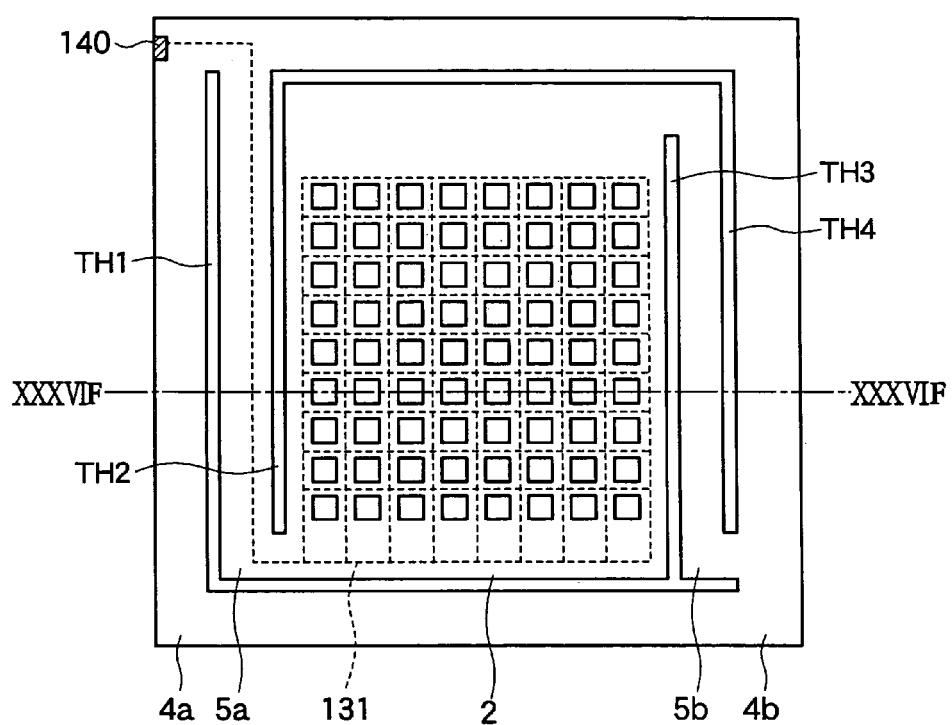
FIG. 35 is a plan view of the mechanical vibration element shown in FIG. 33.

FIG. 35 is a plan view illustrating the mechanical vibration element 601. FIG. 33 is the corresponding cross-sectional view taken on line XXXV—XXXV in FIG. 35. The diaphragm 2 is suspended from the immovable members 4a, 4b through the elastic connectors 5a and 5b, each of which is established into a meandering shape, including a plurality of bent corners. Although apparently illustrated as if two immovable members 4a, 4b exist in the cross-sectional view in FIG. 31, the immovable members 4a, 4b are merged into a single piece of flame-shaped member in the plan view shown in FIG. 35. A network of uniformly spaced horizontal and perpendicular dashed lines 131 represents the conductive grid ($131_1, 131_2, \ldots, 131_9$) shown in FIGS. 33 and 34A, which corresponds the movable electrode 65 in FIG. 31.

In the space between the left immovable member 4a and the elastic connector 5a, and the space between the elastic connector 5a and the left side of the diaphragm 2 in which a network of the conductive grid ($131_1, 131_2, \ldots, 131_9$) is buried, the piercing slits TH1 and TH2 are formed so as to implement a route of the meandering elastic connector 5a as shown in FIG. 35. Similarly, in the space between the elastic connector 5b and the right side of the diaphragm 2, and the space between the right immovable member 4b and the elastic connector 5b, the piercing slits TH3 and TH4 are formed so as to implement a route of the meandering elastic connector 5b. And the one of the horizontal dashed lines 131, or a conductive wire 131 is patterned to extend along the meandering elastic connector 5a so as to be electrically connected to the connection terminal 140 established at an upper and left edge of the immovable member 4a in FIG. 35. The connection terminal 140 is so designed such that the connection terminal 140 can be connected to an external wiring, which leads to the driving circuit 62.

Hereinafter, a manufacturing method of the mechanical vibration element 601 for the opto-acoustoelectric device according to the sixth embodiment, which is shown in FIG. 33, will be described.

Figure 36A:
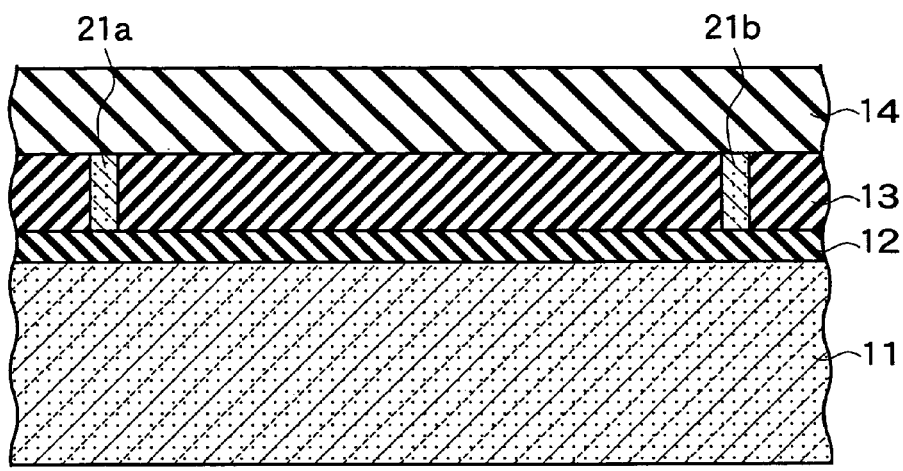
FIG. 36A is a cross-sectional view showing a process stage, in which an interlayer dielectric film is deposited on an element-isolation dielectric film, which buries polysilicon connectors, in a sequence of the manufacturing method of the mechanical vibration element, which implements the acoustoelectric transducer of the sixth embodiment of the present invention.

(a) By taking the same procedure as the manufacturing method explained in the first embodiment, the SOI substrate is prepared by sequentially stacking a buried dielectric film (SOI oxide film) 12, and a single crystal silicon layer (SOI layer) 10 in this order on a supporting substrate 11. The single crystal silicon layer 10 is selectively removed, and polysilicon connectors 21a, 21b are delineated on the dielectric film (SOI oxide film) 12 which is located above the single crystal silicon layer (SOI layer) 10. FIG. 36A, which corresponds to FIG. 12E explained in the first embodiment, shows the process stage in which the polysilicon connectors 21a, 21b are buried in the element-isolation dielectric film 13, and an interlayer dielectric film 14 is formed on the element-isolation dielectric film 13. The top surface of the interlayer dielectric film 14 is planarized so as to form a flat stacked structure embracing the interlayer dielectric film 14, the element-isolation dielectric film 13, the buried dielectric film (SOI oxide film) 12.

Figure 36B:
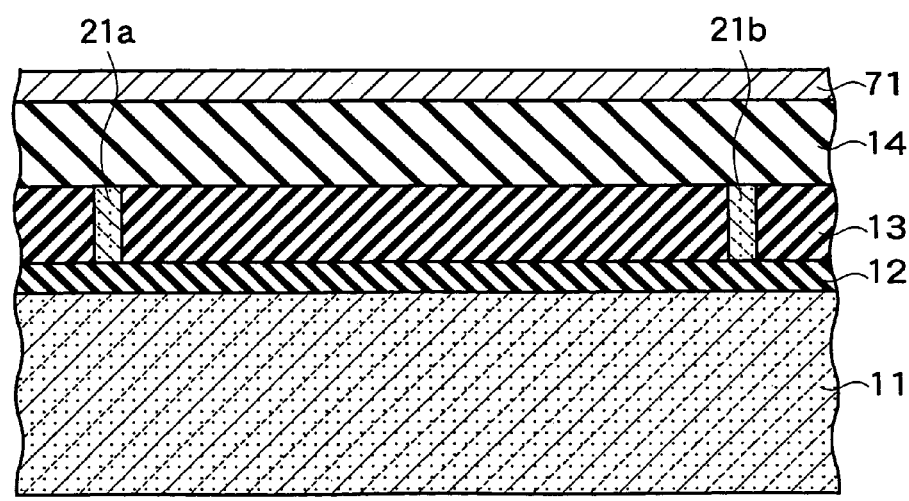
FIG. 36B is a cross-sectional view showing a process stage, in which a metallic layer implementing a conductive layer is deposited on an interlayer dielectric film, in the sequence of the manufacturing method of the mechanical vibration element of the sixth embodiment.
Figure 36C:
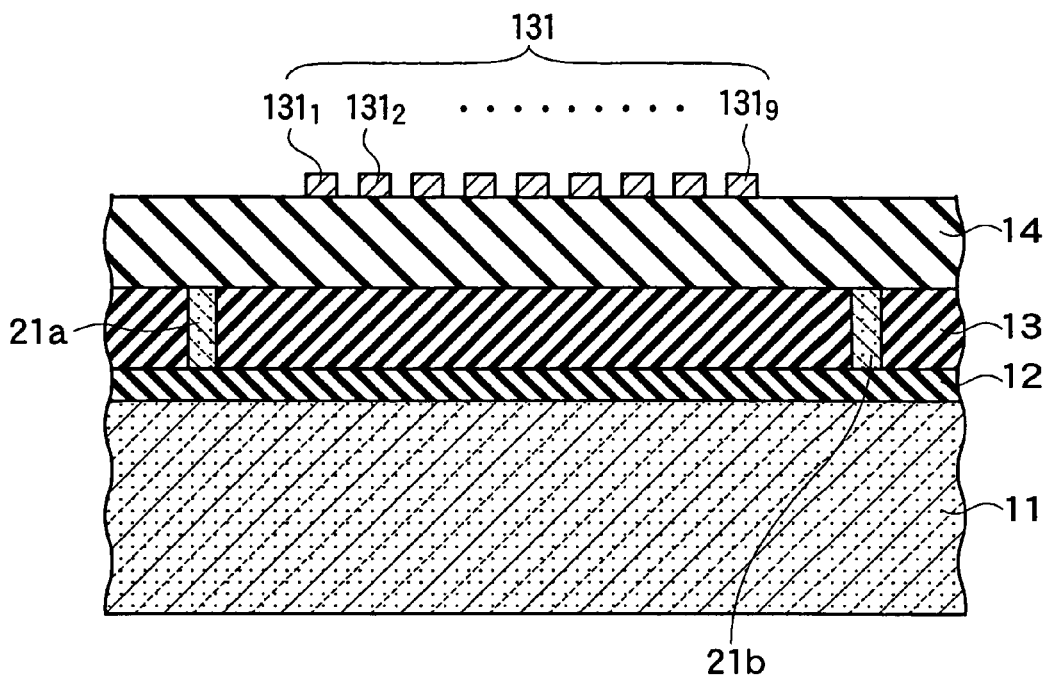
FIG. 36C is a cross-sectional view showing a process stage, in which a conductive grid is delineated on the interlayer dielectric film, in the sequence of the manufacturing method of the mechanical vibration element of the sixth embodiment.

(b) Next, a metallic layer 71 for the material making the conductive grid ($131_1, 131_2, \ldots, 131_9$) is deposited on the interlayer dielectric film 14 by using a well-known film formation process of sputtering, etc., as shown in FIG. 36B. Afterwards, the metallic layer 71 is delineated by using photolithography process and etching process, as shown in FIG. 36C. By patterning, the conductive grid ($131_1, 131_2, \ldots, 131_9$) possessing almost identical shape and identical pitch is defined as the diffraction grating.

Figure 36D:
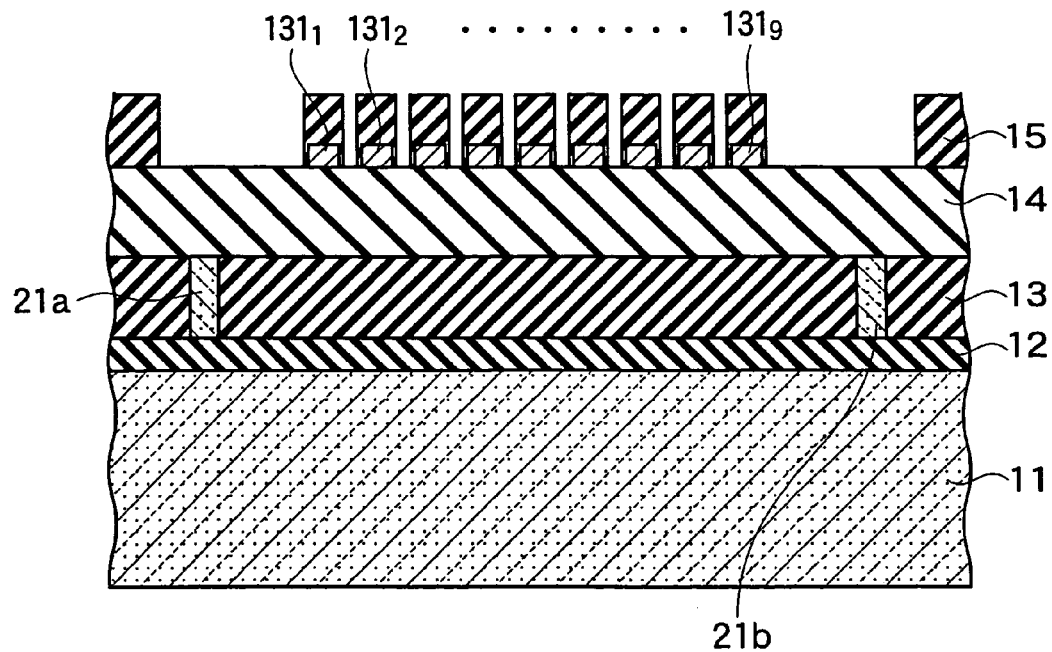
FIG. 36D is a cross-sectional view showing a process stage, in which a passivation film is deposited on a conductive grid, in the sequence of the manufacturing method of the mechanical vibration element of the sixth embodiment.

(c) Next, a passivation film 15 is deposited over the conductive grid ($131_1, 131_2, \ldots, 131_9$) and the interlayer dielectric film 14 by using a film formation method such as the CVD process. Then, patterning of the passivation film 15 is performed by photolithography process and etching process, as shown in FIG. 36D. By patterning of the passivation film of 15, part of the immovable members 4a, 4b and diffraction grating are obtained.

Figure 36E:
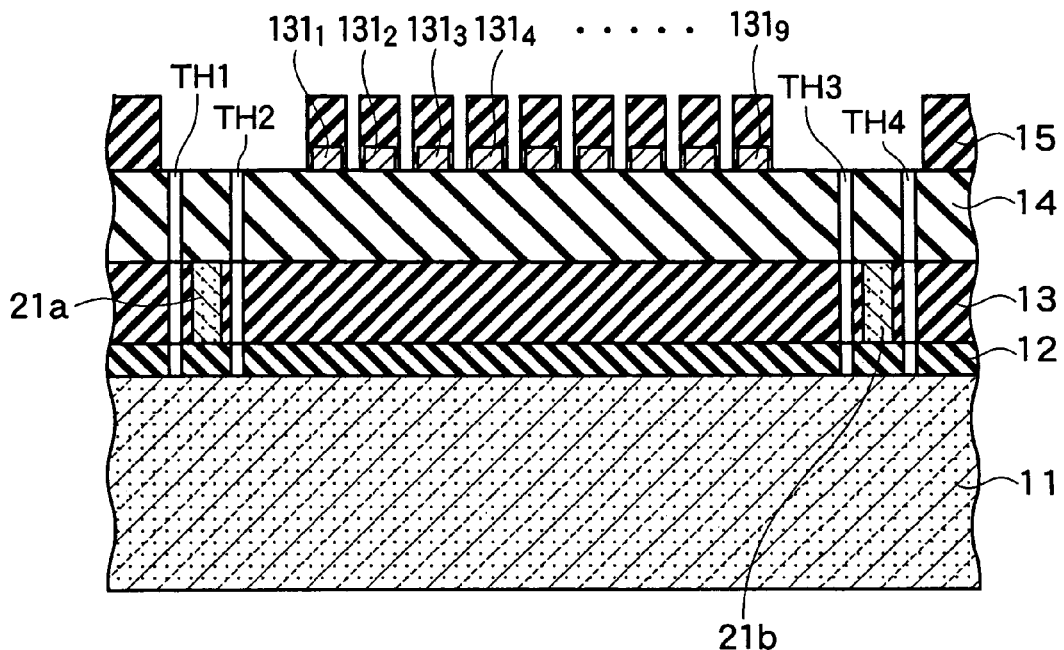
FIG. 36E is a cross-sectional view showing a process stage, in which a plurality of piercing slits, which penetrate the interlayer dielectric film, the element-isolation dielectric film and the buried dielectric film, is formed in the sequence of the manufacturing method of the mechanical vibration element of the sixth embodiment.

(d) Next, the piercing slits TH1, TH2, TH3 and TH4 which penetrates the interlayer dielectric film 14, the element-isolation dielectric film 13 and the buried dielectric film 12 are formed by using a photolithography process and an etching process such as RIE and ECR ion etching, as shown in FIG. 36E. In other words, the piercing slits TH1, TH2, TH3 and TH4 which penetrate the diaphragm 2 are formed.

Figure 36F:
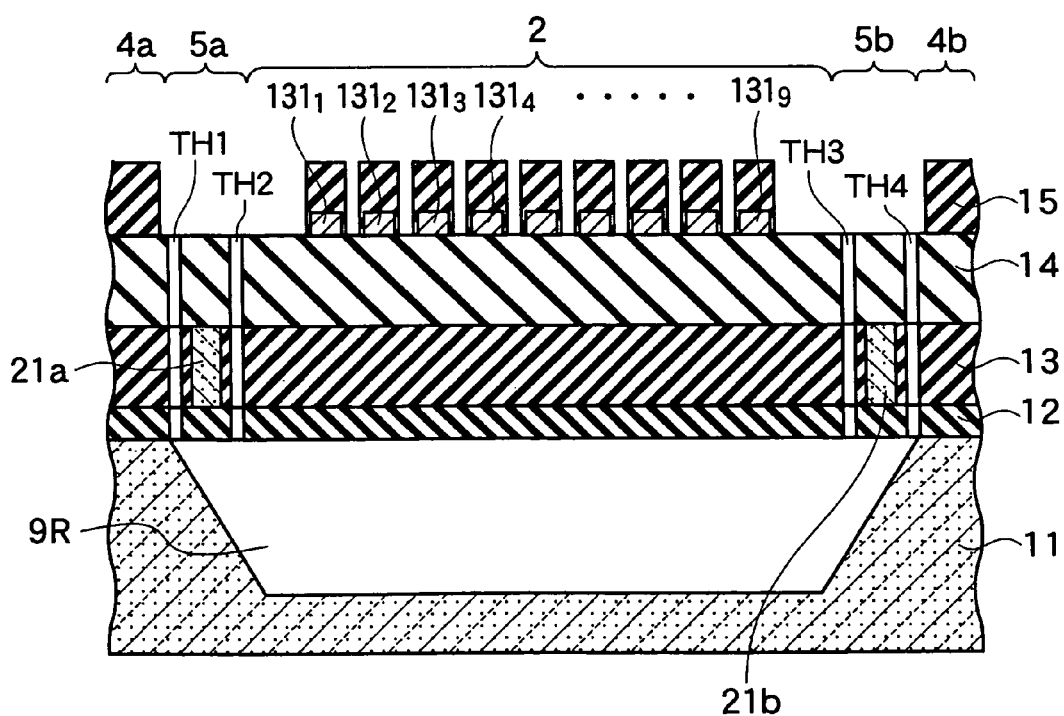
FIG. 36F is a cross-sectional view showing a process stage, in which a cavity is formed at a surface of and in a supporting substrate in a sequence of the manufacturing process of a mechanical vibration element of the sixth embodiment.

(e) Finally, anisotropic etchant such as TMAH is supplied into the piercing slits TH1, TH2, TH3 and TH4 so as to perform anisotropic etching of the supporting substrate 11. By the anisotropic etching, the bathtub-shaped cavity 9R is formed at the surface of and in the supporting substrate 11, as shown in FIG. 36F. The bathtub-shaped cavity 9R may be formed with a dry etching using xenon difluoride ($KeF_2$) using the piercing slits TH1, TH2, TH3 and TH4. By the above-mentioned sequence of processes, the opto-acoustoelectric device shown in FIG. 33 is completed.

In addition to the piercing slits TH1, TH2, TH3 and TH4, in the process stage shown in FIG. 36E, micro through-holes which penetrates the interlayer dielectric film 14, the element-isolation dielectric film 13 and the buried dielectric film 12 may be opened in the interstices of the diffraction grating, and the etchant may be injected into the micro through-holes to form the bathtub-shaped cavity 9R by anisotropic etching. Or the bathtub-shaped cavity 9R may be formed by $KeF_2$ dry etching using the micro through-holes opened in the interstices of the diffraction grating. FIG. 37 is a cross-sectional view of the opto-acoustoelectric device according to a modification of the sixth embodiment, which is fabricated by the process using the micro through-holes $H_{i,1}, H_{i,2}, \ldots H_{i8}$. By increasing the etchant charging paths with the micro through-holes $H_{i,1}, H_{i,2}, \ldots H_{i8}$, the bathtub-shaped cavity 9R can be formed in shorter time than the case in which only the piercing slits TH1, TH2, TH3 and TH4 are employed.

As explained hereinbefore, the conductive grid ($131_1, 131_2, \ldots, 131_9$), serving as the movable electrode 65, is buried in the diaphragm 2 according to the acoustoelectric transducer 60 of the sixth embodiment. Therefore, the diaphragm 2 can be actively vibrated by applying the bias voltage Vp across the movable electrode 65, provided at the surface of or in the diaphragm 2, and the supporting substrate (stationary electrode) 11 in the opto-acoustoelectric device of the sixth embodiment. Especially, in the opto-acoustoelectric device according to the sixth embodiment, the waveform of the bias voltage Vp is generated, after feedbacking the frequency of the vibration of the diaphragm 2, which is detected by the optical measurement system 602, therefore it becomes possible to amplify a electrical sound signal without employing an amplifier, and therefore, the load on the hardware organization of the signal processing system for analyzing the electrical sound signal is reduced.

(Seventh Embodiment)

As shown in FIG. 38, a feature of an opto-acoustoelectric device of a seventh embodiment of the present invention lies in a configuration, which has the acoustoelectric transducer 60, which is substantially same as the configuration explained in the sixth embodiment, a processor 61, and a vibration driver 302 configured to apply voltage of the given frequency to the space between the diaphragm 2 of the acoustoelectric transducer 60 and the supporting substrate 11, which supports the diaphragm 2. The acoustoelectric transducer 60 shown in FIG. 38 encompasses a mechanical vibration element 601, an optical measurement system 602. The processor 61 is configured to convert a detected electric signal provided by the optical measurement system 602 to an electrical sound signal, and the vibration driver 302 is configured to provide a driving voltage having a given frequency to the space between the diaphragm 2 of the mechanical vibration element 601 and the supporting substrate 11.

In other words, a feature of the opto-acoustoelectric device of the seventh embodiment lies in the peripheral circuits connected to the acoustoelectric transducer 60. Namely, the configuration of the peripheral circuits embracing the processor 61 and the vibration driver 302 differs from the peripheral circuit of the opto-acoustoelectric device of the sixth embodiment shown in FIG. 31.

The detected electric signal provided by the photo detector 3, is fed to the processor 61 so as to be converted into the electrical sound signal. The vibration driver 302 includes the driving circuit 62 and the control signal generator 360. The driving circuit 62 provides the driving voltage Vp, in which the signal of arbitrary frequency is superposed on the given the bias voltage Vb, based on a control signal delivered from the control signal generator 360. Similarly to the sixth embodiment, the vibration driving mechanism (65, 11) of the seventh embodiment encompasses a stationary electrode fixed to the supporting substrate 11 and a movable electrode 65 fixed to the diaphragm 2, and an electrostatic force is applied across the stationary electrode 11 and movable electrode 65 so as to drive actively the vibration of the diaphragm 2. Then, the driving voltage Vp is applied to the space between the movable electrode 65 and the supporting substrate (stationary electrode) 11, the movable electrode 65 is formed at or in the diaphragm 2, so that the diaphragm 2 can be actively vibrated. For implementing the stationary electrode, at least a part of the supporting substrate 11 may be made of a conductive substrate, but the supporting substrate 11 does not always need to manifest low resistivity by itself, as long as a stationary electrode is buried in the inside of the supporting substrate 11 or is mounted at the surface of the supporting substrate 11. The control signal provided by the control signal generator 360 has a specific voltage value for controlling the oscillation of the driving circuit 62, such that the driving circuit 62 can oscillate at a specific single frequency. In other words, the bias voltage Vp applied across the diaphragm (movable electrode) 2 and the support substrate (stationary electrode) 11 is oscillated at frequency having no relation with the electrical sound signal obtained by the processor 61. Thus, the diaphragm 2 can be vibrated at desired frequency.

Figure 39A:
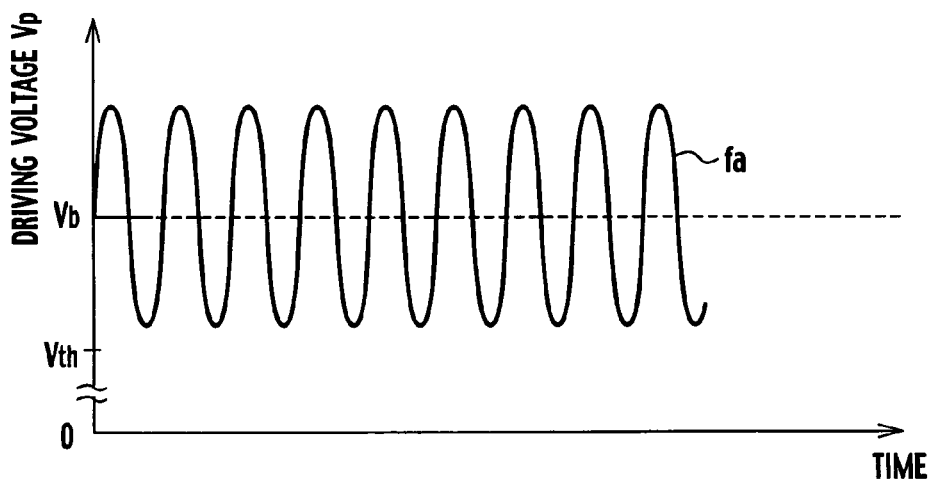
FIG. 39A is a diagram describing the waveform of the driving voltage Vp, which is provided by a voltage-controlled oscillator (VCO)
Figure 39B:
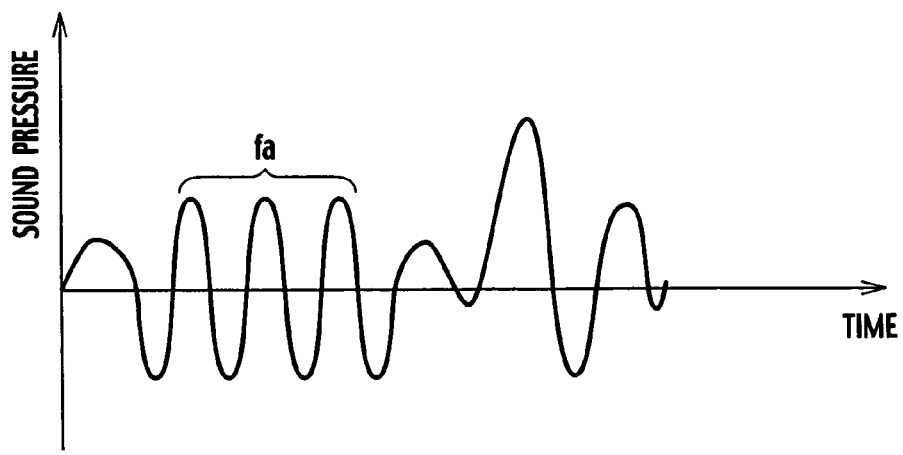
FIG. 39B is a diagram describing the waveform of the sound pressure by which the diaphragm of the seventh embodiment is supposed to vibrate.
Figure 39C:
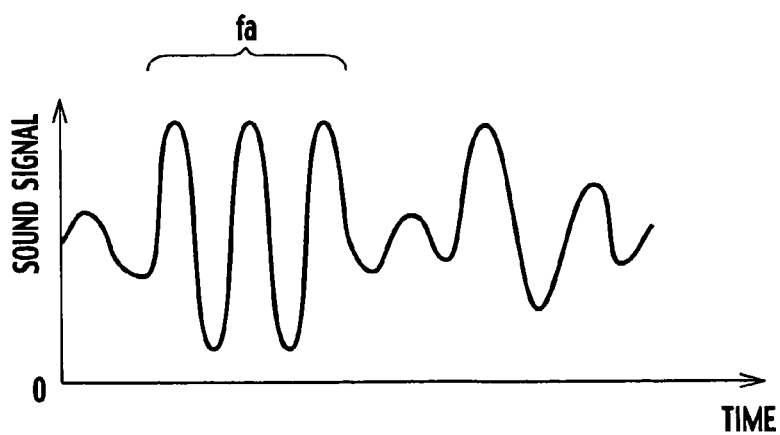
FIG. 39C is a diagram describing the waveform of the electrical sound signal obtained in a signal processing circuit, when the diaphragm of the seventh embodiment actively vibrating by the driving voltage Vp, and further, the diaphragm receives the sound pressure shown in FIG. 39B.

FIG. 39A through FIG. 39C are diagrams for explaining the relationship between the passive vibration of the diaphragm 2 generated by sound pressure and the active vibration of the diaphragm 2 by application of the driving voltage Vp. FIG. 39A is the example of the driving voltage Vp provided by the driving circuit 62, and the bias voltage Vp is oscillated at frequency $f_a$. And FIG. 39B shows the example of sound pressure, by which the diaphragm 2 vibrate, and FIG. 39C shows the example of the electrical sound signal obtained by the processor 61, under the condition that the diaphragm 2 is actively vibrating by the driving voltage Vp, when the diaphragm 2 further received the sound pressure shown in FIG. 39B. In the electrical sound signal shown in FIG. 39C, signal component having frequency $f_a$ is emphasized by the sound pressure shown in FIG. 39B, and signal components having other frequencies weakens. In other words, by using the acoustoelectric transducer 60, the processor 61 and the vibration driver 302, even without using filtering circuits, the filtering function of electrical sound signal can be manifested. And by making the driving circuit 62 oscillate not at a specific single frequency but at a plurality of frequencies lying sequentially in a specific range, the function of band pass filtering can also be manifested.

As explained above, according to the opto-acoustoelectric device of the seventh embodiment, the acoustoelectric transducer 60 can be actively vibrated at desired frequency. The active vibration of the diaphragm 2 makes it possible to filter electrical sound signal without using a filtering circuit and to reduce the load on the hardware organization of the signal processing system for processing the electrical sound signal.

And, the diaphragm 2 can be actively driven by a signal having a frequency of the human voice, which is beforehand detected and analyzed, so that it can increase the intensity of a specific frequency-component which characterizes the voice of a specific person. The method of the seventh embodiment can be utilized in the speech recognition system using the opto-acoustoelectric device.

(Other Embodiment)

Various modifications will become possible for those skilled in the art after receiving the teaching of the present disclosure without departing from the scope thereof.

Although diffraction gratings having geometries of holes and grooves were mentioned in the description of the first to seventh embodiments, it is also acceptable to implement a one-dimensional or two-dimensional diffraction grating with a refraction index distribution like that of photonic crystal. Further, it is also acceptable to use a diaphragm 2 having the plan views shown in FIGS. 40A and 40B. The diaphragm 2 shown in FIG. 40A encompasses a picture-frame shaped stationary frame 51, a plurality of horizontal stationary beams 52 spanning in rows between the space defined by the stationary frame 51, as well as a plurality of vertical stationary beams 52 spanning in columns rows between the space defined by the stationary frame 51, crossing the horizontal stationary beams 52 in such a way that a pattern of regularly spaced horizontal stationary beams 52 and vertical stationary beams 52 can formed a stationary grid 52.

A plurality of rectangular oscillating elements $X_{i,j}$ (i=1 to 3, j=1 to 3) are arranged in each one of the rectangular openings of the stationary grid 52, and elastic beams $1a_{i,j}$, $1b_{i,j}$, $1c_{i,j}$, $1d_{i,j}$ (i=1 to 3, j=1 to 3) connect each of the rectangular oscillating elements $X_{i,j}$ to corresponding stationary grid 52. More specifically, four elastic beams $1a_{i,j}$, $1b_{i,j}$, $1c_{i,j}$, $1d_{i,j}$ are linked to each of the diaphragm-shaped rectangular oscillating element $X_{i,j}$. The rectangular oscillating elements $X_{i,j}$ serves as the principal masses, while each of the four elastic beams $1a_{i,j}$, $1b_{i,j}$, $1c_{i,j}$ $1d_{i,j}$ serves as a minute auxiliary-mass.

Figure 40A:
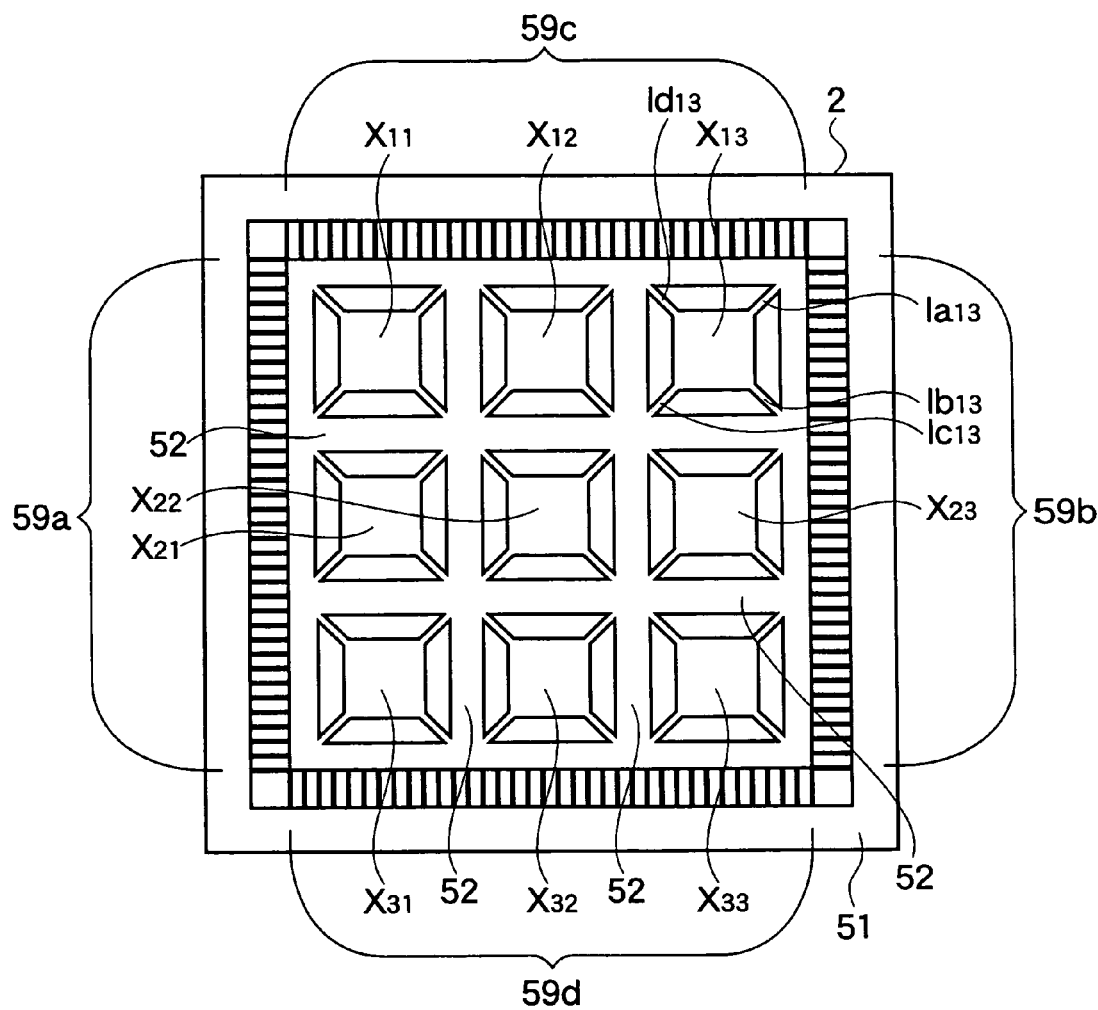
FIG. 40A is a plan view of an opto-acoustoelectric device according to another embodiment of the present invention.
Figure 40B:
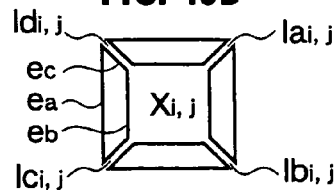
FIG. 40B shows details of one of the oscillating element, which implements a mechanical vibration element shown in FIG. 40A.

According to the diaphragm 2 shown in FIG. 40B, three types of diffraction images can be detected by the edge $e_a$ of the stationary beam 52, by the edge $e_b$ of the rectangular oscillating element $X_{i,j}$, and by the edges $e_c$ of the elastic beams $1a_{i,j}$, $1b_{i,j}$, $1c_{i,j}$ $1d_{i,j}$. The edge $e_a$ is susceptible to a vibration in a low frequency band, because the mass of the stationary beam 52 is heavy. The edge $e_b$ of the rectangular oscillating element $X_{i,j}$ is susceptible to a vibration having a resonance frequency different from the resonance frequency of the stationary beam 52, because the mass of the rectangular oscillating element $X_{i,j}$ differs from the stationary beam 52. The edges $e_c$ of the elastic beams $1a_{i,j}$, $1b_{i,j}$, $1c_{i,j}$ $1d_{i,j}$ are susceptible to vibrations, each having a resonance frequency different from the resonance frequency of the stationary beam 52 or the rectangular oscillating element $X_{i,j}$, because the masses of the elastic beams $1a_{i,j}$, $1b_{i,j}$, $1c_{i,j}$ $1d_{i,j}$ are lighter than the stationary beam 52 or the rectangular oscillating element $X_{i,j}$. Because three different type of oscillating elements are merged in a single diaphragm 2, each of the oscillating elements having mutually different resonance frequency, it becomes possible to build broadband frequency characteristics of the vibration by a single diaphragm 2. In other words, in view of the related masses of each of the edges $e_a$, $e_b$, $e_c$, the resonance frequencies $f_{a0}$, $f_{b0}$, $f_{c0}$ of the edges $e_a$, $e_b$, $e_c$ must satisfy the following relationship:

$$f_{a0} < f_{b0} < f_{c0} \qquad (18)$$

Although three diffraction images, each having differing two-dimensional configuration, will appear on the surface of the photo detector 3, it is enough to elect one of diffraction images which manifest the greatest displacement of the diffraction images for detecting any frequency, because the diaphragm 2 shown in FIGS. 40A and 40B has a broadband frequency characteristic.

Although sound pressure were assumed to be the source of mechanical vibration generated on the diaphragm 2 in the description of the first to seventh embodiments, it is also acceptable to employ another sources of mechanical vibrations, which will generate vibrations on the diaphragm 2, such as the mechanical vibrations ascribable to earthquake, mechanical shocks generated by heavy vehicles, eruption of volcano or explosion of bomb.

Thus, the present invention of course includes various embodiments and modifications and the like which are not detailed above. Therefore, the scope of the present invention will be defined in the following claims.

What is claimed is:

1. An opto-acoustoelectric device comprising:
   a diaphragm having a diffraction grating, the diaphragm is susceptible to a vibration driven by an external force;
   a light source oriented to irradiate the diffraction grating;
   a photo detector configured to detect the light diffracted by the diffraction grating and to convert the detected light into an electric signal, the electric signal corresponds to a displacement of the vibration in the diaphragm;
   a stationary frame surrounding the diaphragm, the diaphragm is implemented by a plurality of oscillating elements;
   a plurality of horizontal stationary beams spanning in rows between a space defined by the stationary frame, both ends of each of the horizontal stationary beams are fixed to the stationary frame;
   a plurality of vertical stationary beams spanning in columns between the space defined by the stationary frame, crossing the horizontal stationary beams in such a way that regularly spaced horizontal and vertical stationary beams form a stationary grid, both ends of each of the vertical stationary beams are fixed to the stationary frame; and
   a plurality of elastic connectors connected between each of the oscillating elements and horizontal stationary beams, and further disposed to be connected between each of the oscillating elements and the vertical stationary beams so as to suspend independently the oscillating elements in each of rectangular openings defined by the stationary grid.

* * * * *